(12) United States Patent
Coene et al.

(10) Patent No.: US 7,904,848 B2
(45) Date of Patent: Mar. 8, 2011

(54) SYSTEM AND METHOD FOR RUNTIME PLACEMENT AND ROUTING OF A PROCESSING ARRAY

(75) Inventors: Paul Coene, Grobbendonk (BE); Hisanori Fujisawa, Kawasaki (JP)

(73) Assignees: IMEC, Leuven (BE); Fujitsu Ltd., Kanagawa (JP)

( * ) Notice: Subject to any disclaimer, the term of this patent is extended or adjusted under 35 U.S.C. 154(b) by 679 days.

(21) Appl. No.: 11/685,665

(22) Filed: Mar. 13, 2007

(65) Prior Publication Data

US 2007/0220522 A1 Sep. 20, 2007

Related U.S. Application Data

(60) Provisional application No. 60/782,382, filed on Mar. 14, 2006.

(51) Int. Cl.
*G06F 17/50* (2006.01)
*G06F 9/45* (2006.01)

(52) U.S. Cl. .............. 716/7; 716/5; 716/6; 716/8; 716/9; 716/10; 716/11

(58) Field of Classification Search ................ 716/8–14, 716/16–18, 5–11
See application file for complete search history.

(56) References Cited

U.S. PATENT DOCUMENTS

| | | | | |
|---|---|---|---|---|
| 5,701,441 | A * | 12/1997 | Trimberger | 716/16 |
| 7,073,158 | B2 * | 7/2006 | McCubbrey | 716/17 |
| 2003/0099014 | A1 * | 5/2003 | Egner et al. | 359/124 |
| 2005/0278665 | A1 * | 12/2005 | Gentry et al. | 716/4 |

OTHER PUBLICATIONS

Betz et al., "VPR: A New Packing, Placement and Routing Tool for FPGA Research", Int. Workshop on Field-Programmable Logic and Applications, pp. 213-222, 1997.
Boese et al., "Best-So-Far vs. Where-You-Are: New Perspectives on Simulated Annealing for CAD", Proceedings EURO-DAC, pp. 78-83, 1993.
Breuer, M.A., "A class of min-cut placement algorithms", Proceedings of the 14th conference on Design automation. pp. 284-290, 1977.
Caldwell et al., "Can Recursive Bisection Alone Produce Routable Placements?" Proc. Design Automation Conference, pp. 1-6, 2000.
Clow, G.W., "A Global Routing Algorithm for General Cells", Proceedings of the ACM IEEE 21st Design Automation Conference, pp. 45-51, 1984.
Cohoon et al., "Genetic Placement", Proc. IEEE Int. Conf. on CAD, vol. CAD-6, No. 6, pp. 956-964, 1987.
Dijkstra, E.W., "A Note on Two Problems in Connexion with Graphs", Numerical Mathematics, vol. 1, pp. 269-271, 1959.
Ebeling et al., "Placement and Routing Tools for the Triptych FPGA", IEEE Trans on VLSI Systems, vol. 3, No. 4, pp. 473-482, 1995.

(Continued)

*Primary Examiner* — Nghia M Doan
(74) *Attorney, Agent, or Firm* — Knobbe Martens Olson & Bear LLP

(57) ABSTRACT

A system for mapping tasks of at least one application on processing units of a reconfigurable array, the system comprising a plurality of programmable processing units, each programmable processing unit having at least one connection node, the programmable processing units disposed on a layer permitting interconnection between connection nodes; and a mapping unit adapted to substantially simultaneously optimize placement of the tasks on the plurality of programmable processing units and routing of interconnections between the plurality of processing units, the mapping unit adapted to select one placement algorithm among a plurality of predetermined placement algorithms and to select one routing algorithm from a plurality of predetermined placement algorithms, the selection configured to prefer use of non-random algorithms.

16 Claims, 41 Drawing Sheets

OTHER PUBLICATIONS

Fiduccia et al., "A Linear-Time Heuristic for Improving Network Partitions", 19th Design Automation Conference, pp. 175-181, 1982.

Goldberg et al., "Alleles, Loci, and the Traveling Salesman Problem", Proc. Int. Conf. on Genetic Algorithms and their Applications, pp. 154-159, 1985.

Goto, S., "An Efficient Algorithm for the Two-Dimensional Placement Problem in Electrical Circuit Layout", IEEE Transactions on Circuits and Systems, vol. CAS-28, No. 1, pp. 12-18, 1981.

Hadlock, F.O., "A Shortest Path Algorithm for Grid Graphs", Networks, John Wiley & Sons, 7, pp. 323-334, 1977.

Hanan et al., "Placement Techniques", M.A. Breuer, Ed. Prentice-Hall Inc., Englewood Cliffs, New Jersey, pp. 213-282, 1972.

Hightower, D.W., "A Solution to Line-Routing Problems on the Continuous Plane", Proceedings of the 6th Design Automation Workshop, pp. 1-24, 1969.

Kannan et al., "Tightly Integrated Placement and Routing for FPGAs", Proc. Of the Int. Workshop on Field-Programmable Logic and Applications, pp. 233-242, 2001.

Karro et al., "Gambit: A Tool for the Simultaneous Placement and Detailed Routing of Gate-Arrays", 11th International Conference on Field Programmable Logic and Applications, pp. 243-253, 2001.

Kirkpatrick et al., "Optimization by Simulated Annealing", Science, vol. 220, No. 4598, pp. 671-680, 1983.

Land et al., "An Automatic Method of Solving Discrete Programming Problems", Econometrica, vol. 28, No. 3, pp. 497-520, 1960.

Lee, C.Y., "An Algorithm for Path Connections and Its Applications", IRE Transactions on Electronic Computers, vol. EC=10, pp. 346-365, 1961.

Lysecky, et al., Dynamic FPGA routing for just-in-time FPGA compilation; DAC, Jun. 2004, San Diego, California.

McMurchie et al., "PathFinder: A Negotiation-Based Performance-Driven Router for FPGAs", Proc. Of ACM Symp. Field-Programmable Gate Arrays, 1995.

Mei et al., "Exploiting loop-level parallelism on coarse-grained reconfigurable architectures using modulo scheduling", IEE Proc.-Computer and Digital Techniques, vol. 150, No. 5, pp. 255-261, 2003.

Mikami et al., "A Computer Program for Optimal Routing of Printed Circuit Conductors", Proceedings of the IFIP Congress, vol. 2, pp. 1475-1478, 1968.

Mo et al., "A Force-Directed Macro-Cell Placer", Proc. ICCAD, pp. 404-407, 2000.

Nag et al., "Performance-Driven Simultaneous Placement and Routing for FPGA's", IEEE Transactions on Computer-Aided Design and Integrated Circuits and Systems, vol. 17, No. 6, pp. 499-518, 1998.

Nilsson, N.J., Problem-Solving Methods in Artificial Intelligence, McGraw-Hill, Ch. 3, pp. 43-78, 1971.

Onodera et al., "Branch-and-Bound Placement for Building Block Layout", 28th ACM/IEEE Design Automation Conference, pp. 433-439, 1991.

Preas et al., "Automatic Placement: A Review of Current Techniques", Proc. Design Automation Conference, pp. 622-629, 1986.

Rose et al., "Temperature Measurement and Equilibrium Dynamics of Simulated Annealing Placements", IEEE Transactions on Computer-Aided Design, vol. 9, No. 3, pp. 253-259, 1990.

Saito et al., "Cluster Architecture for Reconfigurable Signal Processing Engine for Wireless Communication", IEEE, pp. 353-359, 2005.

Sankar et al., "Trading Quality for Compile Time: Ultra-Fast Placement for FPGAs", ACM international conference on FPGA, pp. 157-166, 1999.

Sechen et al., "The TimberWolf Placement and Routing Package", IEEE Journal of Solid-State Circuits, vol. sc-20, No. 2, pp. 510-522, 1985.

Shahookar et al., "VLSI Cell Placement Techniques", ACM Computing Surveys, vol. 23, No. 2, pp. 143-220, 1991.

Shannon, C., "Presentation of a Maze-Solving Machine", Trans of the 8th Cybernetics Conf., Josiah Macy Jr. Foundation, New York, NY, pp. 173-180, 1952.

Soukup, J., "Fast Maze Router", Annual ACM IEEE Design Automation Conference, Proceedings of the 15th Design Automation Conference, 1978, Las Vegas, Nevada, US, DAC-78, pp. 100-102.

Sun et al., "Efficient and Effective Placement for Very Large Circuits", IEEE Transactions on Computer-Aided Design of Integrated Circuits and Systems, vol. 14, No. 3, pp. 349-359, 1995.

Swartz et al., "New Algorithms for the Placement and Routing of Macro Cells", Proc. Int. Conf. on Computer-Aided Design, pp. 336-339, 1990.

* cited by examiner

SEMI-PERIMETER LENGTH: 11

COMPLETE GRAPH:
(3+3+4+10+8+7)*2/4=17.5

CHAIN LENGTH: 14

SPANNING TREE LENGTH: 13

SOURCE-TO-SINK LENGTH: 17

STEINER TREE LENGTH: 12

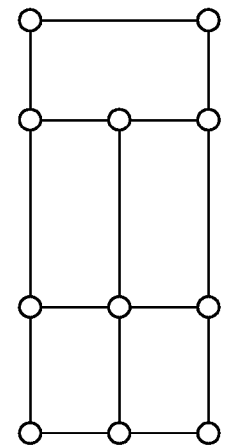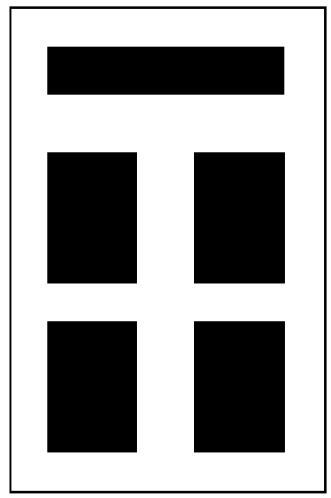
*FIG. 15B*
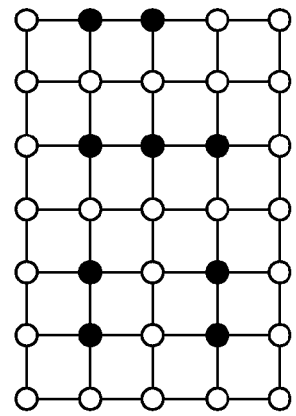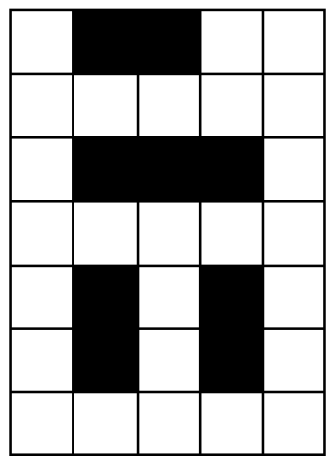
*FIG. 15A*

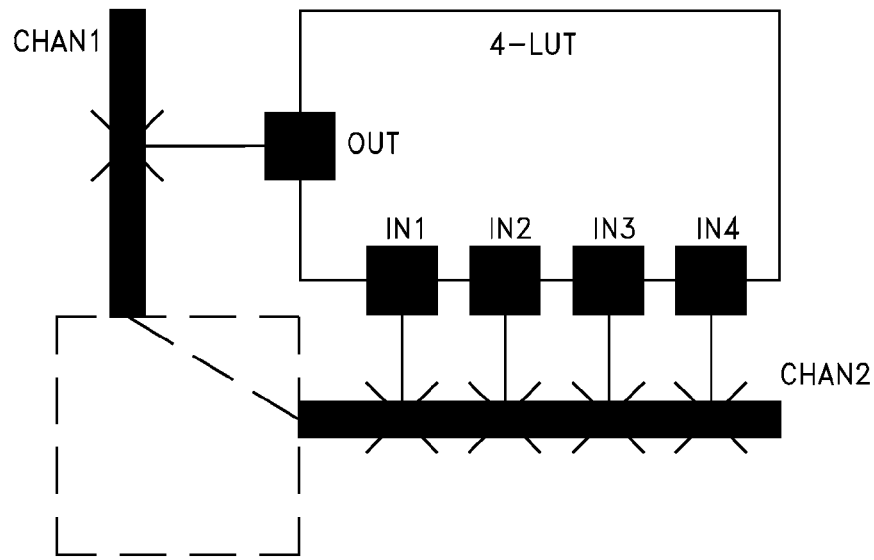
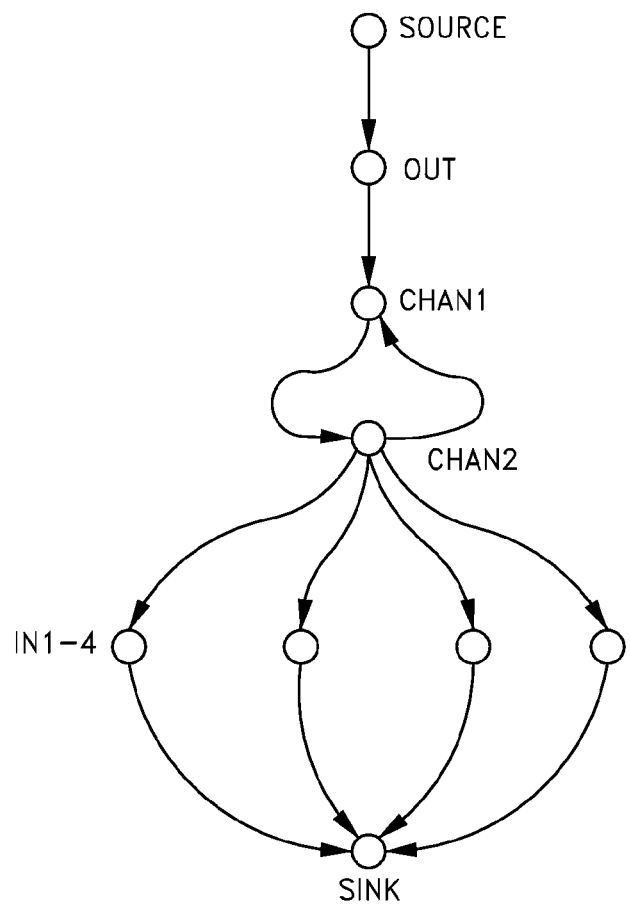
*FIG. 15C*

PHYSICAL RESOURCE          GRAPH REPRESENTATION
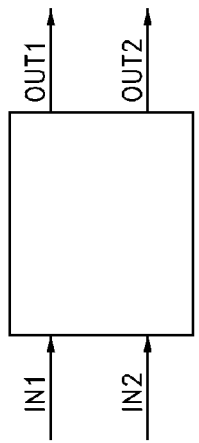
CLUSTER
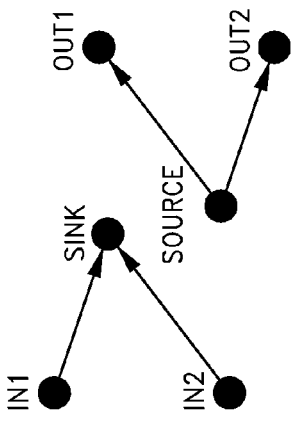
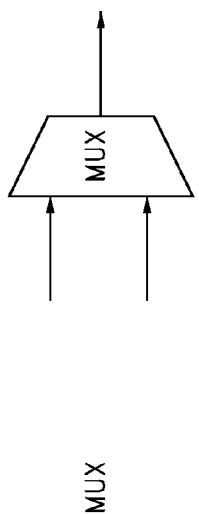
MUX
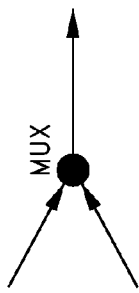
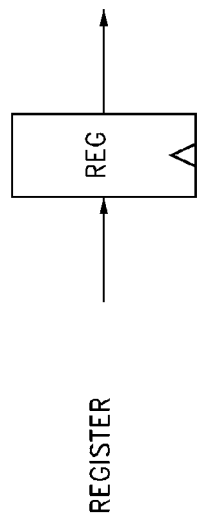
REGISTER
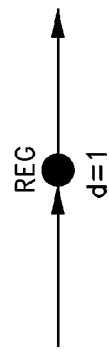
FIG. 23

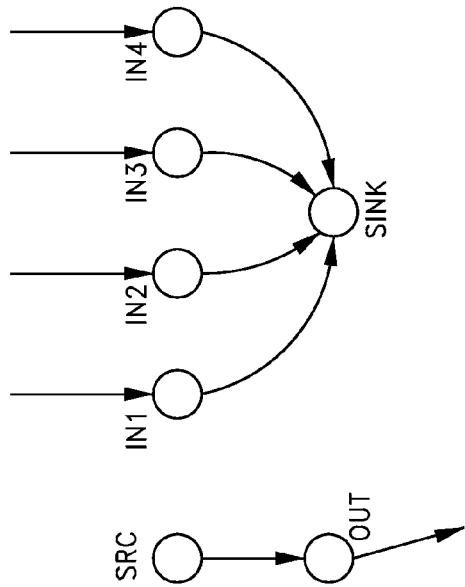
FIG. 31
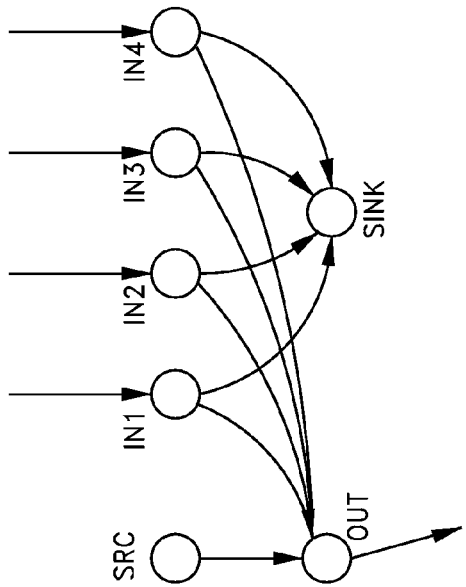
FIG. 32
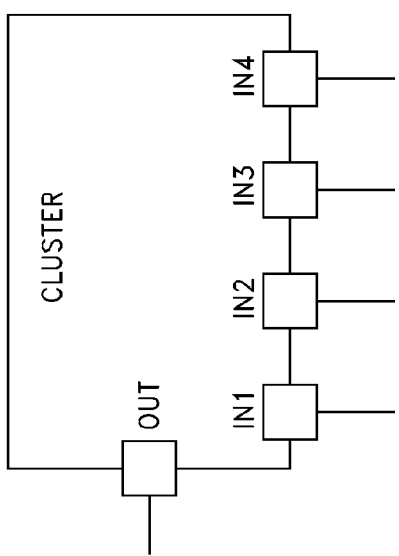
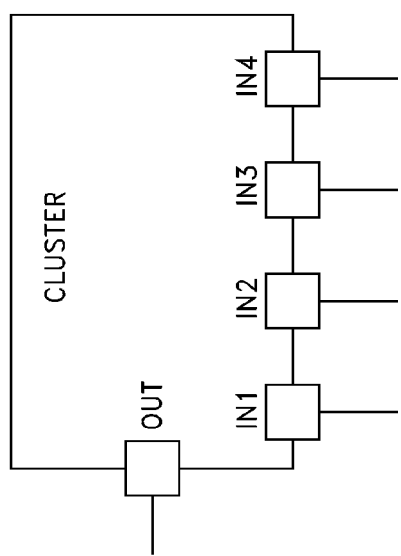

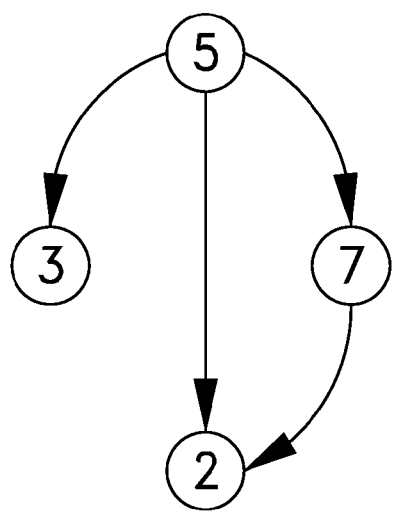 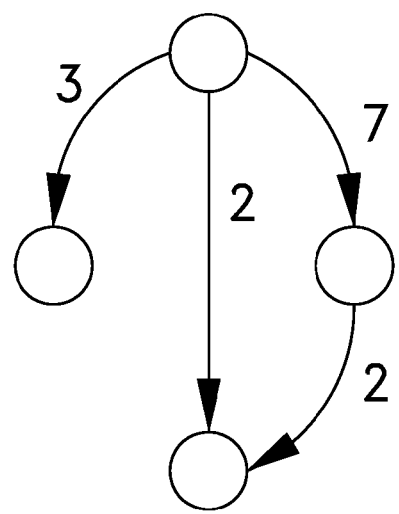
*FIG. 35A*            *FIG. 35B*

| PHYSICAL INTERCONNECT RESOURCE | | TRANSITORY NODE REPRESENTATION |
|---|---|---|
| WIRE |  | 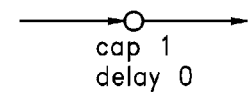 cap 1 delay 0 |
| ROUTING TRACK 4 WIRES | 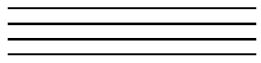 | 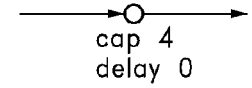 cap 4 delay 0 |
| REGISTER | 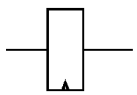 | 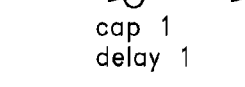 cap 1 delay 1 |
| MULTIPLEXER | 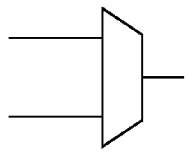 | 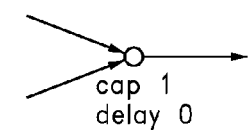 cap 1 delay 0 |
| MULTIPLEXER + REGISTER | 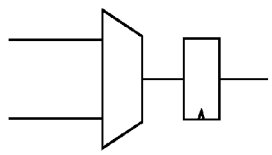 | 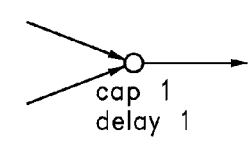 cap 1 delay 1 |
| COMPLEX SWITCHING | 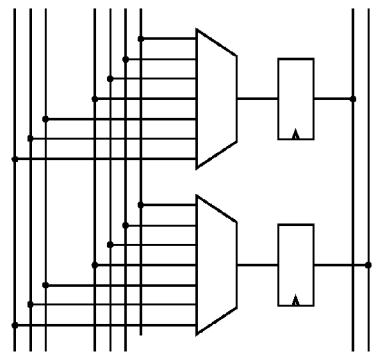 | 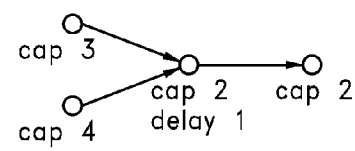 cap 3, cap 4, cap 2 delay 1, cap 2 |
*FIG. 41*

SYSTEM AND METHOD FOR RUNTIME PLACEMENT AND ROUTING OF A PROCESSING ARRAY

RELATED APPLICATIONS

This application claims benefit under 35 U.S.C. §119(e) to U.S. Provisional Patent Application No. 60/782,382, filed Mar. 14, 2006, which is incorporated herein in its entirety by reference.

LIMITED COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The method relates to a method for mapping on computation engines, in particular arrays, in a run-time approach.

2. Description of the Related Technology

Use of fine- and coarse-grain reconfigurable processing arrays requires the use of placement and routing (P&R) techniques to determine preferable conditions of operation. Specifically, during runtime reconfiguring of the processing array, new locations for processors, or groups of processors treated as a processing unit, must be chosen. Additionally, each processor or block possesses a number of interconnection pins which, when properly connected, permit data interaction between the processing unit. As the number of processing units is increased, or as the processing units are broken into finer-grain segments, the number of possible placement positions increases quickly. Additionally, the possible combinations of routing connections between processing units increase explosively as well.

To determine the preferable location and routing conditions for the processing units, certain algorithms are typically implemented. Several criteria can be evaluated to determine preferable P&R, including, but not limited to, increased processing cost associated with inefficient processor unit tasking or communication cost and delay associated with relaying information to destination processing units resulting in decreased overall efficiency. Some algorithms determine higher-quality locations and connections resulting in faster or more efficient completion of tasks by processing units, usually by increasing the amount of time required to determine the P&R. Faster algorithms typically produce less optimal results for P&R.

Thus, it can be difficult to select and implement an algorithm for P&R during runtime. Time spent selecting P&R for the reconfigurable array increases the eventual total computation cost for the task for which the P&R is necessitated. Accordingly, there is a need for runtime P&R of reconfigurable arrays which selects and implements algorithms that result in more optimal solutions for P&R. Preferably, the optimization is not fixed based on granularity of the processing units, and can be adapted to changing numbers of processing units.

SUMMARY OF CERTAIN INVENTIVE ASPECTS

One aspect of an embodiment of an inventive aspect can include a system for mapping tasks of at least one application on processing units of a reconfigurable array, the system comprising a plurality of programmable processing units, each programmable processing unit having at least one connection node, the programmable processing units disposed on a layer permitting interconnection between connection nodes and a mapping unit adapted to substantially simultaneously optimize placement of the tasks on the plurality of programmable processing units and routing of interconnections between the plurality of processing units, the mapping unit adapted to select one placement algorithm among a plurality of predetermined placement algorithms and to select one routing algorithm from a plurality of predetermined placement algorithms, the selection configured to prefer use of non-random algorithms. In some embodiments, the placement algorithm can be a constructive cluster growth algorithm when the plurality of programmable processing units is fewer than a first predetermined threshold value. In certain embodiments, the cluster growth algorithm can be combined with iterative pair-wise interchange. In certain other embodiments, the mapping unit can be adapted for receiving a suitable graph representation of the computation engine, the computational elements of the computation engine being represented as vertices, and the cluster growth algorithm uses a key value derived from the distance between a source vertex and a current vertex and an estimated distance between a current vertex and a destination vertex. In some embodiments, the placement algorithm can be a simulated annealing algorithm when the plurality of programmable processing units is greater than about a second predetermined threshold. In some embodiments, the reconfigurable array can be adapted to be reconfigured during run-time. In certain embodiments, the placement algorithm can be a simulated genetic algorithm when the plurality of processing units is greater than about a third predetermined threshold value. In certain embodiments, the routing algorithm can be a Dijkstra algorithm when the plurality of programmable processing units is a fourth predetermined threshold value. In certain embodiments, the Dijkstra algorithm can be augmented with an A* estimator. In some embodiments, each programmable processing unit can comprise a plurality of programmable processing modules.

Another inventive aspect of an embodiment can include a method of reprogramming a computation engine, the method comprising providing a computation engine, providing at least one application with tasks in a suitable representation, providing a suitable graph representation of the computation engine, the computational elements of the computation engine represented as vertices, performing placement of the tasks on the computation elements, and using an algorithm to find a shortest path between vertices in the graph. In some embodiments, the algorithm can be a Dijkstra shortest path router. In certain embodiments, the Dijkstra shortest path router can be augmented with an A* estimator. In certain embodiments, the algorithm can use a heuristic to approximate a path length. In certain embodiments, the placement can utilize information determined during the use of the algorithm to determine paths between vertices. In certain embodiments, the placement can include the use of a cluster growth algorithm. In certain embodiments, the placement can include the use of a simulated annealing algorithm. In some embodiments, the computation engine can comprise an array of computation elements. In certain other embodiments, each of the array of computation elements can be adapted to execute word or sub-word instructions. In some embodiments, the placement can occur substantially simultaneously with the using the algorithm.

Another inventive aspect of an embodiment can include a method of configuring a reconfigurable computation array comprising loading the characteristics of the class of the computation array, loading the characteristics of a first application to be executed on the programmable computation array, selecting a method for reconfiguring the computation array based on the characteristics of the computation array and the characteristics of the first application, and executing the method for reconfiguring the computation array. In some embodiments, the reconfigurable computation array can be executing a second application at the time of loading of the first application. In certain embodiments, the reconfigurable computation array can execute the method without interrupting the execution of the second application. In certain other embodiments, the reconfigurable array can be reconfigured without interrupting the execution of the second application. In some embodiments, the selection of the method can complete in about one second. In other embodiments, the selection of the method can comprise selecting at least one of a Dijkstra algorithm, an A* algorithm, a cluster growth algorithm, a simulated annealing algorithm, and a genetic algorithm. In certain embodiments, the selection of the method can be altered based upon the number of processing elements in the computation array. In certain other embodiments, the loading the characteristics of the class can include loading input in XML format. Certain embodiments can include a storage medium having a computer program stored thereon for causing a suitable programmed system to process the computer program by performing the method when the computer program is executing on the system.

Another inventive aspect of an embodiment can include an apparatus comprising a processing array comprising a plurality of processing elements, the processing array adapted to be reconfigured during operation and a computer readable medium containing a set of instructions for reconfiguring the processing array, the set of instructions containing at least one instruction for selecting a method for reconfiguring the processing array. In some embodiments, the instruction for selecting a method is adapted to select different methods when the number of processing elements corresponds to a plurality of numerical ranges. In certain embodiments, the method for reconfiguring the array can include implementing an A* algorithm. In certain other embodiments, the A* algorithm can select a non-lower bound estimator.

Another inventive aspect of an embodiment can include an apparatus comprising a means for processing that is reconfigurable and means for storing instructions adapted to provide instructions to the processing means, the instruction means containing a method for reconfiguring the processing means. In certain embodiments, the processing means can comprise a coarse-grain configurable array. In certain other embodiments, the instruction means can be adapted to provide a first method to the processing means when the processing means comprises fewer than 20 processing elements. In still other certain embodiments, the instruction means can be adapted to provide a second method to the processing means when the processing means comprises more than 25 processing elements. In certain embodiments, the processing means can be adapted to execute the instructions during run-time operation.

Another inventive aspect of an embodiment can include a method of reconfiguring a coarse-grain programmable array, the method comprising providing a mapper, the mapper configured to provide a set of instructions to the programmable array, selecting an optimization method for reconfiguring the array, providing the optimization method to the mapper, executing the optimization method to determine a new configuration for the programmable array, and reconfiguring the programmable array. In certain embodiments, the method can be completed in under one second. In certain other embodiments, the optimization method can include a Dijkstra algorithm augmented with an A* estimator.

BRIEF DESCRIPTION OF THE DRAWINGS

FIG. 10 depicts a visualization of routing using a Lee-More algorithm.

FIG. 11 depicts a visualization of routing using Hadlock's algorithm.

FIG. 15a depicts a graphical representation of a first routing layout.

FIG. 15b depicts a graphical representation of a second routing layout.

FIG. 15c depicts a graphical representation of a third routing layout.

FIG. 23 depicts a representation of an embodiment of an architecture.

FIG. 31 depicts a schematic representation of a first embodiment of a cluster using a routing resource graph.

FIG. 32 depicts a schematic representation of a second embodiment of a cluster using a routing resource graph.

FIG. 34b illustrates a schematic representation of the networked cluster of FIG. 34a.

FIG. 35a illustrates a schematic representation of a first routing resource graph.

FIG. 35b illustrates a schematic representation of a second routing resource graph.

FIG. 40b illustrates a schematic representation of the embodiment of FIG. 40a.

FIG. 41 depicts schematic representations of several routing resources.

DETAILED DESCRIPTION OF CERTAIN INVENTIVE EMBODIMENTS

Figure 1:
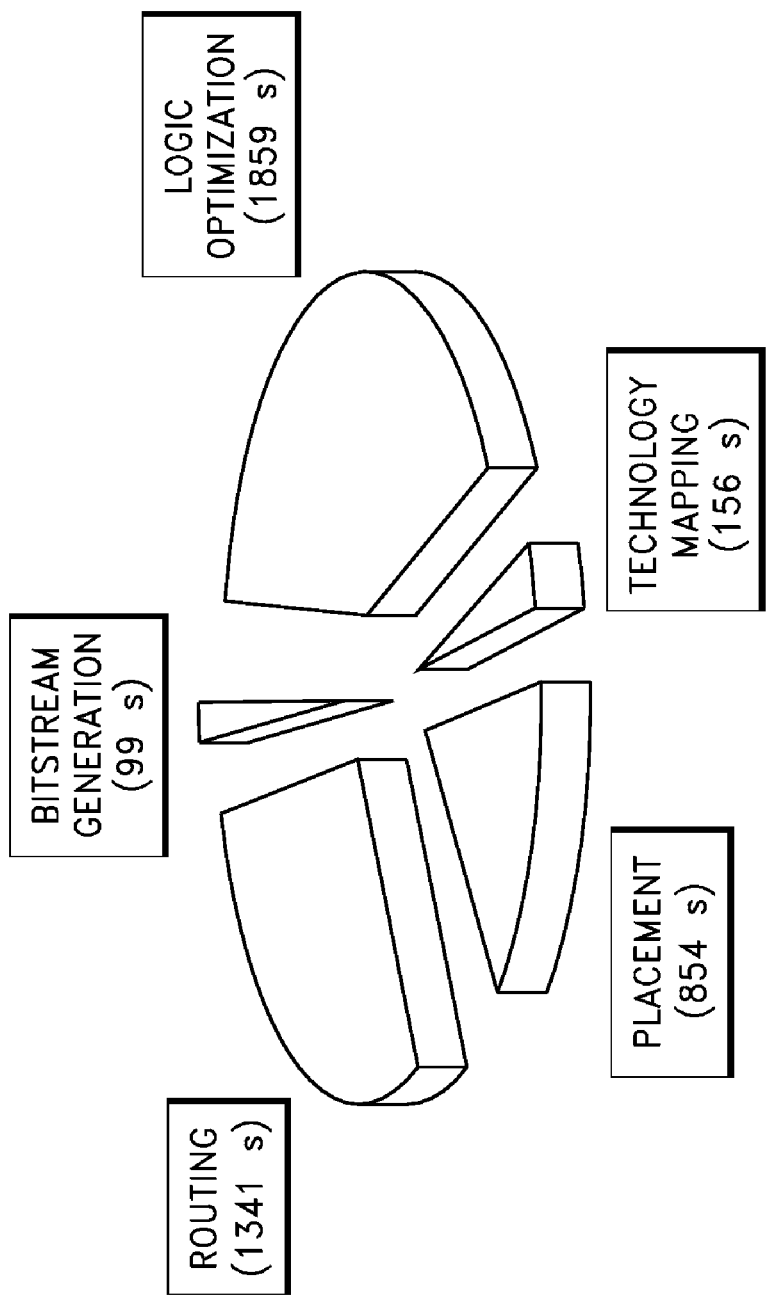
FIG. 1 depicts a graphical representation of time requirements for an equalizer application.

Throughout this detailed description, referral will be made to a particular reference resource, such as "Reference 1" or "Ref. 1." It is to be understood that such referrals correspond to the additional references appropriately numbered and located at the end of the detailed description, the contents of which are incorporated herein by reference. The referral may also be denoted by a superscript numeral, such as "[2]" which denotes that additional information regarding the immediately preceding sentence may be located in Reference 2.

As used herein, "optimal" can be interpreted to mean not only a single preferred state or solution, but as a matter of scale. Accordingly, one P&R configuration can be optimal, but another P&R configuration can be more optimal, as weighed against one or more specified criteria.

Introduction

There exists a large collection of research material in the area of Very-Large Scale Integration (VLSI) integrated circuits' placement and routing (P&R). In one application, P&R can be used to solve connections on Field Programmable Gate Arrays (FPGAs). FPGAs can have one or more processing units disposed on a semiconductor. The processing units can be single logic elements, or multiple logic elements treated as a singular element. Fine-grain reconfigurable arrays typically refer to smaller or fewer logic elements, while coarse-grain arrays typically refer to clusters of logic elements treated as single processing units. Accordingly, an architecture can be viewed as having one hundred processing elements when arrayed for fine-grain reconfiguring, or four processing units comprised of twenty-five individual processing elements.

Processing units typically can have one or more interconnection locations, where the units can be networked to allow data exchange between units. Coarse-grain reconfigurable arrays typically have fewer connections than fine-grain arrays. Accordingly, coarse-grain arrays typically have fewer possible routes than fine-grain arrays. For reconfigurable arrays, the P&R can sometimes be accomplished during runtime. Thus, a reconfigurable array can be reconfigured to adapt to particular computational tasks. P&R of processing units during runtime can require selection for optimal placement among all possible processing unit placements, and the complexity of routing between processing units is determined by the number of interconnection locations. Thus, fine-grain arrays can have very large numbers of possible P&R solutions, while coarse-grain arrays typically have smaller numbers of solutions. P&R solutions, however, can affect the speed and efficiency of the array. Accordingly, it can be advantageous to select an optimal P&R solution for either fine- or coarse-grain arrays.

Early routing approaches modeled the layout space geometrically, using grids or lines to find shortest paths[2, 3] between various resources. When the layout space is not easily represented as a grid, a graph representation such as the routing resource graph (RRG) is more appropriate; this is the case for fine-grain[5] and coarse-grain[6] reconfigurable architectures. The well-known Dijkstra algorithm[4] is a "greedy" algorithm that solves the single-source shortest path problem in a weighted graph when the edge weights are restricted to be non-negative. The Dijkstra algorithm can be used as a means to selecting preferable paths in P&R. The A* algorithm, a heuristic from the field of Artificial Intelligence[7], can also be applied to the problem of VLSI P&R.

When routing, it can be important to choose the most desirable path between resources, and not necessarily the shortest path therebetween. Thus, a path that will lower the total routing cost, but that also will cause the least amount of difficulty for finding subsequent path connections can be preferable to a path which simply minimizes routing cost. To handle routing for multiple nets, sequential or iterative approaches can be used. A sequential approach can route all or nearly all possible nets, one by one. The sequential approach can possibly result in solutions whose quality depends upon the order in which routing was performed. By contrast, iterative techniques can start from a completely routed solution and "rip up and retry" selected nets in an effort to free congested areas[5]. The term "rip up and retry" can refer to a completely new route test, or a route test performed after a former test, which includes at least some elements of the former route. Reference 5 includes a demonstration that the negotiated congestion algorithm, an iterative technique that "rips up and retries" every net in every iteration, even those that do not pass through congested areas.

For placement of processing units, a globally-optimal solution can be found by evaluating the routing cost for all possible combinations exhaustively. The number of combinations grows exponentially with the number of blocks to be placed, however, which can make this approach infeasible for all but the smallest of placement problems. To cope with large numbers of processing units, possessing vast solution spaces, a class of algorithms known as branch-and-bound algorithms can be applied[8]. Branch-and-bound placement, however, can be only effective for a relatively small problem sizes (<10 blocks)[8].

In contrast to the branch-and-bound algorithm, a constructive algorithm handles the placement problem by improving on a partial solution as it proceeds to complete the model. Examples of constructive algorithms include, without limitation, the min-cut placement algorithm based on hypergraph partitioning[9] and the cluster growth algorithms[10].

Iterative placement algorithms can improve a complete solution by modifying an existing, complete placement. Examples of iterative placement algorithms include, without limitation, simulated annealing[11, 12], force-directed methods[13] and genetic algorithms[14]. Simulated annealing is the most popular technique today because of its placement quality, but it can take a prolonged amount of computation time.

In general, solving the P&R problem by separating it into successive placement and routing steps is preferable if the placement step can model the interconnections made by the subsequent routing step with a certain amount of success. The expectation that the placement step can optimally model the interconnections of the routing step becomes less valid when applied to FPGAs, particularly coarse-grain reconfigurable systems, where interconnection resources are fixed and scarcer. To remedy this problem, simultaneous P&R methodologies can be implemented[6, 15].

Placement And Routing

Various P&R algorithms can be used to address automated design layouts for Printed Circuit Boards (PCBs), Application Specific Integrated Circuits (ASICs), fine-grain reconfigurable arrays, and coarse-grain reconfigurable arrays, such as FPGAs.

Preferably, an ultra-fast P&R algorithm for blocks of concurrent applications can be used. FIG. 1 illustrates an exemplar apportionment of time in seconds for the computer-aided design (CAD) steps of the design flow of an equalizer application. As can be seen in FIG. 1, because placement and routing can consume more than half the time necessary to reconfigure an array, decreasing P&R selection through proper algorithm selection can increase overall array performance. Calculation speed is significant, because the algorithm preferably can run at run-time on an embedded processor. The embedded processor can be used in the target architecture, together with the coarse-grained array, to manage the resources.

Computational And Memory Complexity

Figure 2:
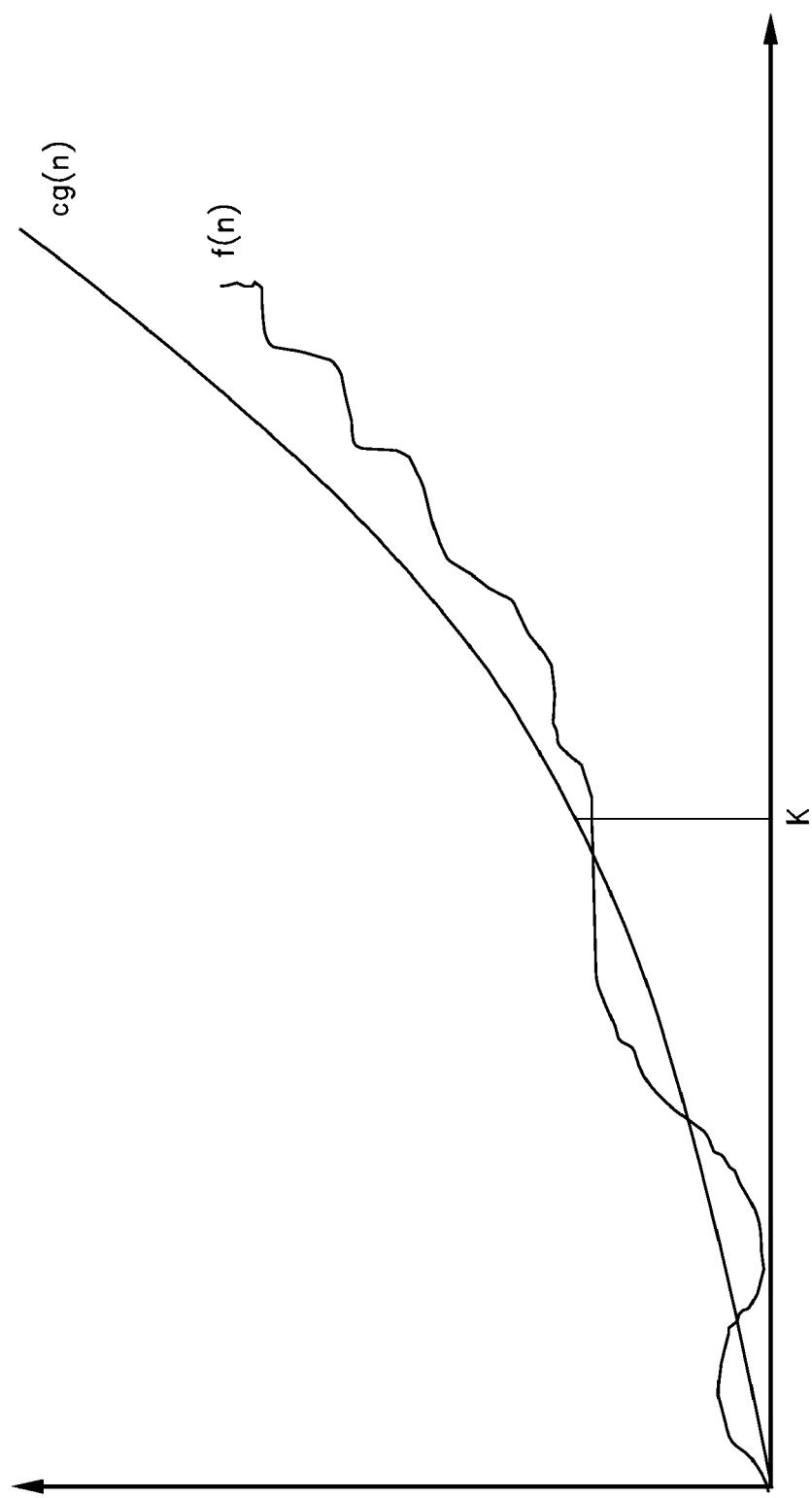
FIG. 2 depicts a graphical representation of algorithmic complexity.

The requirements of some algorithms with respect to memory and processing power can be denoted with "big-Oh" notation, as is well-known in the art. "Big-Oh" notation can describe the asymptotic behaviour of functions, and can refer to the "order" of the function. Big-Oh notation can be used to give an upper bound for the quantification of algorithm computational requirements. Illustrated in FIG. 2 are two arbitrary functions, f(n) and cg(n). When $f(N)=O(g(N))$, it can follow that there are positive constants c and k such that $0 \leq f(n) \leq cg(n)$ for all $n \geq k$ and c. It should be noted that the complexity function can be an upper bound. It is possible that the representation is an overestimation for most real-life situations which could be encountered by the algorithm to be implemented. Additionally, it is comparing two algorithms based on their O-functions alone can fail to provide sufficient information because of the presence of the constant c. In most instances, it can be preferable to obtain a result which performs in $N^2$ nanoseconds runtime as opposed to a result which performs in N centuries runtime. Accordingly, while helpful, O-functions require care in implementation to obtain useful information.

Placement

Figure 3:
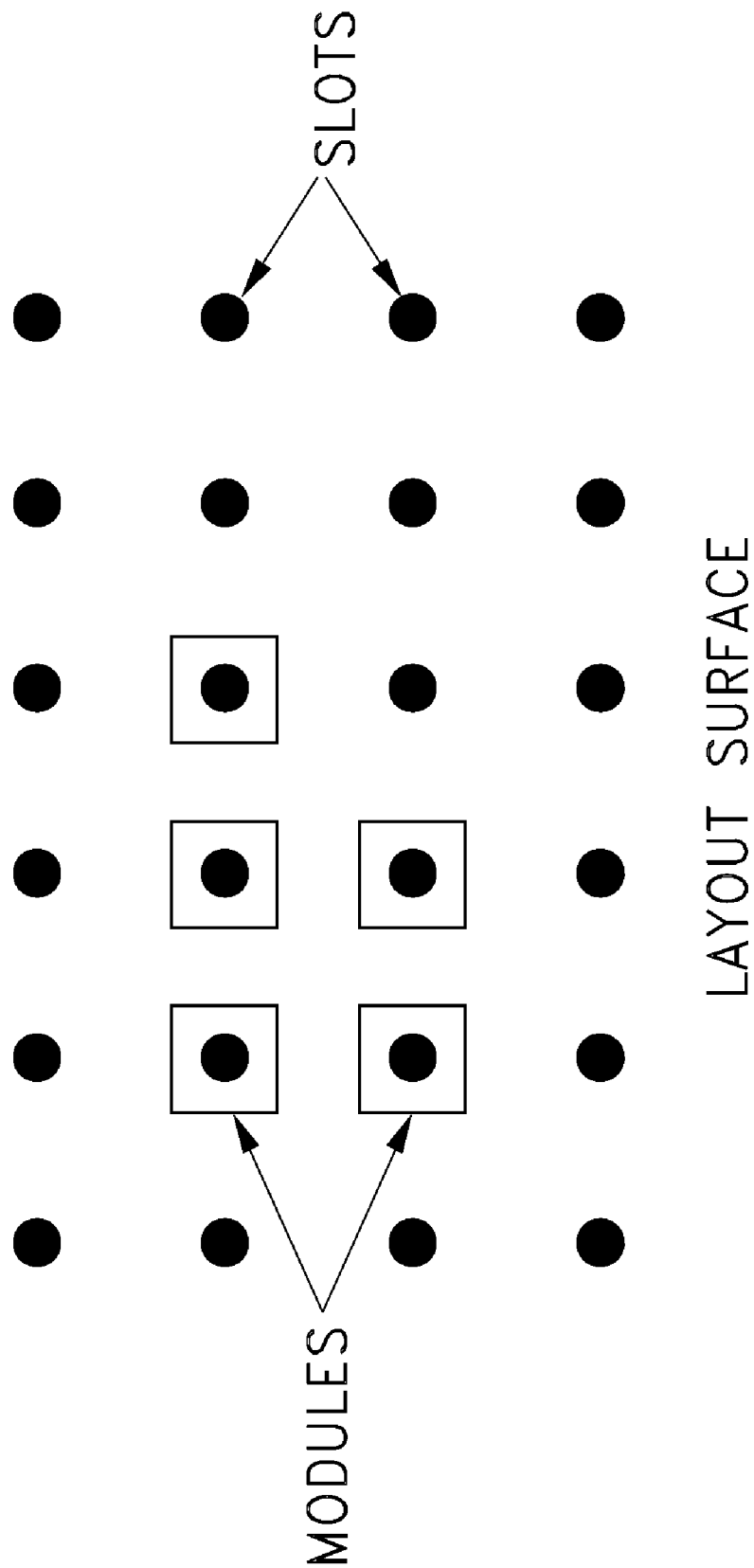
FIG. 3 illustrates a layout surface having a plurality of modules.

Placement can be the process of arranging components of a particular design on a target architecture in such a way that the subsequent routing of the interconnection between the components is possible and/or optimal. Thus, for a collection of components with ports and a plurality of nets, the process of placement will find a suitable physical location for each component. Nets can be defined as sets of ports that are to be wired together. As can be seen in the layout surface of FIG. 3, modules can occupy slots in various patterns or combinations. The modules can form regular or irregular geometric shapes, when viewed as a layout.

The constraints of the physical location and the abstraction level on which a component is placed can depend on the architecture for which the placement is performed. The physical location can be on a more or less continuous plane for PCB layouts, but it typically should fit in a row-wise arrangement for a standard-cell type VLSI design. For FPGA-based fine-grain reconfigurable array, placement can map onto logic elements (containing typically Look-Up Tables (LUTs) and bistate multivibrators, or flipflops). For a coarse-grain reconfigurable array, a mapping of coarse-grain style operations to functional units can be performed.

Figure 4B:
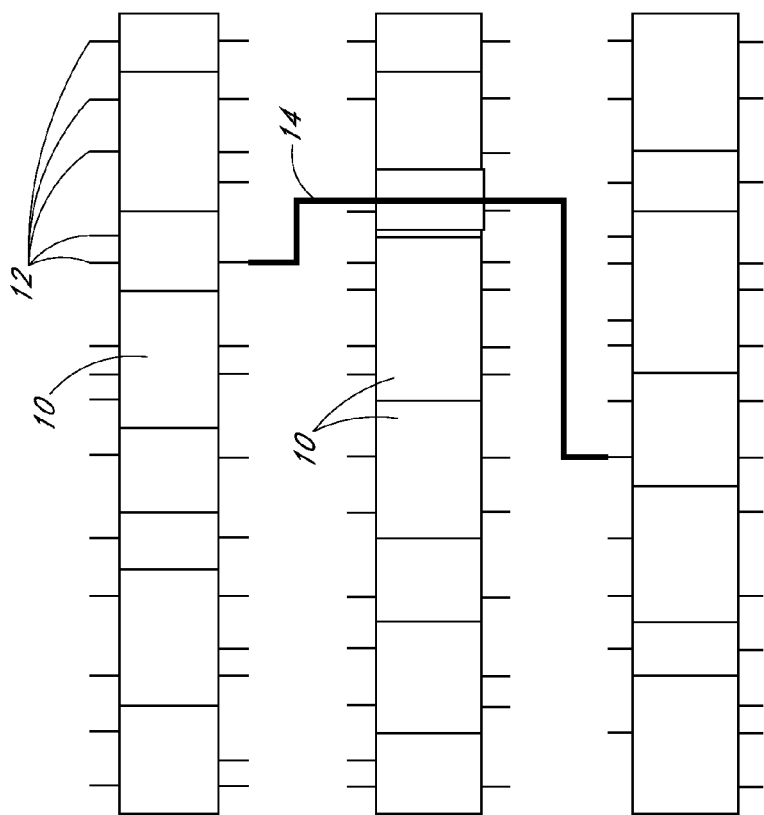
FIG. 4b illustrates a standard cell VLSI surface.
Figure 4A:
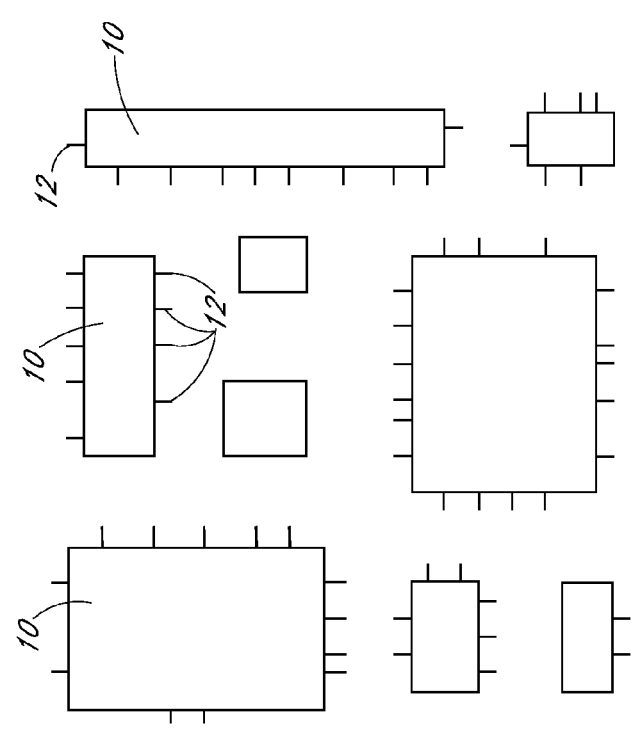
FIG. 4a illustrates a custom VLSI surface.
Figure 4C:
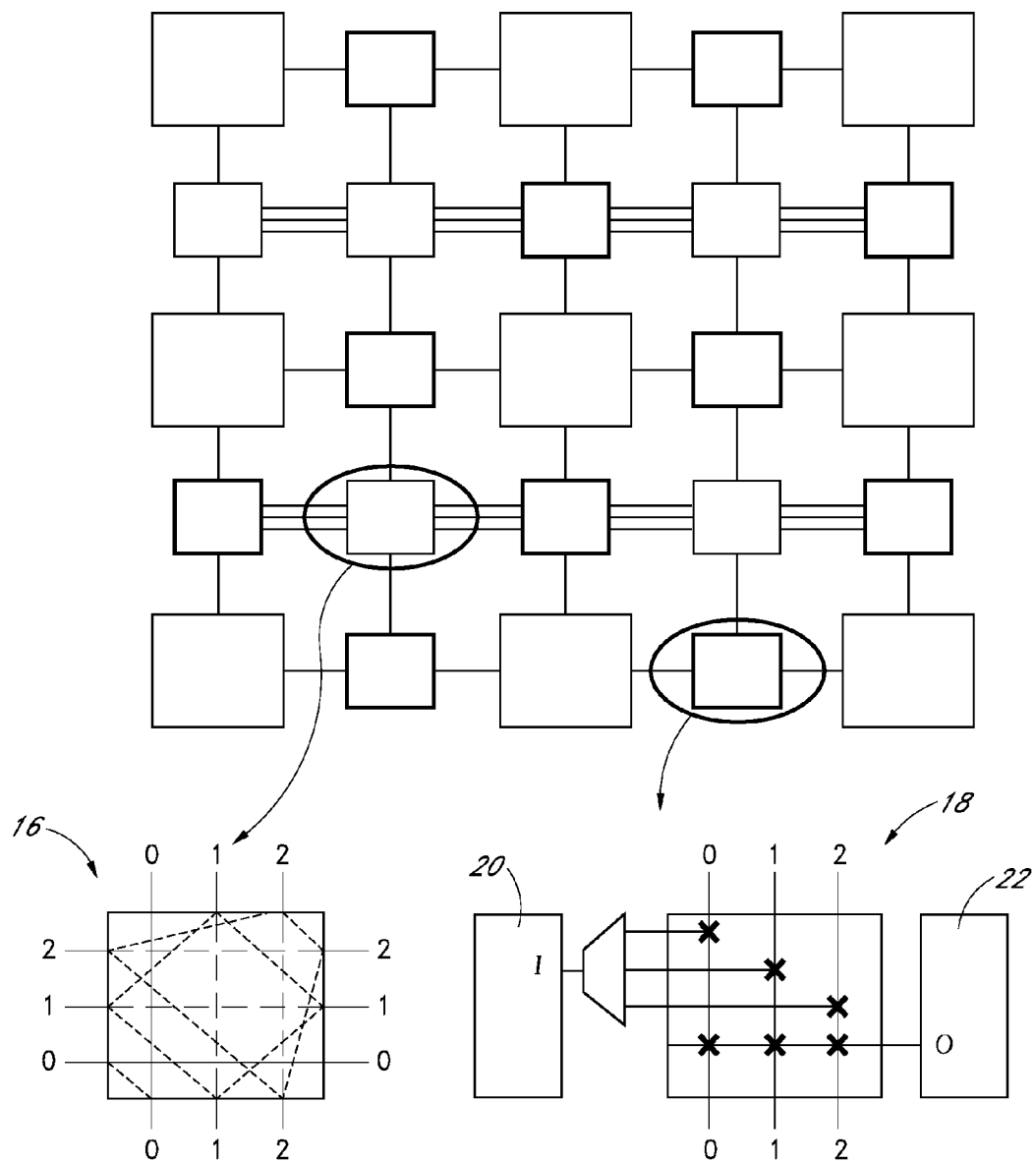
FIG. 4c illustrates a Fine-Grain Reconfigurable Array.

FIG. 4a illustrates a custom VLSI surface, wherein processor units 10 can be disposed in selected locations for later connection. The processor units 10 typically comprise a plurality of connection ports 12 for forming nets. FIG. 4b illustrates a standard-cell VLSI surface, wherein processor units 10 can be disposed in serial lines. A connection 14 passing through a line of processor units 10 can be seen. FIG. 4c illustrates a fine-grain reconfigurable array, as seen through the detail 16 of the processor unit 10, wherein ports can be selectively reconfigured within the processor unit 10. In the detail 16, like-numbered nodes can be seen connected. Similarly, for the second detail 18 section, an input device 20 can be seen connected to an output device 22 through a sequence of like-numbered ports.

Figure 4D:
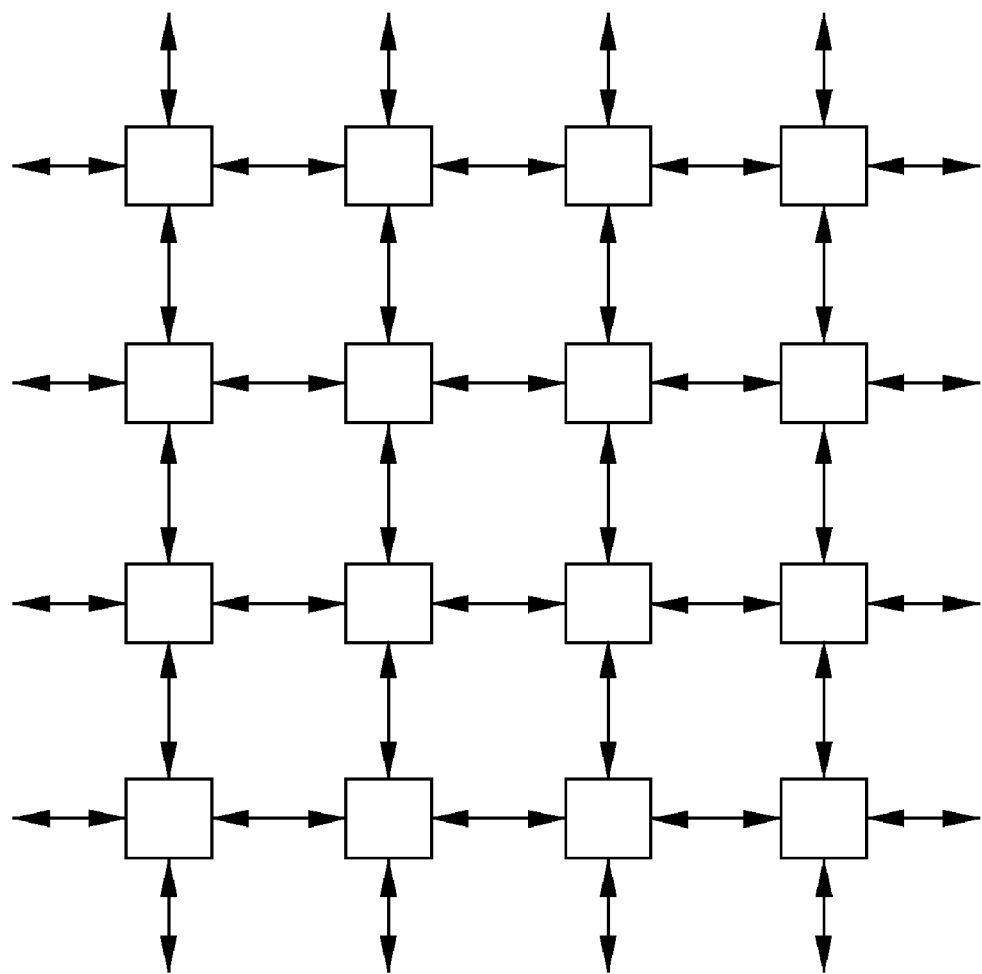
FIG. 4d illustrates a Coarse-Grain Reconfigurable Array.

FIG. 4d illustrates a coarse-grain array. In contrast to the fine-grain array, processor units can be interconnected without the ability to detail specific port nets. Accordingly, while the P&R is less complex, efficiency and adaptability of the FPGA is reduced.

For placement, given the set of modules $M=\{m_1, m_2, \ldots, m_n\}$ and the set of public pins $P_{m_i}=\{p_{m_i,1}, p_{m_i,2}, \ldots, p_{m_i,k}\}$ of module $m_i$, the set of signal nets $S=\{S_1, S_2, \ldots, S_l\}$ can be created. A signal net $S_i$ can be a set of pins that are to be wired together electrically. The signal net can contain one source pin and one or more destination pins. The architecture can be represented as a set of locations $L=\{l_1, l_2, \ldots, l_p\}$ for the purpose of placement (with $p \geq n$).

The placement problem can be described as an attempt to map each $m_i \in M$ to a unique location $l_j$ while maximizing some criterion for optimality. Another characterization of the placement problem can be to find an infective function $f:M \rightarrow L$ under the same conditions. One-dimensional placement, often the simplest application of placement, can be difficult to solve. There can be as many as $$\frac{n!}{2}$$

linear arrangements of n cells.

Accordingly, in real-life situations, where the amount of cells, or processing components, can be very high, a brute-force approach can become infeasible quickly. Such a brute-force approach could be considered to be evaluation of all possible placements. The placement problem can be solved by heuristics that give a solution of reasonable, but not necessarily superior, quality. When using heuristics, the time requirement is relatively low, a polynomial function of n.

Cost Function

A poor placement can make the subsequent routing step difficult or impossible, but a "good" placement can significantly reduce the difficulty of the routing step. Placement also can influence the performance of a circuit because it can fix the minimum length of the interconnection and, thus, the wiring delay. Wiring delay can be an important factor in the final performance of the design. Thus, modelling the interconnection can have far-reaching results. Improving interconnections can be achieved according to several non-limiting criteria, including minimization of the total wire length, minimization of the maximum cut, minimization of the maximum density, minimization of the total area after placement, and maximization of performance output. Several non-limiting approaches to minimizing the total wire length can be seen in FIGS. 5a-5f.

Figure 5A:
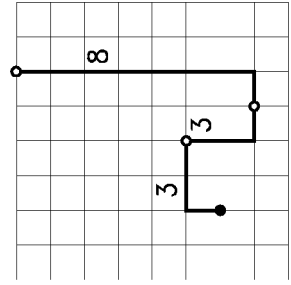
FIGS. 5a-5f illustrate a plurality of length estimating methods.
Figure 5B:
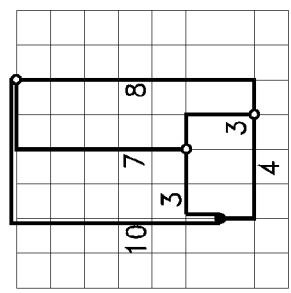

Total wire length can be measured using any of several methods. FIG. 5a illustrates semi-perimeter method, as discussed in Reference 19. In the semi-perimeter method, half the perimeter of a bounding rectangle enclosing all pins to be connected is measured. FIG. 5b illustrates the complete graph method. In the complete graph method, the number of edges in a complete graph with n vertices is n(n−1)/2. A complete graph is defined as one in which all pairs of vertices, representing pins, is connected. Since a tree in that graph has (n−1) edges, or 2/n times the number of edges in the complete graph, the wire length can be estimated from the complete graph length as $$L \approx 2/n \sum_{(i,j) \in net} \text{dist}(i, j).$$

Figure 5C:
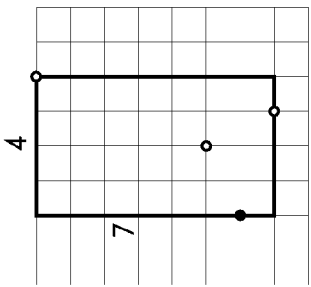
Figure 5D:
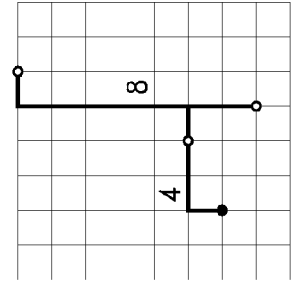
Figure 5E:
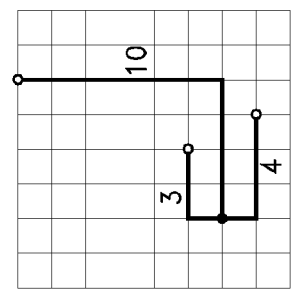

FIG. 5c illustrates the minimum chain method. In the minimum chain method, the nodes can be assumed to be on a chain. Thus, starting from a source vertex, a connection is made to the closest sink, then the next closest, and repeated until all vertices are connected. FIG. 5d illustrates the source-to-sink connection method. In this method, a source can be connected to all sinks. In most cases, the source-to-sink method can overestimate the wire length. FIG. 5e illustrates a Steiner tree approximation. A Steiner tree is the shortest path to connect a set of pins. In this method, the wire can branch at any point along its length. Any branching vertices which are not a part of the underlying layout are known as Steiner vertices. Finding a minimum Steiner tree can be a difficult or time-consuming problem. A Lee-Moore maze router is one possible heuristic solution for solving Steiner trees. Although the Steiner tree is the shortest path, the time required to solve a layout to determine the Steiner tree can outweigh the benefit received from the shortened path. This is one non-limiting example of an instance where a less-efficient routing solution can be preferred over a more efficient one because the time required to solve the more efficient solution can outweigh the efficiency benefits.

Figure 5F:
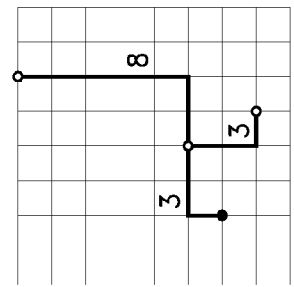

FIG. 5f illustrates a minimum spanning tree method. Unlike a Steiner tree, branching is only allowed at the pin locations, without the addition of new vertices. Algorithms can be used to find the minimum spanning tree in polynomial time.

Minimization of the maximum cut can be a measure of the number of nets crossing certain cut lines in the reconfigurable array. The smaller the number of nets crossing a given cut line can result in a more optimal solution. Minimization of the maximum density of nets is another method used to evaluated placement solutions. Density can be computed as the ratio of the number of nets in a region to the capacity of interconnections in that region.

Minimization of the total area after placement can be understood as a packing problem. Specifically, a more optimal placement will result in smaller area of placement. Maximization of performance by reducing the longest combinatorial delay between an input and an output pin can be another method of determining an optimal placement solution.

Enumeration or sequential methods can find an optimal placement in the entire solution space. They are usually only suitable when a small amount of modules is to be placed, however, because the computational time can be prohibitive. The heuristic approaches to placement fall into either constructive or iterative categories.

Enumeration Methods

A globally optimal solution can be found by evaluating the placement cost for all possible combinations exhaustively, using a depth-first or breadth-first search on a decision tree with nodes representing placement choices. The number of combinations, however, grows exponentially with the number of modules. Accordingly, this approach can be infeasible for all but the smallest of placement problems.

When considering the computational complexity of placing N modules or processing units in M possible places, for the first module there are M possible placement choices, for the second module M−1 and so on, with M−N+1 possible choices for the Nth module. Thus, the computation time grows on the order of $$O\left(\frac{M!}{(M-N)!}\right).$$

This quickly can become infeasible, especially for dense placements (N≈M). At a rate of 1 billion checks per second, it would take approximately the age of the universe to evaluate all placements for M=32 and N=20. The memory requirement for N modules is O(N), because memory is only required to store the chosen placement for every module.

Branch-And-Bound Algorithms

To cope with the size of some solution spaces, a class of algorithms known as branch-and-bound algorithms[8] can be utilized. However, branch-and-bound placement is only effective for a relatively small amount of modules (N<10). For more than 10 modules, it can be necessary to apply the algorithm hierarchically[27]. In a branch-and-bound method, a search over all possible placements, or the feasible region, can be accomplished according to a decision tree. The nodes of the tree can correspond to partial placements. A partial placement can be defined as a placement solution where the position of some modules is fixed and the position of others is not. Leaf nodes to the tree can be viewed as complete placements. The method of traversing the tree can be decided in step 5 of the algorithm. A simple depth-first search is typically optimal because it has moderate memory requirements.

In each node, a branch can be made for each possible placement choice for a module. Thus, the search region can be limited to a subset of the original problem in every branch. Additionally, for every node, a lower bound for the partial solution corresponding to the node should be available. If the lower bound exceeds the currently-known lowest-cost placement solution, or incumbent solution, the search along the branch is terminated, or bounded. The incumbent solution is one whose associated cost forms an upper bound on the optimal cost of known solutions. The subset corresponding to the branch that is discarded can be described as having been fathomed, or pruned in tree terminology. Thus, by pruning unnecessary branches in the decision tree, the search space can be reduced effectively, provided that the evaluation of the lower-bound function is not more computationally expensive than exhaustively searching the subset to which it refers.

The computational requirement for a branch-and-bound algorithm can depend on the lower-bound function. The highest cost can be the same as for the exhaustive search for those cases where the branch-and-bound algorithm completes a mapping of all placements. A description of the branch-and-bound algorithm using pseudocode can be:

| Branch-and-bound algorithm |
| --- |
| 1   Algorithm BranchAndBound |
| 2   Initialize bestCost := cost of known placement |
| 3   Initialize remainingSolutions := set of possible solutions |
| 4   If remainingSolutions = empty, exit |
| 5   Branch: Select an element Ri of remainingSolutions and partition it into subsets Sj |
| 6   Bound: For every Sj, calculate lowerBound(Sj) |
| 7   For every Sj: If Sj consists of a single point then |
| 8       If lowerBound(Sj) < bestCost |
| 9           bestCost := lowerBound(Sj) |
| 10          incumbentSolution := Sj |
| 11  |
| 12  Fathom: Delete any member Ri of remainingSolutions for which lowerBound(Ri) > bestCost |
| 13  Go back to step 4 |

Constructive Placement Algorithms

A constructive placement algorithm can construct a solution by placing one cell at a time, improving on a partial solution as it progresses. Two non-limiting examples of constructive placement algorithms are min-cut and cluster growth.

Figure 6:
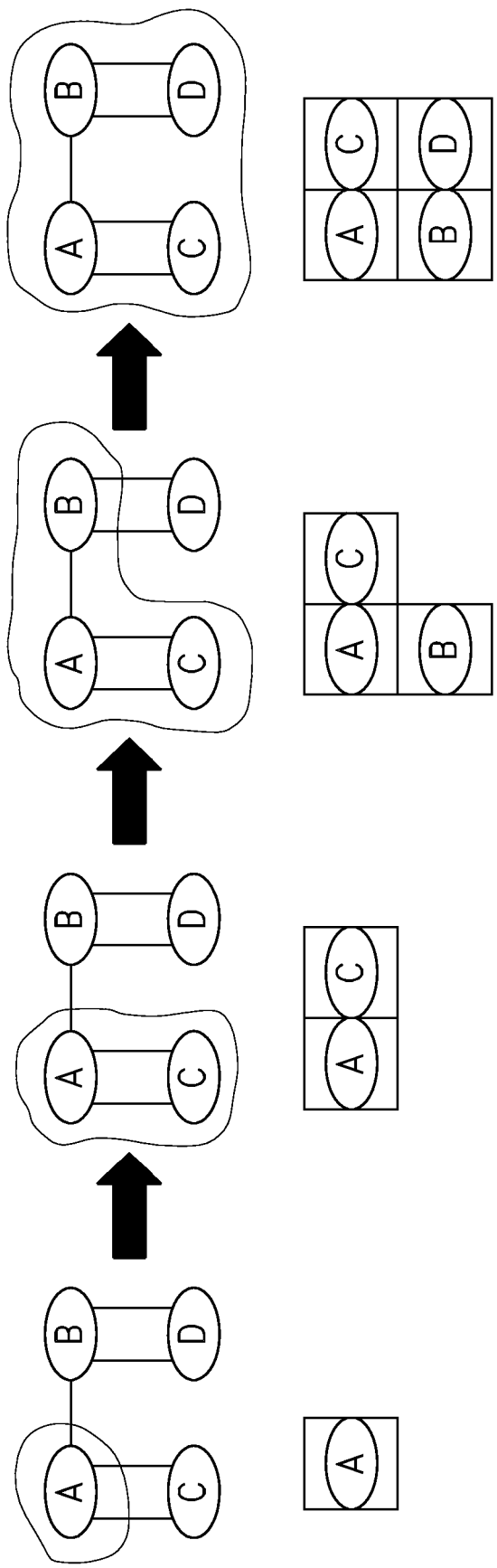
FIG. 6 illustrates an embodiment of an implementation of a Cluster Growth algorithm.

As can be seen represented in FIG. 6, cluster growth algorithms can improve a partial solution by performing two functions called "SELECT" and "PLACE" repeatedly until all modules are placed. The SELECT function can determine the order in which unplaced modules are added to the existing placement. The order can be determined by how strongly the unplaced modules are connected to the placed components. This is known as a maximum connectivity selection strategy. A psuedocode implementation of the algorithm is shown below.

The PLACE function finds the best position for the module chosen by SELECT: it calculates the score for every possible position adjacent to the current partial placement. The module is then placed at the candidate position with the highest score.

FIG. 6 illustrates a cluster growth algorithm which operates by selecting module A first, adding module C, then adding module B, before completing the cluster with module D.

The growing cluster is illustrated in the upper portion of FIG. 6 with connections, and the cluster is illustrated in the lower portion of FIG. 6 as the modules are placed.

| |
| --- |
| 1   Algorithm ClusterGrowthPlacement: |
| 2   seedComponents := select components for seed placement |
| 3   currentPlacement := PLACE(seedComponents) |
| 4   While not all components placed |
| 5       selectedComponent := SELECT(currentPlacement) |
| 6       currentPlacement := PLACE(selectedComponent) |

The algorithm can execute on the order of $O(N.K.fmax)$, where N is the number of modules, K is the number of pins per block and $f$ max is the maximum fan-out for any net. The results can be less than desirable, but the resulting placement can be used as a starting point for application of other algorithms. For example, Reference 12 discloses a method of improving the solution of cluster growth by application of simulated annealing. According to Reference 12, placement of 100,000 modules can be accomplished in 10 seconds, with a decrease in quality of placement of 33%.

Cluster growth can be described to consider the placement from a bottom-up approach. That is it considers the most detailed level of abstraction first, and expands. By contrast, min-cut partitioning techniques can operate from a top-down perspective[20].

Figure 7:
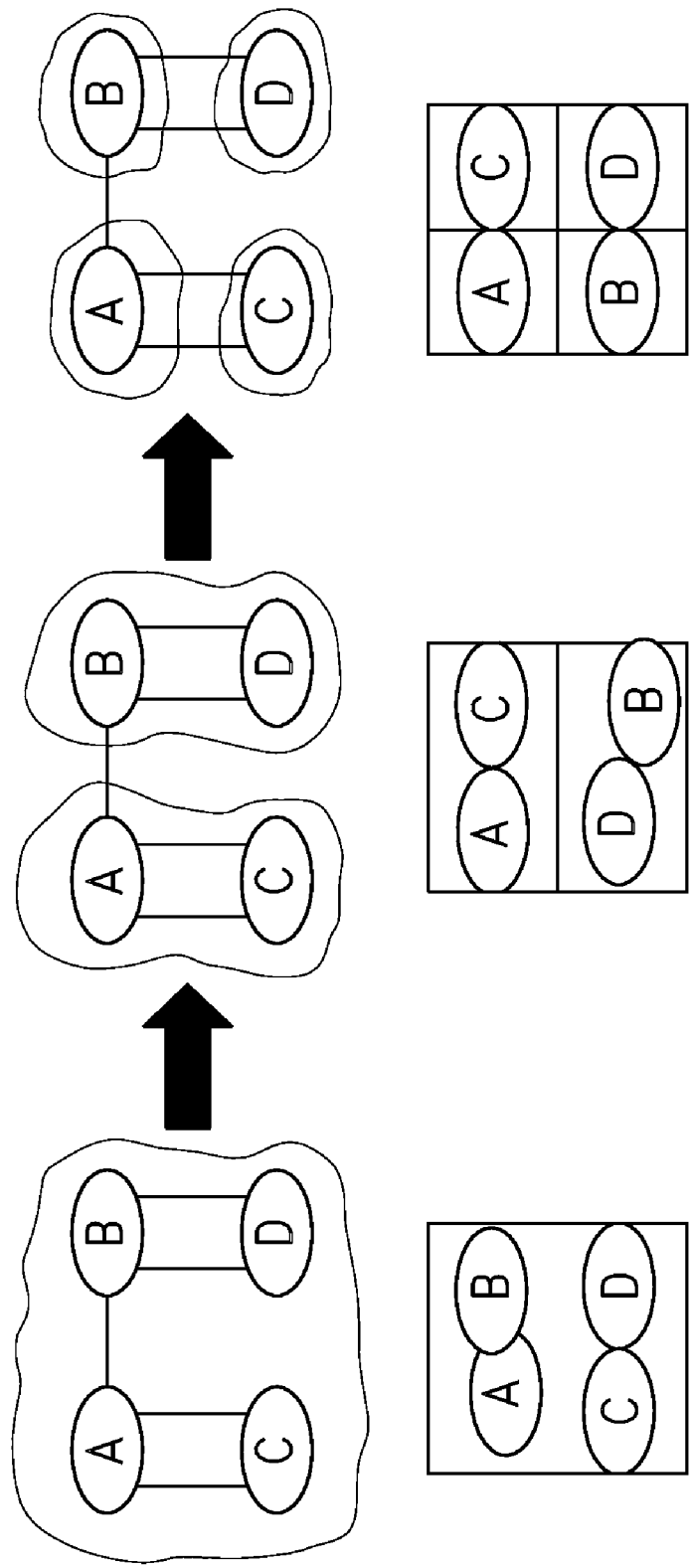
FIG. 7 illustrates an embodiment of an implementation of a Min-cut algorithm.

The modules can be repeatedly partitioned into blocks of the layout space, as illustrated in FIG. 7. Partitioning can be done such that the number of nets crossing the partition boundaries is minimized. The process of dividing blocks into smaller blocks and partitioning the modules into the reduced blocks stops when the number of modules in the partitions becomes less than a predetermined value. Subsequently, the modules in every partition are placed inside their corresponding block. Placement can be an easier problem to solve than the division of blocks.

Min-cut partitioning can be implemented through various different parameters. As some non-limiting examples, the predetermined value can be altered, the method of generation of cut lines can be altered, and how connections to modules external to the block are handled can be altered. Partitioning can be done using the Kernighan-Lin algorithm in $O(N^2 \log N)$ time. Reference 22 presents an $O(E)$ for the min-cut graph partitioning step, with E the number of graph edges. Accordingly, the order can be reduced to $O(N^2)$ for N modules. For the complete algorithm, the computational complexity can be determined by assuming that the runtime for placement of 1 module is constant, and that the runtime for placement of $N=2^k$ modules is given by $$T(N) = aN^2 + 2T\left(\frac{N}{2}\right),$$

or $$\frac{T(N)}{N^2} = a + \frac{1}{2}\frac{T\left(\frac{N}{2}\right)}{\left(\frac{N}{2}\right)^2}.$$

Recursively expanding the rightmost term to results in $$\frac{T(N)}{N^2} = a + \frac{1}{2}a + \frac{1}{4}a + \frac{1}{8}a + \ldots + \frac{1}{N}T(1) = 2a\left(1 - \frac{1}{N}\right) + \frac{T(1)}{N}.$$

Accordingly, $T(N)=O(N^2)$. Reference 31 ranks min-cut algorithms as a first choice when evaluated from a perspective of computation cost to performance ratio. A pseudocode implementation of the algorithm is shown below.

```
1 Algorithm MinCutPlacement(N, n, C):
2    N is the layout surface
3    n the number of modules to be placed
4    C the connectivity matrix
5    If n <= moduleCountThreshold
6        PlaceCells(N, n, C)
7    Else
8        (N1, N2) = CutSurface(N)
9        (n1, C1), (n2, C2) = Partition(N, C)
10       MinCutPlacement(n1, C1)
11       MinCutPlacement(n2, C2)
```

Iterative Placement Algorithms

Iterative placement algorithms can improve a complete solution by modifying an existing, complete placement. Some non-limiting examples are simulated annealing[11, 19, 34], force-directed methods[23, 24] and genetic algorithms[14]. Simulated annealing can have high placement quality, but operates stochastically, and not deterministically, which can result in different optimal placements on successive implementations of the algorithm. Additionally, simulated annealing can require a large amount of computation time. Reference 12 discloses "ultra-fast placement," an approach combining clustering and hierarchical simulated annealing to improve placement time. Reference 12 discloses a speed improvement of a factor of fifty, at the cost of a 33% decrease in placement quality.

Iteration can be performed until some stopping criterion is met. The criterion can be absolute or relative improvement in the placement cost function, or the time expended in the iterative process.

Iterative processes can have 3 main phases: SELECT, MOVE and SCORE. In the SELECT phase, the modules that are to participate in movement can be chosen. The MOVE phase can determine new locations for the selected modules. The SCORE phase can be invoked to measure the quality of the new placement.

Simulated annealing

Annealing is a heat treatment in which a material, typically a metal, is heated to a high temperature for an extended period of time and then slowly cooled into a lower-energy crystallized state. Simulated annealing emulates the physics of annealing to find low-cost solutions to certain optimization problems[29].

The simulated annealing method can start from a random initial placement. An altered placement and the resulting change in placement cost can be calculated. If the new cost is lower than the original cost, the move can be accepted. If the newer cost is higher, the move can be accepted with a probability $$e^{\frac{-\Delta c}{T}},$$

where $\Delta c$ represents the difference in cost. This can be analogous to a Maxwell-Boltzmann distribution with effective temperature T in physics. The probability can be evaluated by generating a random number between 0 and 1 and accepting the move if the number is smaller than $$e^{\frac{-\Delta c}{T}}.$$

At each "temperature," the simulation must proceed long enough for the system to reach a steady state. The "temperature" can be evaluated as the amount of variation in the iteration. As the simulated temperature T decreases, the probability of accepting an increased cost decreases.

An annealing schedule specifies a beginning temperature, a temperature decrement function, an equilibrium condition at each temperature and a convergence or "frozen" condition. A pseudocode implementation of the algorithm is shown below.

```
1 Algorithm SimulatedAnnealing
2    T := startingTemperature
3    currentPlacement := random initial placement
4    currentCost := cost of currentPlacement
5    While freezing point not reached
6        While equilibrium at temperature T not reached
7            selectedComponents := SELECT random modules
8            trialPlacement := MOVE selectedComponents randomly
9            trialCost := cost of trialPlacement
10           dC := trialCost - currentCost
11           If (dC < 0) or (random number [0,1] < exp(-dC/T)) Then
12               currentcost := trialCost
13               currentPlacement := trialPlacement
14       Update temperature T
```

Simulated annealing can produce high-quality results at the cost of a very long runtime. In practice, the speed of the algorithm can be increased by replacing the equilibrium check with a fixed number of iterations for every temperature and by using an exponential temperature update function $T_k = d \cdot T_{-1}$ with $0 < d < 1$. TimberWolf[12] and VPR[19] are two examples of P&R packages that use simulated annealing.

The memory complexity is $O(N)$ with N being the number of modules to place. The computational complexity is $O(I)$ with I the user-chosen number of iterations. Computational complexity can to be high enough to ensure ergodicity, that is, that the final solution is independent of the initial conditions. A recommended number of moves per module for every temperature disclosed by Reference 35 is $O(N^{4/3})$.

Force-directed Placement

Figure 8B:
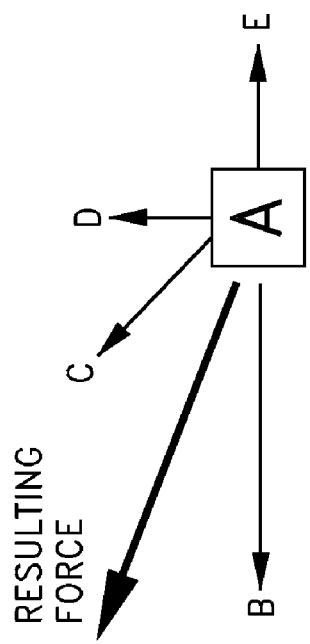
FIGS. 8A and 8B depict visualizations of an applied Force-directed algorithm.
Figure 8A:
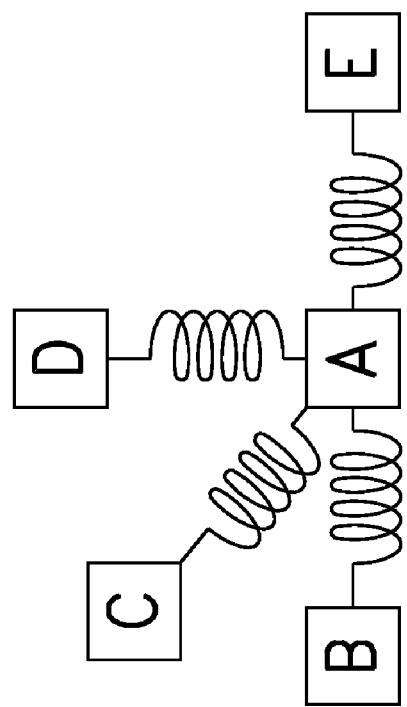

The force-directed algorithm is based on Hooke's law. According to Hooke's law, the force in a spring as proportional to the amount of compression or stretching that is applied to it. FIGS. 8a and 8b illustrate an application of Hooke's law, whereby modules B, C, D, and E exert a force on module A. The forces exerted by modules B-E are graphically represented as springs in the star-wire model of FIG. 8a, and schematically represented as vector forces in FIG. 8b. The Resulting Force is the result of the vector sum of the module forces.

The force-directed method can model the "forces" exerted by modules connected by nets. It is the oldest heuristic applied to the placement problem[13, 23, 24]. The force is proportional to the deflection of the spring, modified by a spring constant k. The spring constant k is given by the interconnection cost between modules. To simplify the computation of forces, the star wire model can be used for the interconnect[13]. A pseudocode implementation of the algorithm is shown below.

```
1 Algorithm ForceDirectedPlacement
2 Compute connectivity for each module
3 Sort modules in order of decreasing connectivity in L
4 While iterationCount < iterationLimit
5    seed := next module from L
6    Set seed position to VACANT
7    While endRipple = FALSE
8       Compute minimum force target location of seed
9       Switch(target location)
10         case VACANT:
11            Move seed to target location and lock it
12            endRipple := TRUE; abortCount := 0
13         case SAME AS PRESENT LOCATION:
14            endRipple := TRUE; abortCount := 0
15         case LOCKED:
16            Move selected module to nearest VACANT location
17            endRipple := TRUE; abortCount := abortCount + 1
18            If abortCount > abortLimit
19               unlock all module locations
20               iterationCount := iterationCount + 1
21         case OCCUPIED and not LOCKED:
22            Move seed to target location and LOCK it
23            Set seed := module originally in target location
24            endRipple := FALSE; abortCount = 0
```

In equilibrium, the modules can occupy a position such that the total tension from all other modules is at a minimum. Thus, the placement problem can be reduced to solving a set of linear equations.

Starting from an initial placement, the SELECT function can choose the most promising, first module, and the MOVE function can place it in its minimum-force location. The most promising module can be one that has the highest total force F, or lies on a critical, or congested, path. If the target location is already occupied by another, second module, special action can be taken. A popular option is the "ripple move", where the first module can be placed in the occupied location, and the second module can be moved to its minimum-force location, and repeated for all modules. The "ripple move" moniker derives from the motion of modules propagating as a ripple through the layout space. Another non-limiting example of a solution is the "chain move", where the second module is moved to an adjacent location. The simplest solution can be to move the first module to a free location close to the second module when the location for the second module is occupied.

Iteration can converge quickly for force-directed placement, but the algorithm can terminate even when many productive changes could still be found. The algorithm runs on the order of $O(I)$, where I is the number of iterations.

Genetic Algorithm

The genetic algorithm emulates the biological evolution process to iterate towards an optimal solution. The genetic algorithm can also be referred to as "simulated evolution". Like simulated annealing, it can be used to solve problems about which little is known. For applications with problem-specific knowledge, heuristics can produce superior results.

Starting from an initial set or population of random placements known as individuals, several iterations can be performed generating successive generations. An individual can be composed of a string of symbols known as a chromosome. The symbols can be considered as genes. The chromosome can represent a solution to the placement problem. A set of genes that make up a partial solution can be known as a schema. A pseudocode implementation of the algorithm is shown below.

```
1 Algorithm GeneticPlacement
2 Randomly generate initial population of Np individuals
3 For j := 1 to Np
4    Evaluate fitness of population member j (1/placement cost)
5 For i := 1 to numberOfGenerations
6    For j := 1 to numberOfOffspring
7       Choose parents x,y, probability proportional to fitness
8       offspring j := CrossOverOffspring(x, y)
9       For k := 1 to Np
10         With probability Mr apply Mutation(population[k])
11      For k := 1 to Np
12         With probability Ir apply Inversion(population[k])
13      Evaluate fitness of offspring j
14   population := SelectFittest(population, offspring, Np)
```

In each iteration, or generation, the individuals in the current population are evaluated using some measure of "fitness". One value for fitness can be 1/(placement cost). Based on the fitness value, two individuals can be selected from the population as "parents." Subsequently, a number of genetic operations can be performed on the parents to generate new individual solutions called offspring. Common operators can include, without limitation, crossover, mutation and inversion.

Crossover can be an inheritance mechanism where the offspring inherit some of the characteristics from the parents. Crossover can select a random cut point in the chromosome and generate an offspring by combining the sequence of genes on the left hand side of the cut point of one parent with the sequence of genes on the right hand side of the cut point of the other parent. A check can be run to ensure the resulting placement function is still valid, that is, still an injective function $f:M \rightarrow L$. For example, a Partially Mapped Crossover (PMX) can scan for duplicate genes in the offspring and replace them.

Mutation can produce incremental random changes in the offspring generated by the crossover to avoid loss of diversity in the population. Mutation can be controlled by a mutation rate $M_r$. If $M_r$ is too high, offspring can lose resemblance to their parents and the genetic algorithm can lose its ability to learn from the history of the search. In the inversion operation (with inversion rate $I_r$), two cut points can be randomly chosen in the chromosome, and the genes after the first cut and before the second are swapped.

Compared to simulated annealing, the genetic algorithm uses more memory, as required to store the population. The quality of the results can be similar. A genetic algorithm, however, can achieve very rapid improvements in early iterations, followed by a decrease in the rate of improvement. The opposite behavior can be observed for simulated annealing[31]. Thus, the genetic algorithm can be used when computational time is required to be sacrificed to preserve placement quality. The computational complexity is $O(N_p G)$ with $N_p$ the population size and G the number of generations.

Routing

Figure 9:
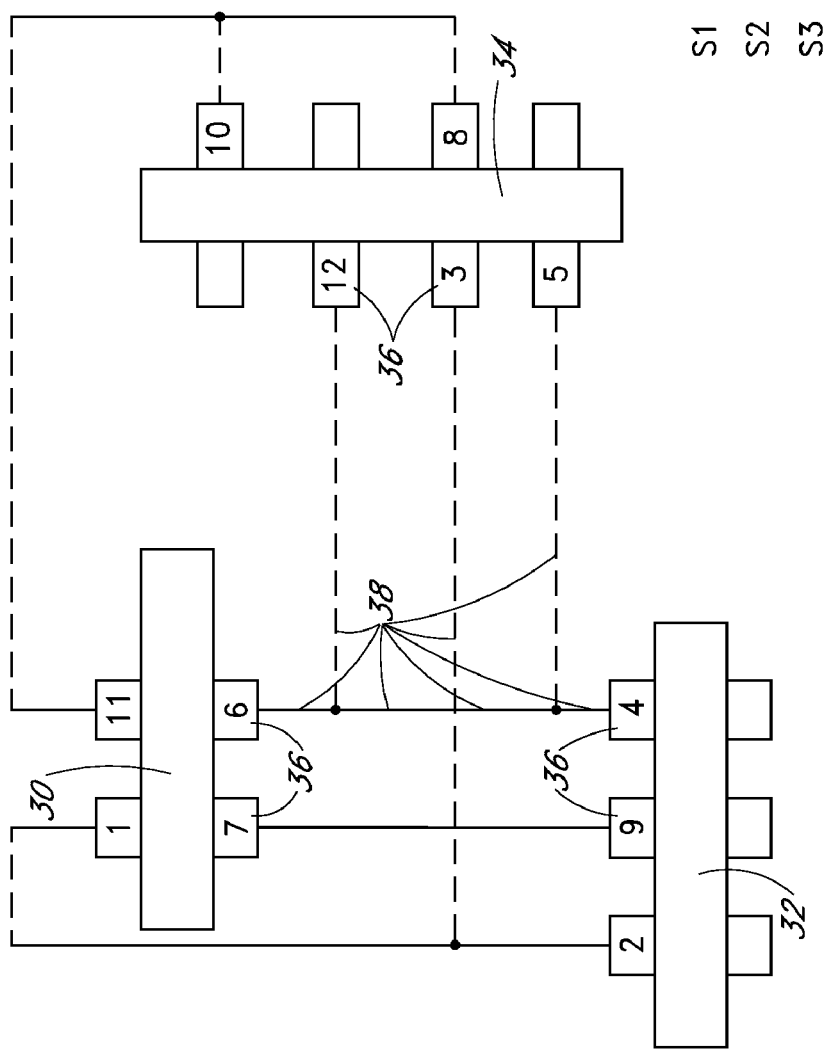
FIG. 9 depicts a visualization of signal net routing.

The routing phase can follow placement in the design process. Given the set of signal nets $S=\{S_1, S_2, \ldots, S_1\}$ and the mapping function $f:M \rightarrow L$ of modules to locations as a result of the placement process, routing can be defined as the attempt to find suitable paths in the layout space to ensure the pins of every signal net are connected properly. FIG. 9 illustrates a mapping of nets $S_1$-$S_4$, as defined in the legend therein. A first module 30 is connected to a second module 32 and a third module 34. The modules 30, 32, 34 can have a plurality of ports 36, which communicate data through net connections 38.

Routing packages can solve routing in two steps: first, a global routing phase can be completed, where nets can be assigned to routing areas such as channels or switchboxes. The actual layout of the wires does not have to be not specified. The subsequent detailed routing phase can map the nets inside the routing areas to actual routing tracks inside them, resulting in an actual geometric layout for every net. For sufficiently simple problems, combined routing algorithms can determine the complete routing path in one step.

Routing of Single Nets

A class of algorithms known as geometry searches can start from a geometric description of the layout space. Geometric descriptions can be known as grid graph models. They can be used as detailed routers.

The Lee-Moore algorithm[2] can model the interconnection area as a grid with obstacles in random positions. This algorithm is correspondingly known as a maze router, or breadth-first search router. It can find a minimum cost path if one exists[2]. The Lee-Moore algorithm finds the minimum cost path at the cost of a rather large memory usage, on the order of $O(N^2)$ for an N×N grid and a running time of $O(N^2)$.

Figures 10, 11:
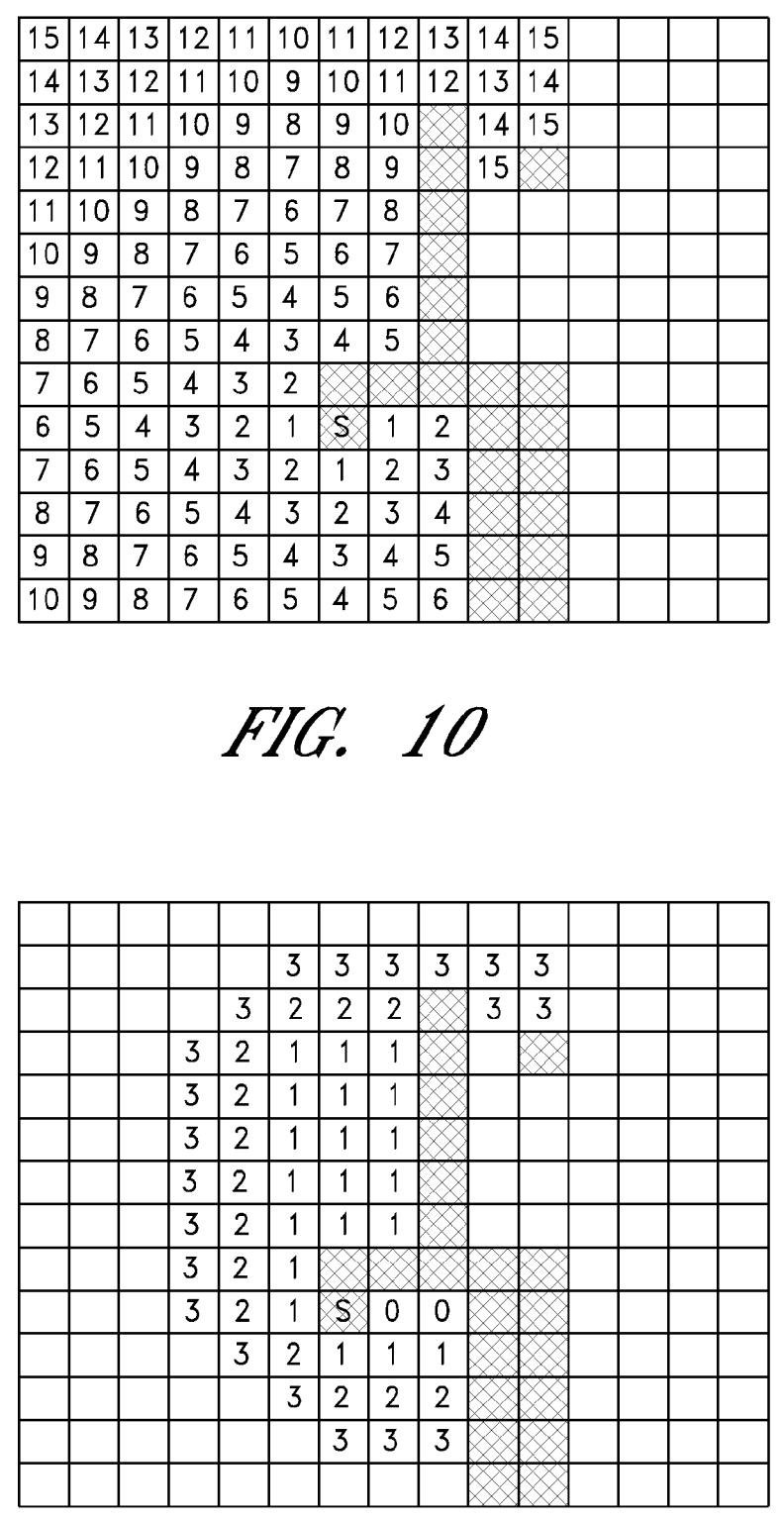

FIG. 10 illustrates a visualization of the Lee-Moore algorithm. A "wave" can be propagated from the source to the closest sink. All cells adjacent to cell S labelled i are labelled as i+1, as illustrated in FIG. 10. Whenever a cell is encountered that is already labelled, its cost can be remarked only when the new cost is less than the cost already on the cell. When a sink is found, the path to the source is retraced and returned as the shortest path. When routing multi-terminal nets, all routing cells from the source to the closest sink can be used to propagate new waves, until all sinks are found. This extension is a heuristic solution to a minimum-rectilinear Steiner tree in the maze.

Hadlock's algorithm can speed up the method by using a detour number instead of a wavefront label for routing segments[24]. The detour number for a cell can indicate the number of grid cells that the cell is directed away from its target. It can also find the shortest path in a grid, but substantially reduces the number of searched cells. FIG. 11 illustrates the incremental cell numbering. For a cell labeled i, the adjacent cells directed away from the target are labeled i+1, the others i.

Figure 12:
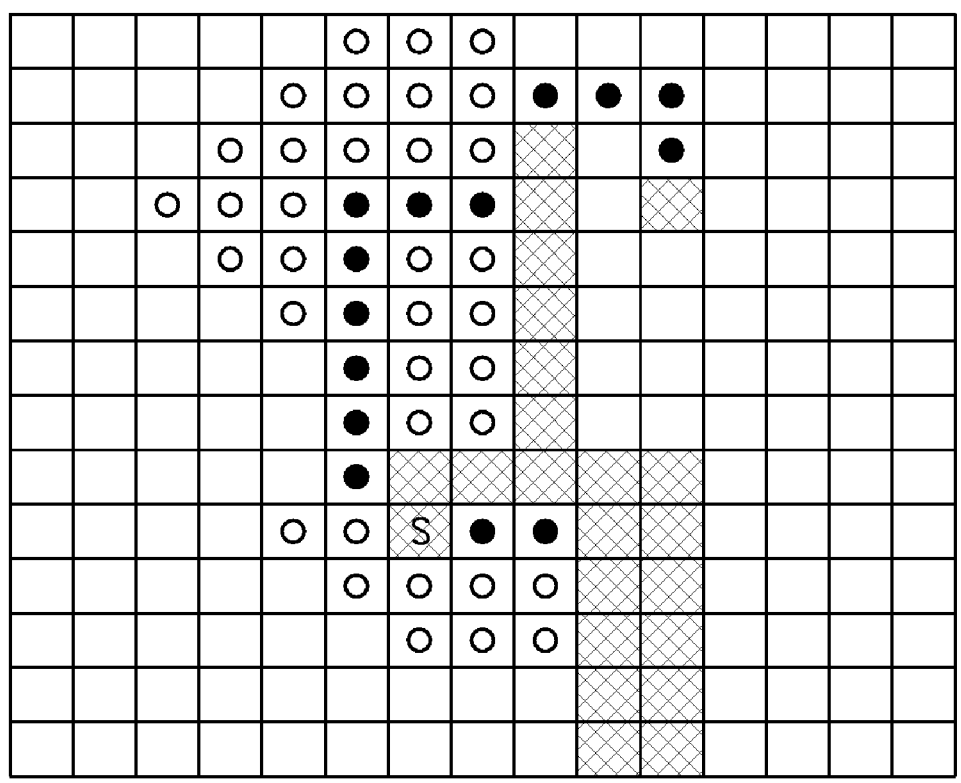
FIG. 12 depicts a visualization of routing using Soukup's algorithm.

Soukup's algorithm can increase the speed of the search process by first performing a depth-first search toward the sink until an obstacle is encountered[33]. FIG. 12 illustrates a representation of the Soukup's algorithm's search. Then, a breadth-first search, such as a Lee-Moore search, can be used to "bubble" around the obstacle. Soukup's algorithm can find a path if one exists, though not necessarily the shortest.

A second class of geometric algorithms is the class of line-search algorithms. Line-search algorithms can represent the layout space by depicting only by the obstacles inside it. Line-search algorithms are based on the observation that if there are no obstacles in the layout area, the intersection of a horizontal line drawn through the source and a vertical line through the target can define a shortest Manhattan distance path going through the intersection point of both lines.

Figure 13:
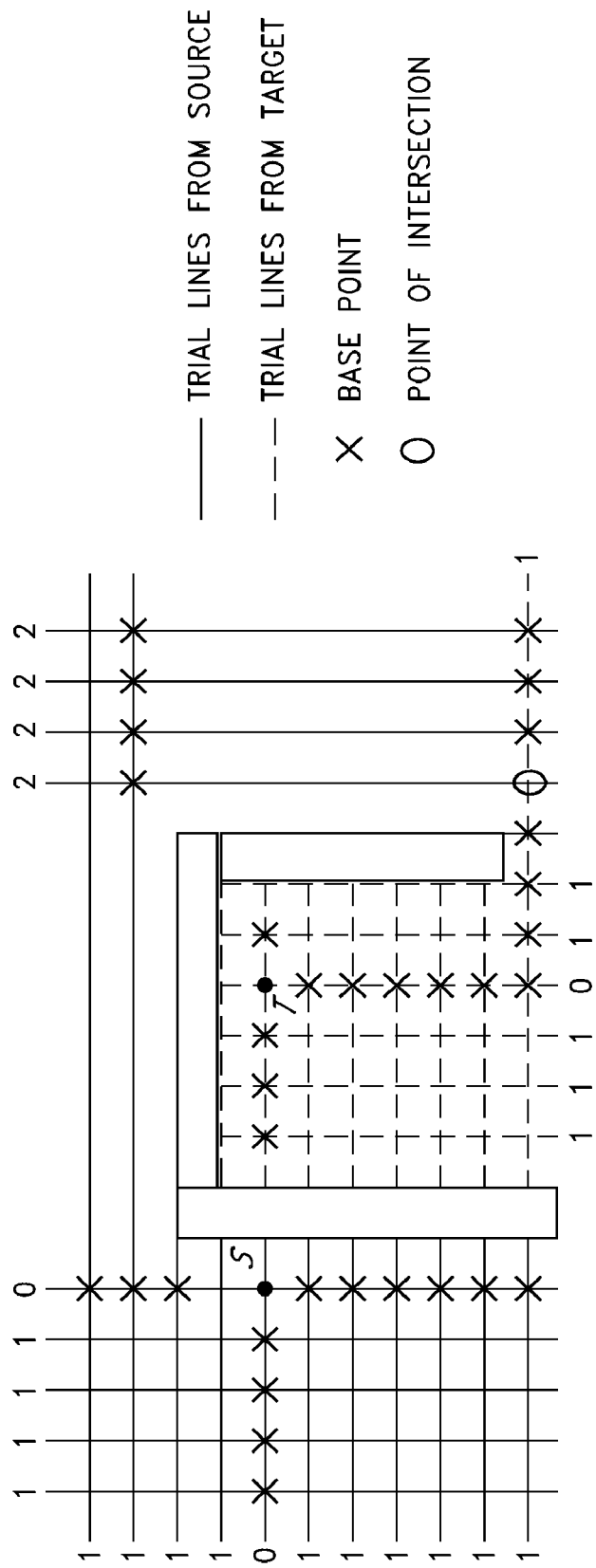
FIG. 13 depicts a visualization of routing using the Mikami-Tabuchi algorithm.

The Mikami-Tabuchi algorithm can start by drawing a horizontal and vertical line through both source and target, as illustrated in FIG. 13. These 4 lines are called trial lines of level 0. Then, during every iteration i, grid points, or base points, can be indicated on the trial lines of level i. Starting from these base points, new trial lines of level i+1 are generated perpendicular to the trial line i. When a trial line from source and a trial line from the target intersect, a path has been found. The Mikami-Tabuchi algorithm can find a path if one exists.

Figure 14:
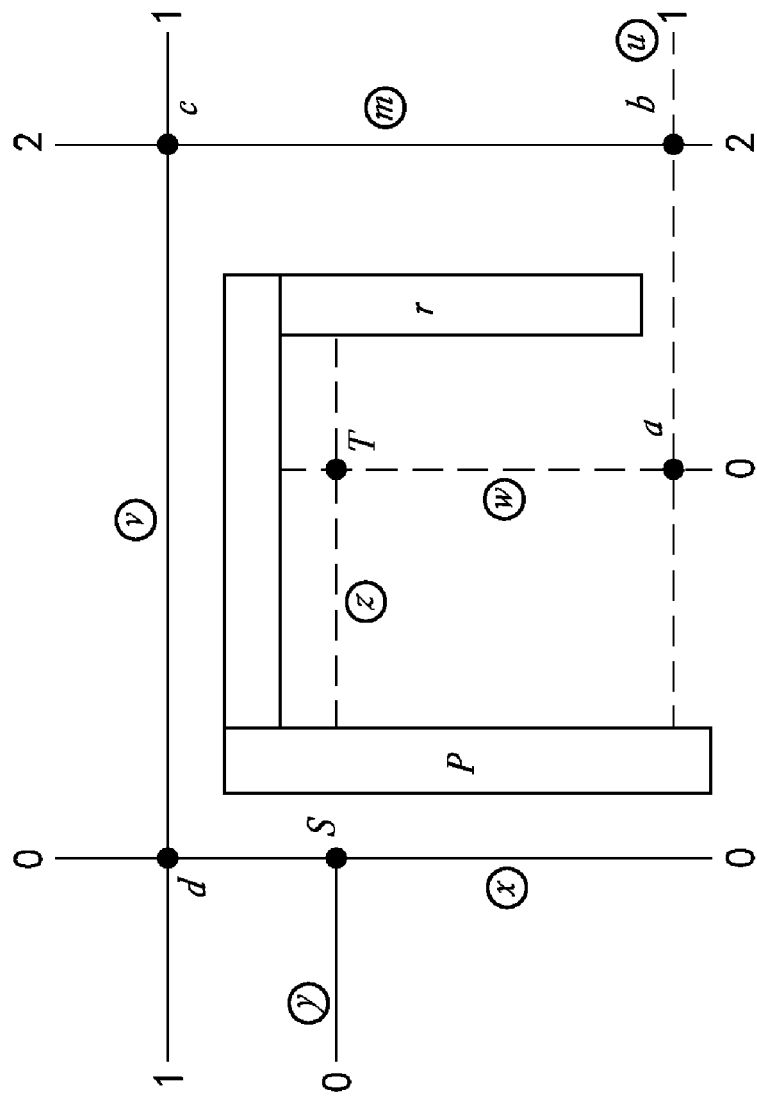
FIG. 14 depicts a visualization of routing using Hightower's algorithm.

Hightower's algorithm is similar to Mikami-Tabuchi, except that instead of generating all lines perpendicular to a trial line, Hightower's algorithm can consider only the lines that are extendable beyond the obstacle which blocked the preceding trial lines, as illustrated in FIG. 14. The Hightower algorithm can fail to find a route even if one exists.

Both Hightower's and Mikami-Tabuchi's algorith run have a time and memory complexity on the order of O(L), proportional to the number of generated lines L.

Graph Searches

When the layout space is not easily represented as a grid, a graph representation can be more appropriate, as in the non-limiting example of fine- and coarse-grain reconfigurable architectures. Several graph representations of the layout geometry can be made. Some non-limiting examples include a grid graph model (GGM), several of which were described above, channel intersection graphs or the routing resource graph. FIGS. 15a, 15b, and 15c illustrate GGMs.

A RRG of the architecture can be a directed graph G={V, E}[5, 30]. It can be a useful model upon which graph-based routing algorithms can be applied. The set of vertices V can contain architecture resources relevant to routing, such as module pins and routing tracks. The set of edges E can contain the switches connecting these resources. Additionally, every vertex can have an associated capacity $c_i$ and occupancy $o_i$. For successful route completion, $\forall i: o_i \leq c_i$.

Two basic approaches for graph traversal can be used to find a specific node in a graph, depth-first search (DFS) and breadth-first search (BFS). The searches can be applied to the routing problem by starting the search at the source vertex and looking for the destination vertex. BFS has a memory and computational complexity on the order of O(n+e) where e the number of edges and n the number of vertices. It can find an optimal (shortest) path. BFS and DFS can be called blind searches, or uninformed searches, because they make no assumptions about the graph to be searched. BFS and DFS do not take edge weights into account. Put another way, in BFS and DFS, edge weight is set equal to one.

DFS is also on the order of O(n+e), but it can find a node faster than BFS. There is no guarantee, however that the path that is found is the shortest one, as defined by the number of edges from the starting vertex.

Practical implementations of BFS and DFS can operate by first placing the starting vertex in a data structure, and then repeatedly taking a vertex out of the data structure and placing all of its successors in the data structure. The data structure can be implemented as a queue, such as first-in, first-out (FIFO) for BFS and as a stack, last-in, first-out (LIFO) for DFS.

The well-known Dijkstra algorithm[4] is a greedy algorithm that can be used to find the shortest path between two vertices in a weighted graph when the edge weights are restricted to be non-negative. Its operation can be similar to DFS, except that a priority queue can be used instead of a normal queue. One priority metric that can be used is the distance from the source vertex, although other priority metrics can be used. A pseudocode implementation of the Dijkstra algorithm is shown below.

1 Algorithm DijkstraShortestPath
2 /* initialization */
3 Set markedVerticesSet := {source vertex}
4 For every vertex j in the graph

```
 5   Set Dj := weight of edge from source vertex to j (infinity
       if no edge exists)
 6 /* find the next closest vertex */
 7 For j = 1 to numberOfVertices−1
 8   Find a vertex v not in markedVerticesSet with minimum Dv
 9   Add v to markedVerticesSet
10   For each vertex w not in markedVerticesSet
11     Dw = min(Dw, Dv + weight of edge from v to w)
12 /* result: all values Di containing the cost of the shortest
    path from the source to vertex i */
```

```
 1  Algorithm A*ShortestPath
 2  Place start vertex on OPEN list
 3  Take the vertex n with lowest f(n) from the OPEN list
 4  Place n in the CLOSED list
 5  For every adjacent vertex m of n
 6    If m is target: stop search
 7    Set g(m) := g(n) + weight of edge from n to m
 8    Set h(m) := estimated path cost from m to target
 9    Set f(m) := g(m) + h(m)
10    If m is in OPEN already with a lower f value: skip m
11    Else If m is in CLOSED already with a lower f: skip m
12    Else Add m to OPEN list
13  Go to 3 until target square has been found
```

Floyd's algorithm can start from a distance matrix representation of the graph and produce the shortest distance from any node in the graph to any other in $O(n^3)$. For nets connecting more than two points, a heuristic algorithm to solve the minimum Steiner tree problem can be used. Prim's minimum spanning tree algorithm, also $O(n^2)$, is very similar to Dijkstra's algorithm; a minimum spanning tree can be used to approximate the minimum Steiner tree. Pseudocode implementations of the Floyd and Prim algorithms can be found below.

```
1 Algorithm FloydShortestPath
2 Initialize the distance matrix Dij with the weight of edge i,j
   for all vertex pairs i,j (0 if i=j, infinity if no edge between i
   and j)
3 For i = 1 to numberOfVertices
4   For j = 1 to numberOfVertices
5     For k = 1 to numberOfVertices
6       Djk = min(Djk, Dji + Dik)
7 /* result: matrix Dij with shortest paths between all pairs of
   vertices i, j */
```

The set of vertices to which a shortest path has been found is kept in "markedVerticesSet." The Dijkstra algorithm's worst case running time for a graph with n nodes can be $O(n^2)$. It can generate the shortest distance paths to all other nodes in the graph as a by-product.

```
 1 Algorithm PrimMinimumSpanningTree
 2 Set minSpanningTree := {random start node in graph}
 3 For every vertex j in the graph
 5   Set Dj := weight of edge from source vertex to j (infinity
       if no edge exists)
 6 For j = 1 to numberOfVertices−1
 8   Find a vertex v not in minSpanningTree with minimum Dv
 9   Add v to minSpanningTree
10   For each vertex w not in minSpanningTree
11     Dw = min(Dw, weight of edge from v to w)
```

A heuristic from the field of Artificial Intelligence is the A* algorithm[7]. It is shown in Reference 21 that the Lee-Moore maze router is a special case of A*[7]. A* is a branch-and-bound type search. It can evaluate a function $f(n)=g(n)+h(n)$ in every vertex. $g(n)$ can be the cost of the path up until vertex n. $h(n)$ can be an estimation of the path cost to the destination vertex. The algorithm can find the shortest path if $h(n)$ is a lower bound on the actual path cost. As one non-limiting example, if $h(n)$ is the Manhattan distance from n to the destination vertex, the algorithm can find the shortest path. If $h(n)=0$, then A* can result in performance of Dijkstra's algorithm. Careful selection of the heuristic function can allow A* to find the target vertex faster by reducing the search space. The Hadlock grid search can be an A* search on a grid graph using a detour number heuristic that favors going towards the target cell.

Routing of All Nets

Figure 16:
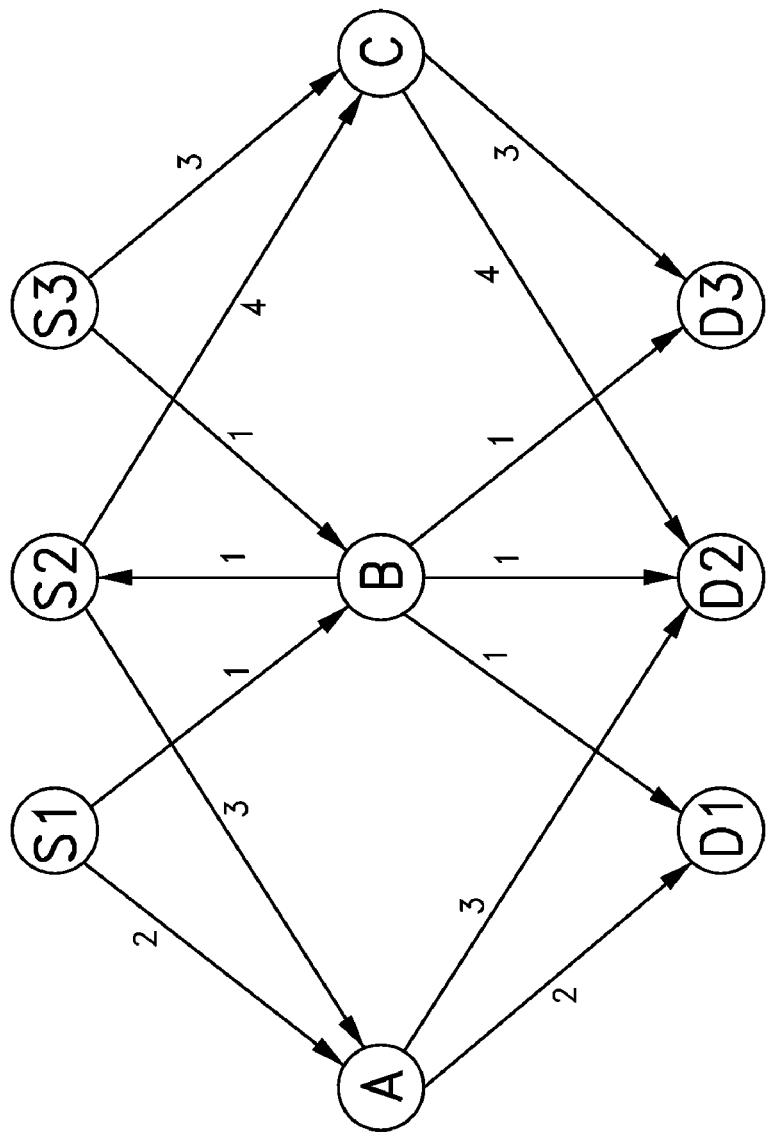
FIG. 16 illustrates an embodiment of an array with associated routing costs between nodes and networking connections.

A common goal of most routers is to complete automatic routing of all nets using as small a wire length as possible. Thus, when routing a single net, it can be important to choose the most desirable, and not necessarily the shortest, path. The most desirable path can be the path that will cause the least amount of difficulty for finding subsequent path connections. To complete routing for all nets, sequential or iterative approaches can be used. A sequential approach can route all nets, one by one. If the routing space is updated after every net, this can result in solutions whose quality depends on the order in which routing was performed. If the space is not updated, the solution can be independent of the routing order. FIG. 16 illustrates shows an example where a sequential approach finds the best solution only if the signal nets are routed in the order N2, N1, N3, where N1={S1,D1}, N2={S2, D3}, N3={S3,D3}.

Iterative techniques can start from a completely-routed solution and "rip up and retry" selected nets, as described above. The retries can free congested areas for further iterations, thus lowering the routing cost. One example of an iterative technique disclosed above is the simulated annealing algorithm. A logical selection for retry of an iterative algorithm are nets using congested nodes with an occupancy greater than their capacity, or $occ_n > cap_n$. When the quantity $occ_n - cap_n > 0$, the situation can be termed an overuse of node n. Reference 5 discloses the Pathfinder negotiated congestion algorithm, an iterative technique that rips up and reroutes every net on every iteration, including those that do not pass through congested areas.

The first-order congestion illustrated in FIG. 16 can be solved by using a node cost function, $c_n = b_n p_n$, where $b_n$ is the base cost of node n, and $p_n$ is a penalty factor related to the overuse of the node. The node cost function can be initially 1, indicating no penalty for overuse, but gradually increased in subsequent iterations. The first iteration can route all signals through B. Subsequent iteration for N1 can discover that a route through A gives a lower cost than going through the congested node B. Similarly, a later iteration will find that routing N3 through C gives a lower cost than going through B.

Figure 17:
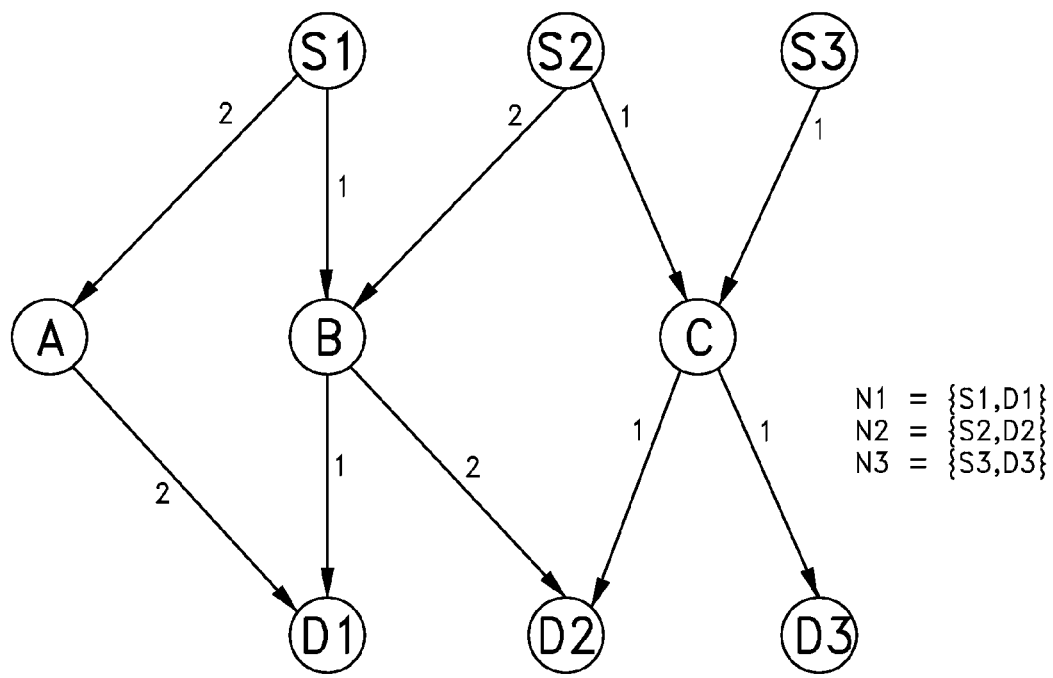
FIG. 17 illustrates another embodiment of an array with associated routing costs between nodes and networking connections.

This is not sufficient, however, to solve second-order congestion, as illustrated in FIG. 17. Initially, node C can be shared by N2 and N3. A later iteration can route N2 through B, and B can be shared by N1 and N2. As C is no longer overused, a later iteration will route N2 through C again.

One solution is to introduce a new cost function, $c_n = (b_n + h_n)p_n$, where $h_n$ is incremented in every iteration where the node is shared. One effect can be a permanent increase in cost of using the node, such that other nodes are attempted. Accordingly, a route through A will be attempted eventually. The determination that N1 needs to be rerouted in another way is difficult to achieve because it does not use a congested node.

Combined Approaches

Figure 18:
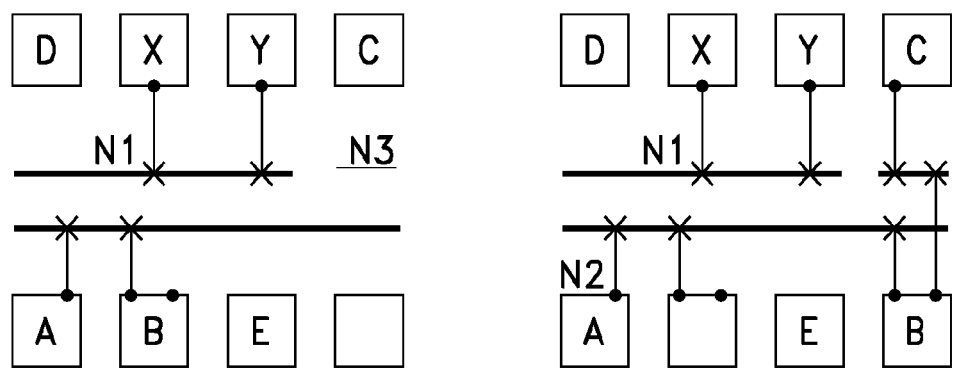
FIG. 18 illustrates placement and routing in two arrays.

In general, solving the P&R problem by separating it into successive placement and routing steps is advantageous if the placement step can model the interconnections made by the subsequent routing step reasonably well. The placement step can become less capable of modelling the interconnections as applied to FPGA P&R, especially to coarse-grain reconfigurable systems, where interconnection resources can be fixed and more scarce. These two factors can make complete automatic routing more difficult. FIG. 18 illustrates a first architecture with two segmented routing tracks where a placement choice based on estimated minimum wire length and minimum total area fails. A second architecture is illustrated successfully placing the module.

Simultaneous placement and routing methodologies for FPGAs have been proposed in several References, including 15, 28, and 30. Reference 30 discloses a simulated annealing algorithm in which placement perturbations, global routing perturbations, and detailed routing perturbations are all feasible concurrently. Reference 15 also discloses the use of simulated annealing, but proposes using routing demand in the placement cost function to lower the execution time. Finally, Reference 28 discloses the use of graph coloring to simultaneously solve placement and routing for FPGAs. Reference 6 discloses the performance of placement, routing and scheduling simultaneously, at the cost of computational time, in a coarse-grain array using simulated annealing. Routing resources are typically scarcer in coarse-grain architectures. It can be extremely difficult to find a placement algorithm and a cost function which can foresee the routability during the routing phase.

Coarse-grained reconfigurable architectures, however, are enjoying increasing popularity in recent years because of their advantages in processing capability, power consumption, software programmability and reconfiguration time when compared to FPGAs. These architectures can comprise an array of numerous word-level processing elements embedded in an interconnect network. A hierarchically-clustered, coarse-grain reconfigurable device, designed for software defined radio applications such as automotive multi-mode terminals can serve as an exemplar of the type of array being used[1]. This type of terminal can adapt to a wide range of wireless standards including, without limitation, WLAN, Intelligent Transport System (ITS) services, GPS, digital television, Personal Area Networks, and 3G telephony. Some of the wireless standards can operate concurrently.

To efficiently use the processing elements present in the architecture, a run-time environment can be advantageous to spatially map the different application blocks implementing these wireless standards. One aspect of an embodiment of an invention described herein is a run-time mapper that runs on an embedded processor connected to a reconfigurable array and that performs on-the-fly simultaneous placement and routing within a time allotment in the order of magnitude of seconds, allowing the device to adapt quickly to the requirements of its user.

Figure 20:
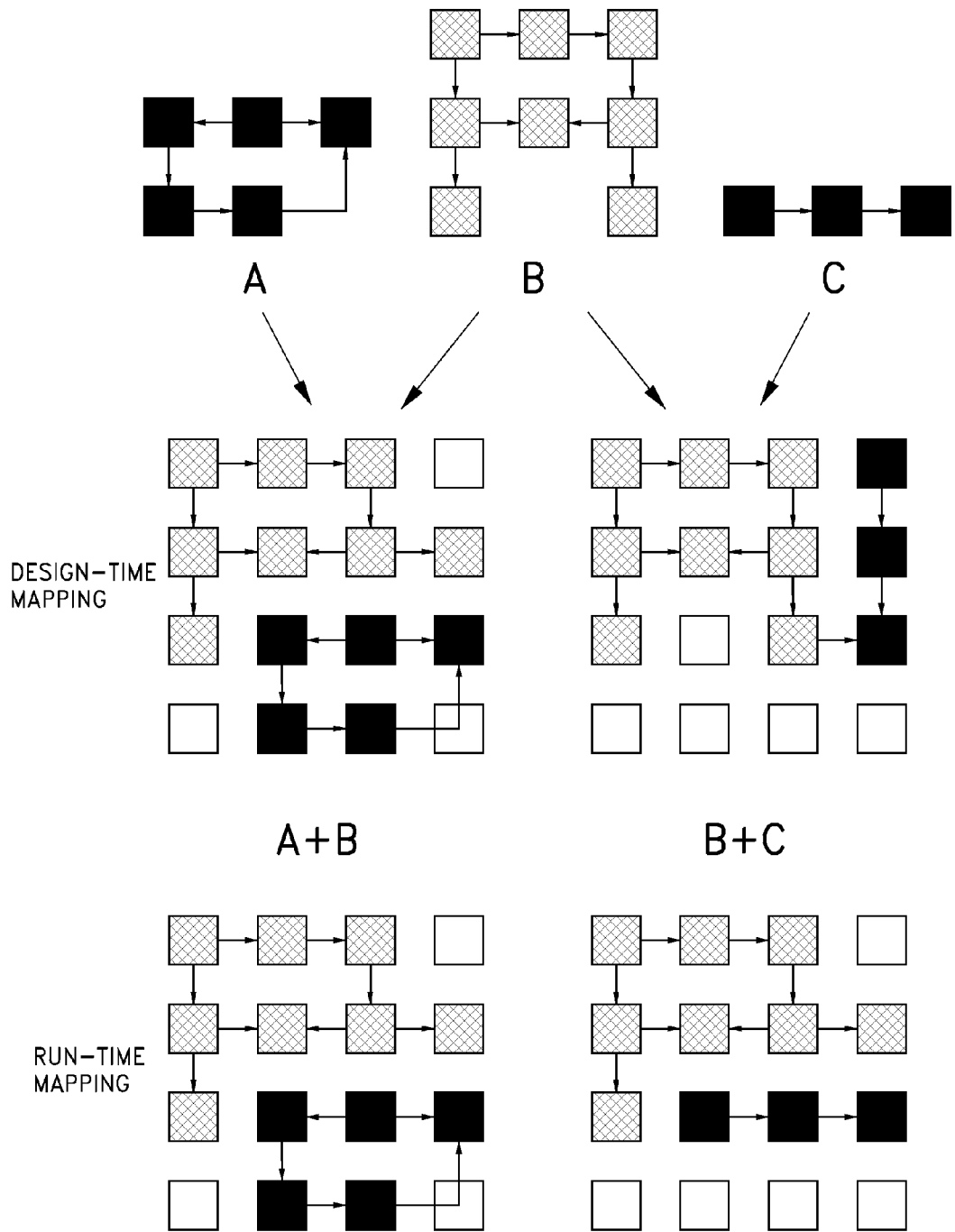
FIG. 20 depicts a graphical representation of a reconfiguration of an array using run-time and design-time mapping techniques.

There are at least two factors that cause run-time mapping to be advantageous. First, for an architecture that can support m simultaneous applications out of n possible ones, a design-time configuration has to be generated for $$\binom{n}{1}+\binom{n}{2}+\ldots+\binom{n}{m}$$

different combinations, when n is relatively small. Second, most wireless applications operate under tight timing constraints and preferably are not moved around while they are running, because movement can involve the relatively slow processes of state extraction, reconfiguration, and state restoration. Run-time mapping can add new applications without disturbing existing, already-running ones. As one non-limiting example illustrated in FIG. 20, a transition from a scenario implementing A+B to one implementing B+C is depicted. In the case of design-time mapping, application B would be interrupted and reconfigured when transitioning. It can be burdensome to support the requirement that B must have the same mapping in A+B and in B+C, since other transitions to B+C may require C to be unchanged instead.

Figure 19:
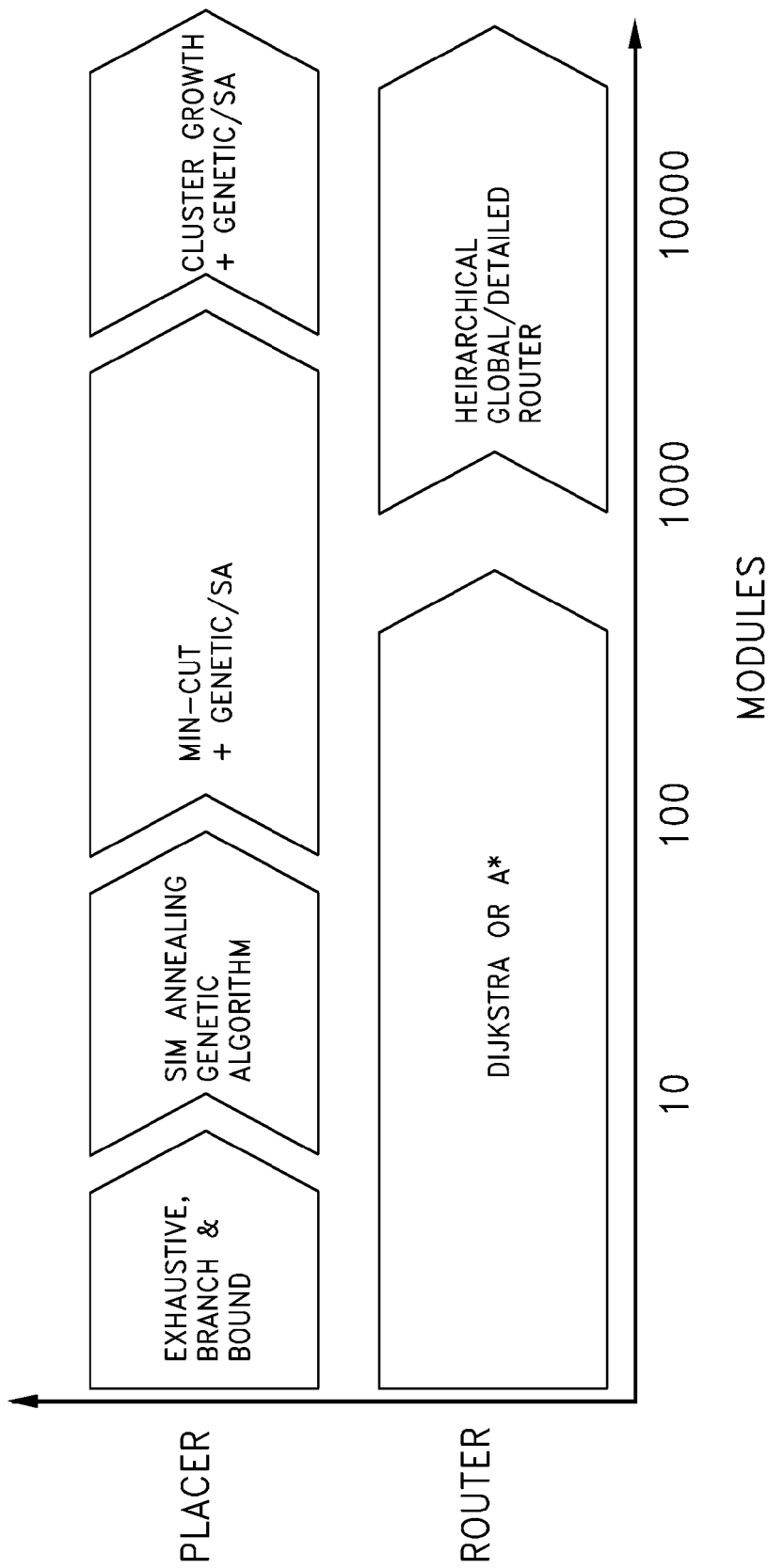
FIG. 19 depicts a graphical representation of one embodiment of a method of selecting placing and routing algorithms according to a given number of modules.

The number of graph vertices in the representation of our target clustered architecture[1] can be relatively small when compared to that of FGPAs because it can be modeled at the word level, instead of the bit level and because multiple processing elements are clustered together in a single graph vertex[2]. As a result, a traditional analysis of computational complexity for large graph sizes can be less useful, and the constant overhead associated with the algorithms becomes more important. Examination of existing placement and routing algorithms and evaluation of their performance on an embedded instruction set processor leads to the conclusion that implementation of different P&R algorithms can be selected depending on the number of incorporated modules, as illustrated in FIG. 19. Although FIG. 19 illustrates one plan for selecting algorithms, different algorithms at different module densities can also be used, or the currently-listed algorithms can be implemented at different module densities.

Figure 21:
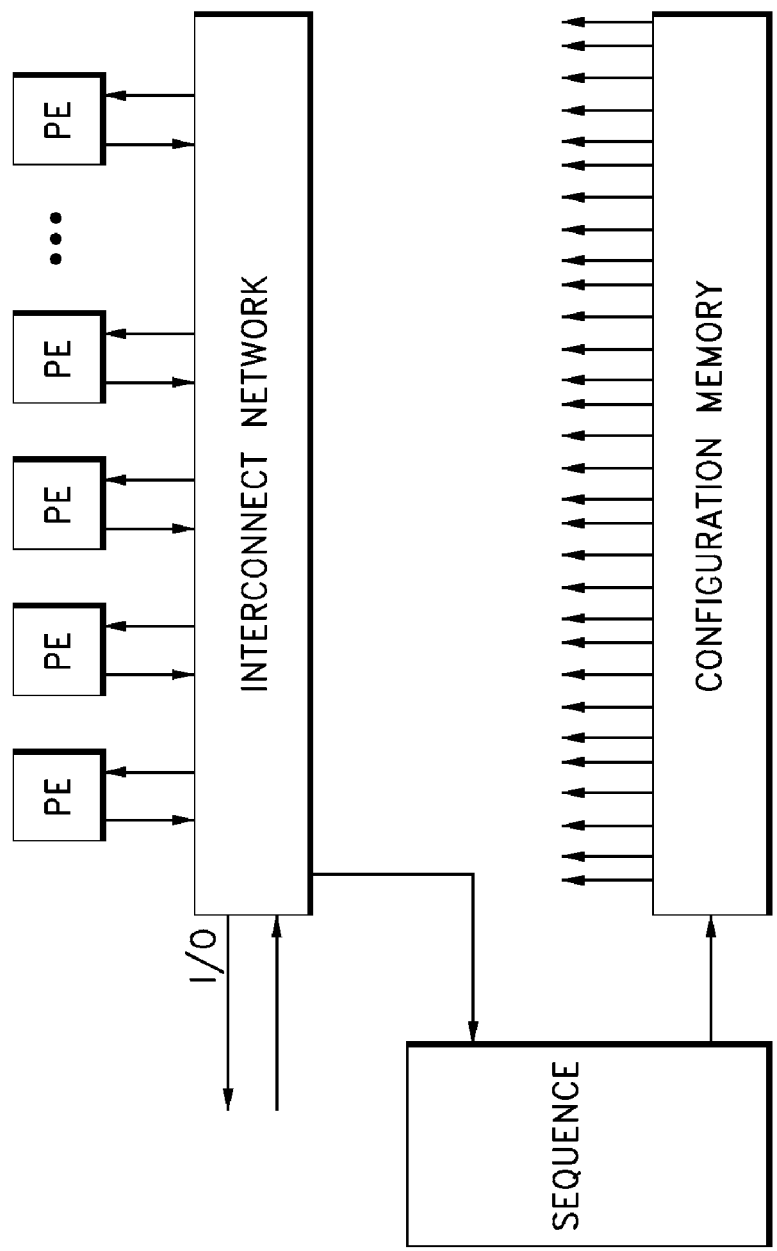
FIG. 21 illustrates an embodiment of a networked array.

FIG. 21 illustrates processing elements grouped together to form a cluster. The processing elements can be, without limitation, an Algorithmic Logic Unit, a MAC unit, a selector, a shifter, an address generator and a counter, a one or two port memory, a register file or a variable delay line. Portable executeables can be driven by data-valid signals that accompany the data. They can be under control of a sequencer, consisting of a program memory, program counter and branch control unit. Dynamic reconfiguration can be performed by modifying the program memory of a cluster's sequencer.

Figure 22:
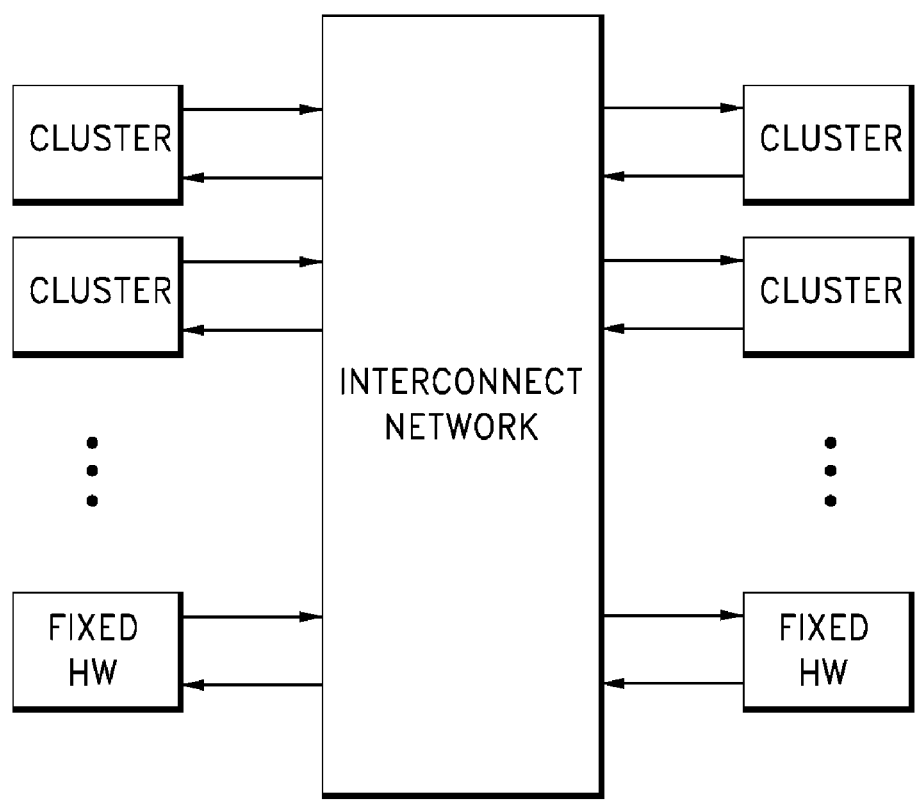
FIG. 22 illustrates an embodiment of a cluster group.

A cluster group can be a collection of clusters and some non-reconfigurable hardware blocks, including, without limitation, memories or accelerators for division or square roots. These components can be embedded in an interconnect network. The network can be, among other types of networks, completely connected, mesh-style, or registered mesh-style depending on the size of the cluster group. FIG. 22 illustrates an embodiment of a cluster group. At a high level, cluster groups can be connected to each other, to shared memories and to the CPU that controls reconfiguration and executes the run-time mapper. Clusters of processing elements can be the basic units for application mapping. In some embodiments, they can be treated as black boxes and their internal operation and layout not considered.

Graph Representation

The architecture graph representation can be based on the RRG concept5. An RRG can be a directed graph G={V,E}, whose set of vertices V contains architecture resources relevant to routing, including, without limitation, cluster pins, muxes and wires. Combining clustering and architecture modeling at the word level instead of bit level can reduce the number of vertices in the architecture description graph. Accordingly, this the running time of P&R heuristics that operate on this graph can be improved.

A set of edges E can model the connectivity that exists between the architecture resources. Additionally, vertices i can have an associated base cost $b_i$, capacity $c_i$, cycle delay $d_i$ and occupancy $o_i$. The capacity property can correspond to the number of signals that the routing resource can support. As an example, a routing channel with 4 tracks can have a capacity of 4. The occupancy is the number of signals that are currently using the resource. Mapping solutions can be used when they satisfy the implementability condition:

$$\forall i \in V: o_i \leq c_i$$

The total mapping cost can be defined as $$C = \sum_{i \in V} b_i * P_i$$

where $P_i$ is defined as: $P_i = o_i$ when $o_i < c_i$ and $P_i = o_i + k*(o_i - c_i)$ otherwise. The quantity $o_i - c_i$ can be called the overuse of vertex i. k can be used to influence the effect of overused resources on the mapping cost. k can be gradually increased from 0 to ∞ during the optimization process.

Edge weights for an edge j having a destination vertex i can be assigned $|i| = b_i$ when $o_i < c_i$ and $|j| = b_i * (1+k)$ otherwise (vertex is "full")

The definitions can be interpreted thusly. When the router chooses a path through edge j to vertex i, and decides to use the resource i, an additional cost equal to the edge weight $|j|$ can be incurred in the total mapping cost. Accordingly, a shortest path between two vertices in the graph will connect the physical resources represented by them while causing the lowest possible increase in the total mapping cost.

FIG. 23 illustrates several non-limiting examples of how physical resources can be depicted in the architecture representation. Clusters can have internal source and sink vertices that can be chosen as starting and ending points for routing instead of the pin vertices. This gives the router the freedom to choose which pins to use when they are interchangeable. Placement information can be stored in the architecture graph by setting the occupancy of cluster source and sink vertices to 1 when they are used by an application block.

The application description can be similar to the hypergraph netlist representation used by traditional VLSI P&R approaches. The run-time mapper can read this information from an XML description produced by the application compiler.

Routing

The architecture graph can be a directed graph with positive and dynamic weights. The Dijkstra algorithm can be used to find the shortest path between two vertices in such a graph 4. The psuedocode implementation below shows the basic form of a Dijkstra shortest path algorithm implemented using a priority queue (PQ).

```
for each vertex v
    set v.distance = infinity
    set v.visited = false
    set v.parent = none
set sourcevertex.distance = 0
PQ.Insert(sourcevertex, sourcevertex.distance)
while PQ not empty
    v = PQ.ExtractMin( )
    v.visited = true
    for every outgoing edge e(v,w) of v
        if not w.visited and v.distance + weight(e) < w.distance
            w.parent = u
            w.distance = v.distance + weight(e)
```

-continued

```
            if w not in PQ
                PQ.Insert(w, w.distance)
            else
                PQ.UpdateKey(w, w.distance)
```

Table 1 summarizes the computational complexity for a Dijkstra router implemented with different priority queues.

TABLE 1

| Computational Complexities | |
|---|---|
| Algorithm | Complexity |
| Linear | $O(|V|^2)$ |
| Binary | $O((|E| + |V|)\log|V|)$ |
| Fibonacci | $O(|E| + |V|\log|V|)$ |
| Double Bucket | $O((|E| + |V|)(1 + \sqrt{\max(|j|)}))$ |

An analysis of the execution time as shown in the above Table may not always useful because the graph complexity is relatively low. As one example, the Fibonacci heap has disappointing performance despite a good theoretically predicted behavior because of the large overhead associated with initializing, manipulating and cleaning up its tree data structures.

To speed up routing, an A* heuristic can be added to the Dijkstra algorithm. Instead of using the distance from the source vertex as the key value for the priority queue, the distance from the source vertex to the current vertex plus the estimated distance to the destination vertex can be used as the key value. Accordingly, vertices with a lower estimated distance to the destination can be extracted from the priority queue earlier, so that the destination vertex may possibly be found more quickly. When this estimator is a lower bound on the actual distance, the results of the algorithm still can be optimal. Such an estimator is called "admissible" in A* terminology.

Figure 24:
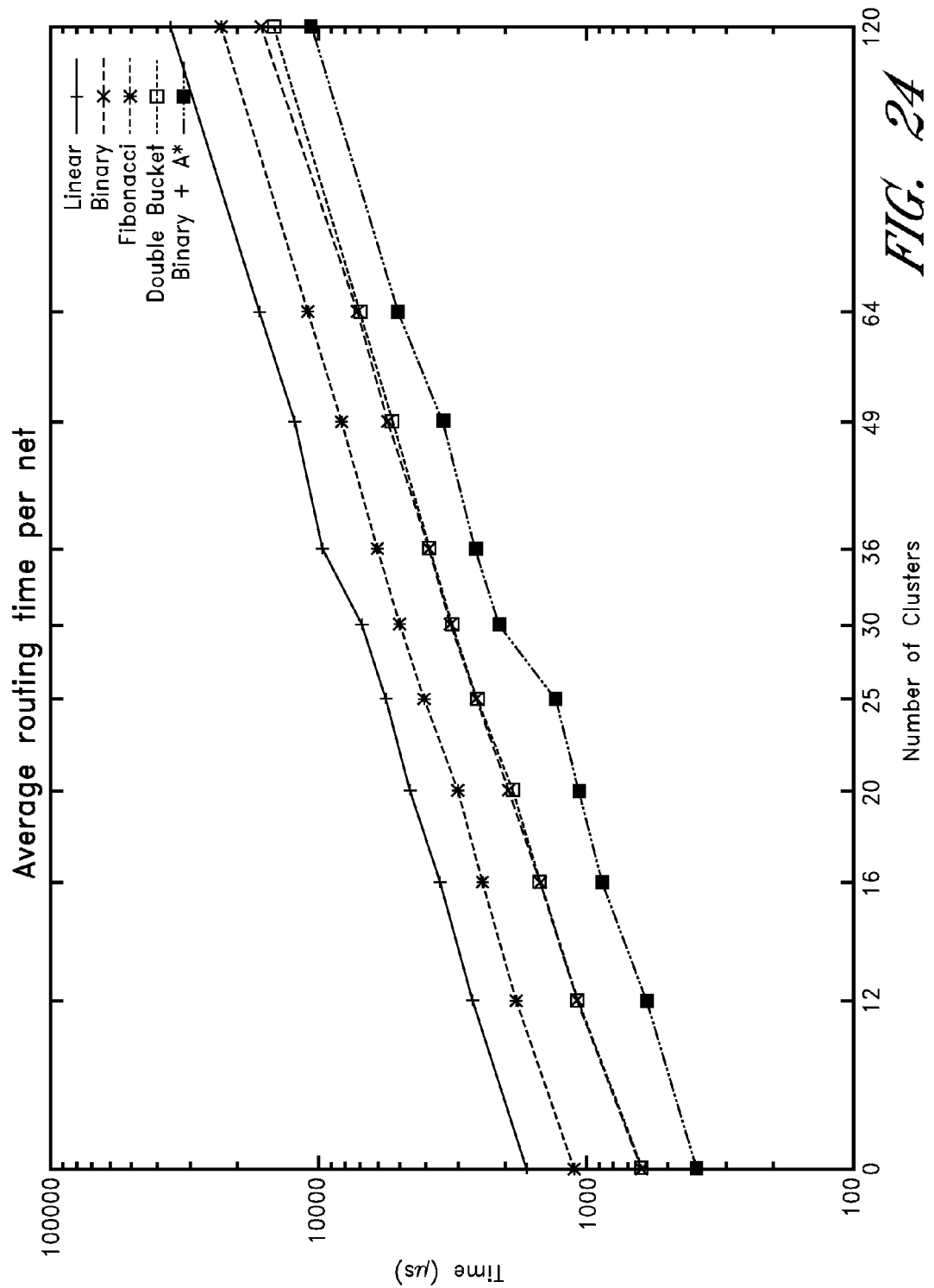
FIG. 24 depicts a graphical representation of routing time of algorithms as affected by a number of clusters.

The estimator can be constructed at initialization time by precomputing the shortest path distance from every graph vertex to every cluster sink vertex in an empty architecture graph, where all occupancies $o_i$ are zero. This estimator will become less accurate as the mapping process proceeds because architecture resources become utilized and edge weights acquire different values than those the estimator used during initialization. The double-bucket queue and the binary queue can be the best performers. The binary queue can be augmented with an A* estimator because it has a slight speed advantage the desired range. Additionally, its performance does not depend on edge weights. FIG. 24 illustrates a resulting improvement in average routing time for an architecture using mesh-style inter-cluster connections. In the illustrated embodiment, each cluster contributes approximately 20 vertices and 30 edges to the architecture graph.

Placement

After selecting a suitable shortest path implementation, selection of a placement algorithm to complete the run-time mapper should be made. The placer can explore various placement alternatives by examining the effect of its decisions on the total mapping cost. The application mapping process initially can allow overuse of resources, but the penalty factor k is gradually increased such that both placement and routing can explore different alternatives to avoid congestion. This idea is similar to, but more optimal than, the PathFinder algorithm of Reference 5, which is used for FPGAs, to implement simultaneous P&R.

An initial solution can be generated randomly or using a constructive algorithm, such as cluster growth. The initial solution can be subsequently improved using an iterative placer, including, without limitation, simulated annealing, a genetic algorithm, a hillclimber or pairwise interchange. Psuedocode implementations are disclosed below.

---
Cluster Growth
---
select application block with highest connectivity as seed
set overuse penalty k = infinity
place seed
while not all application blocks placed
    find unplaced block v most strongly connected to placed ones
    for every neighbor position p of placed application blocks
        evaluate ΔC when placing v on p
    place v on position where ΔC was lowest
---

---
Simulated Annealing
---
set overuse penalty k = 0
initialize temperature T
while exit criterion not met
    for i = 1 to number_of_moves_per_iteration
        attempt a random block move and evaluate its ΔC
        if ΔC < 0
            accept move
        else if random(0,1) < exp(−ΔC/T)
            accept move
        else
            reject move
    decrease temperature
    increase overuse penalty k
---

For simulated annealing, the number of moves attempted per iteration can be proportional to $N_c^{4/3}$, where $N_c$ is the number of application blocks to be placed[12]. The initial temperature can be set using the mechanism described in Reference 16.

The hillclimber iterative improvement algorithm is similar to simulated annealing, however, it makes only locally optimal decisions. The hillclimber does not accept moves that increase the mapping cost. The pairwise interchange iterator can take each application block and attempt to move it to each of its neighbors within a certain search radius. It, too, only accepts moves that decrease the total mapping cost.

---
Genetic Algorithm
---
set overuse penalty k to 0
initialize population with Np randomly generated solutions
for i = 1 to number_of_generations
    for j = 1 to number_of_offspring
        select parents p1, p2
        offspring = crossover(p1, p2)
        add offspring to population
    reduce population size back to Np
    for every individual j in population
        if random(0, 1) < mutation_rate
            mutate j
    increase overuse penalty k
---

The genetic algorithm placer can follow the basic structure of the genetic algorithm paradigm for placement described in Reference 14. The initial solution can consist of a number of populations, generated constructively or randomly. In each generation, offspring can be generated by combining two parent solutions using a partially mapped crossover operator. After the offspring have been generated and added to the population in this manner, the population can be reduced back to its original size using a selector. The selector function used to decide survival is random, allowing the genetic process to prevent early convergence to local minima. Finally, some solutions can be mutated by moving one cluster to a new position and re-routing the affected nets.

In accordance with the "Best-So-Far" approach[18] in the exploration process, whenever a solution is encountered that satisfies condition (Error! Reference source not found.) with a lower cost than the currently known best solution, the mapper takes a snapshot of the current placement and routing. This avoids the loss of a good mapping by subsequent optimization iterations, such as during simulated annealing in the high-temperature regime. Table 2 summarizes some advantageous combinations generated by mappers using the Dijkstra-binary-A* router.

TABLE 2

Algorithms Summary

| Algorithm | Placer strategy |
|---|---|
| SA | Simulated annealing |
| FSA | Fast simulated annealing (10x less moves) |
| GA | Genetic algorithm |
| FGA | Fast genetic algorithm (10x smaller population) |
| CG | Cluster growth |
| CGFSA | Cluster growth → measure temperature → fast simulated annealing |
| CGHC | Cluster growth → hillclimber |
| CGPWI | Cluster growth → pairwise interchange |
| CGFGA | Cluster growth → fast genetic algorithm |

Figure 25:
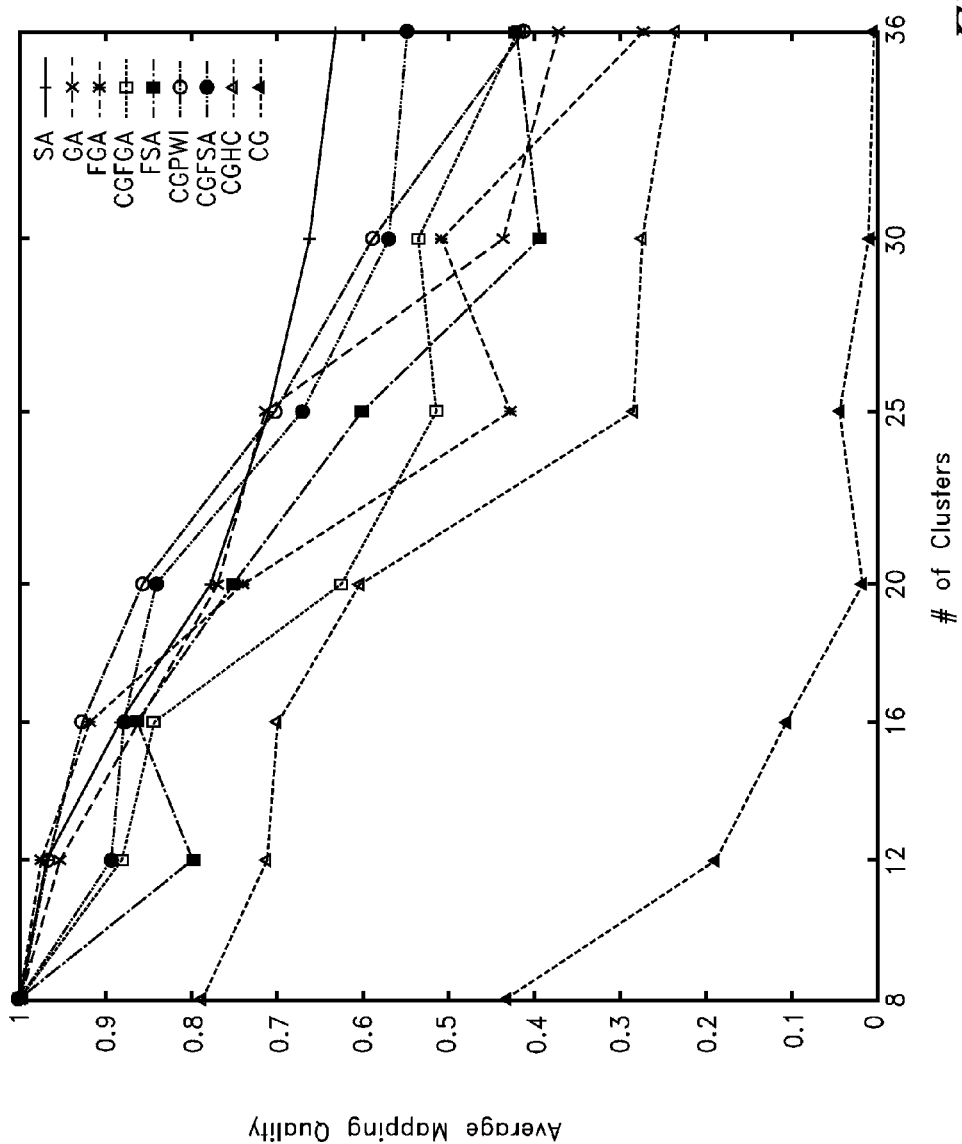
FIG. 25 depicts a graphical representation of mapping quality of algorithms as affected by a number of clusters.

FIG. 25 contains a plot of the average quality as the number of processors caries. Average quality is computed as $C_{optimal}/C_{current}$ where $C_{current}$ is the cost of the best implementable solution before 1s if one was found, or the first implementable solution after 1s otherwise.

Figure 26:
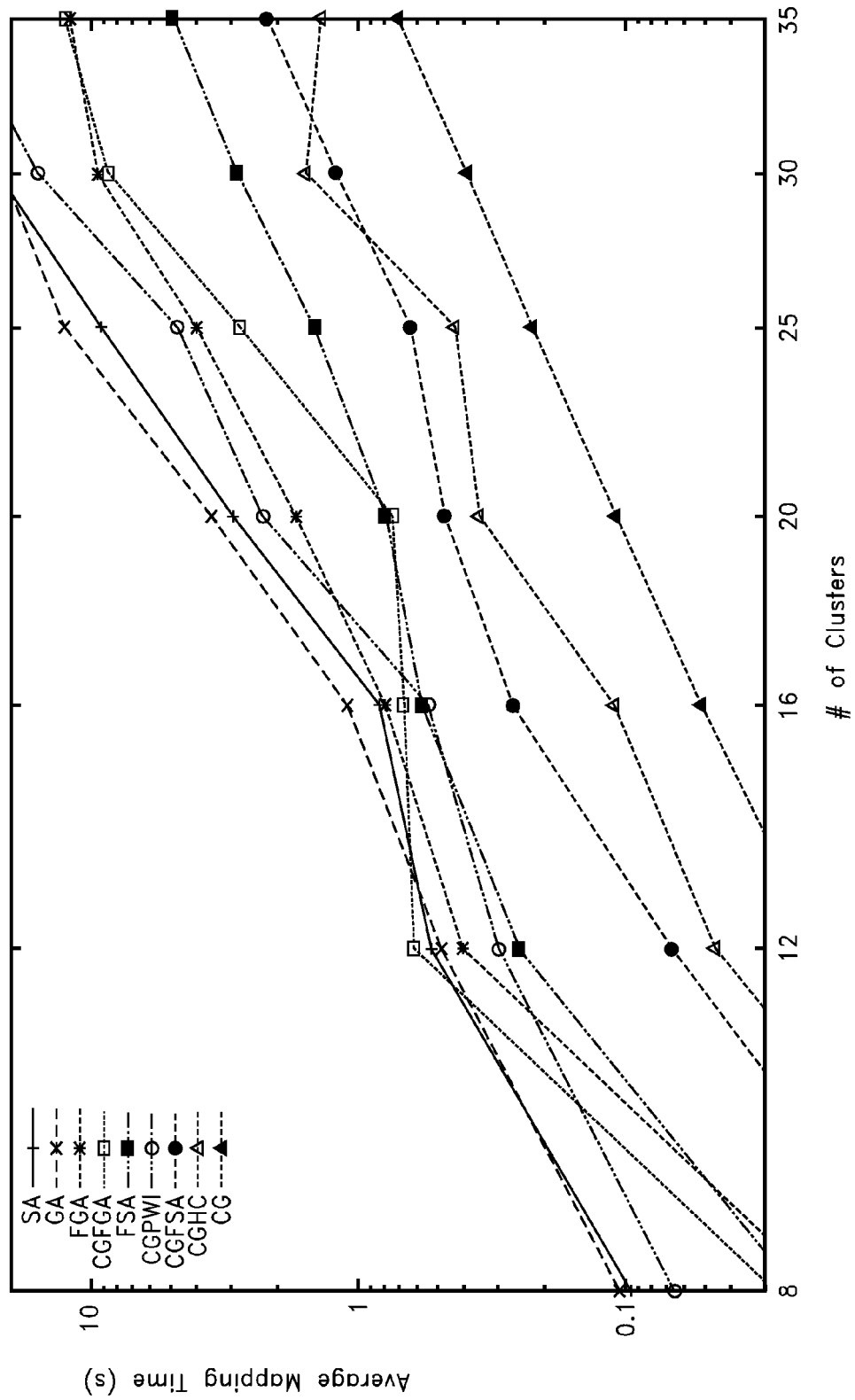
FIG. 26 depicts a graphical representation of mapping time of algorithms as affected by a number of clusters.

FIG. 26 illustrates the average time at which a solution was found for each algorithm. CGPWI can produce desirable results for cluster group sizes up to 20, whereupon it becomes relatively slow. From that point on, CGFSA can be used, but the loss of mapping quality (and associated waste of architecture resources) quickly becomes unacceptable. For some CPUs, 25 clusters is a practical limit for run-time mapping.

Table 3 shows the performance of CGPWI when mapping two applications on an instance of the cluster architecture described in Reference 1, where cluster groups consist of 20 reconfigurable clusters, 4 fixed accelerator blocks for DIV, SQRT, SINCOS and ATAN, and 2 dual-port RAMs[2].

TABLE 3

Results for Typical Applications

| Application | # Blocks | # Nets | Time | Quality |
|---|---|---|---|---|
| 802.11a channel estimation | 11 | 18 | 1.13 s | 88% |
| GPS C/A correlator | 6 | 6 | 0.56 s | 100% |

A simultaneous P&R approach combining a constructive cluster growth placement algorithm with iterative pairwise interchange optimization and using a Dijkstra shortest path router augmented with an A* estimator can provide desirable quality solutions in an advantageously short time for cluster groups of up to 20 clusters. This algorithm has the desirable property, whereby there are little to no random components in the search, unlike some algorithms including, as an example, simulated annealing. When the cluster group size grows, it can be necessary to substitute the pairwise interchange with a fast simulated annealing approach. A 400 MHz XScale processor can perform run-time mapping for cluster groups containing up to approximately 25 clusters.

Software Implementation

At least some of the inventive aspects of the P&R advances described above can be implemented using software. The inputs and outputs of the program and the data structures can be used by the program in a way that is agnostic with respect to the actual real-time algorithm that will be implemented by the mapper. Accordingly, any algorithm described above or later designated for inclusion in the P&R application can be implemented by the program.

Figure 27:
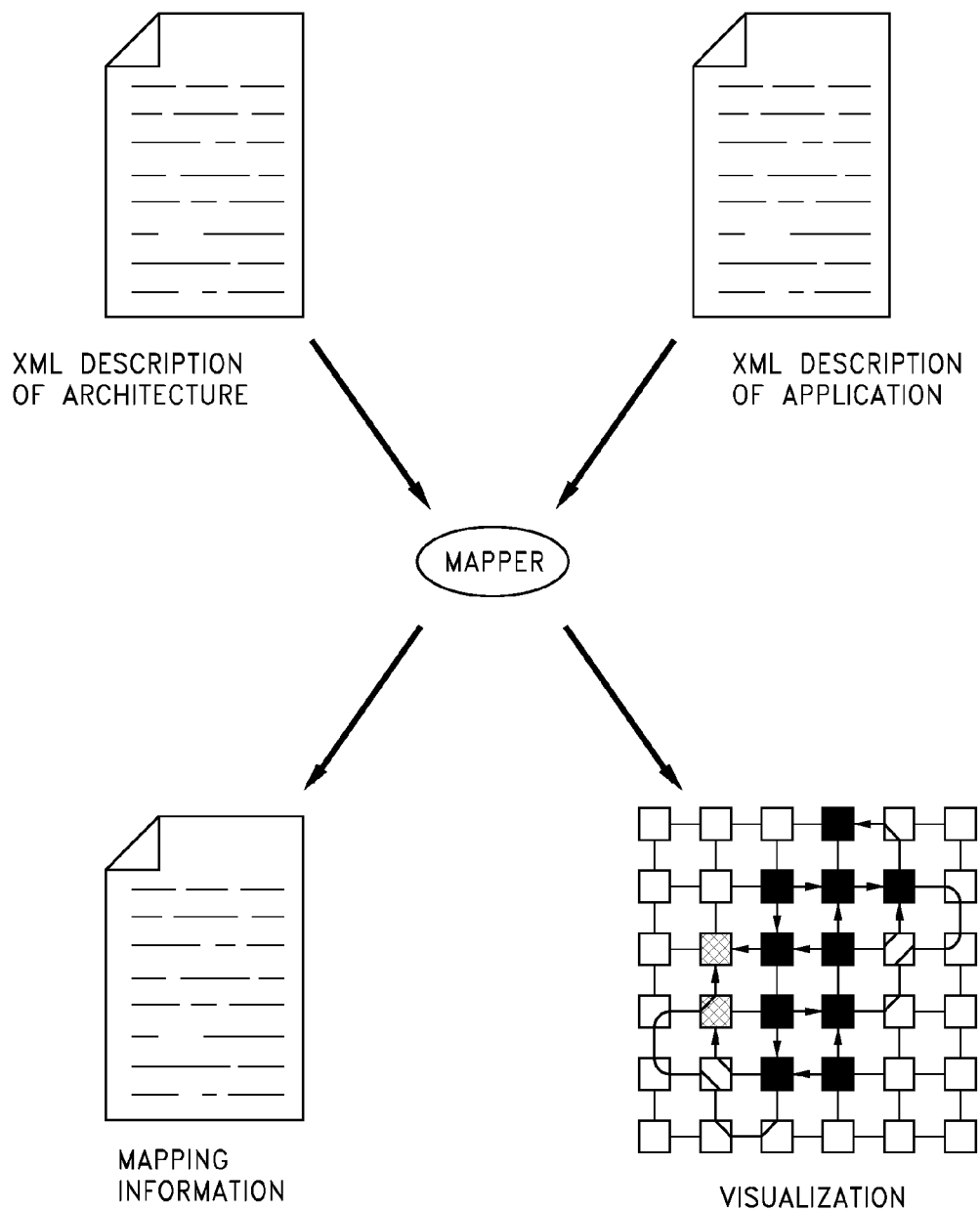
FIG. 27 depicts a schematic of a simple mapper.

Some parts of the mapper described below include an architecture modeling language, the application modeling language, the description of the operations performed by the mapper on its internal data structures (architecture graph and routing resource graph), and the invocation process of the mapper. The invocation process can describe how and when the program will be started by an external Manager program. FIG. 27 illustrates a schematic representation of the mapper software. As can be seen, a description of the architecture and a description of the application can be inputs to the mapper, which can output the P&R algorithmic results as both data and a visual representation.

A prototype mapper based on the abovementioned design principles has been implemented in C++, but other programming languages can be used, as appropriate to the reconfigurable array, programming environment, or preference of the operator.

The first input of the mapper application can be a description of the target architecture, preferably in a format that provides sufficient abstraction from details unimportant to mapping including, without limitation, the exact layout of configuration bits or the functionality performed by application clusters. Preferably, the architecture description can provide sufficient information to perform a complete and accurate mapping process.

Clusters can mostly considered to be abstracted to a blackbox level. The architecture description can receive a data input specifying how many input ports a particular cluster has, how many output ports it has, and what type of configuration data it supports. Alternatively, for specialized version of the software, the configuration data can be pre-programmed.

The type of configuration data relates to the internal structure of the cluster. In one non-limiting example, a cluster with eight processing units inside is preferably not configured with data that contains specification for a cluster with twelve processing units.

Figure 28:
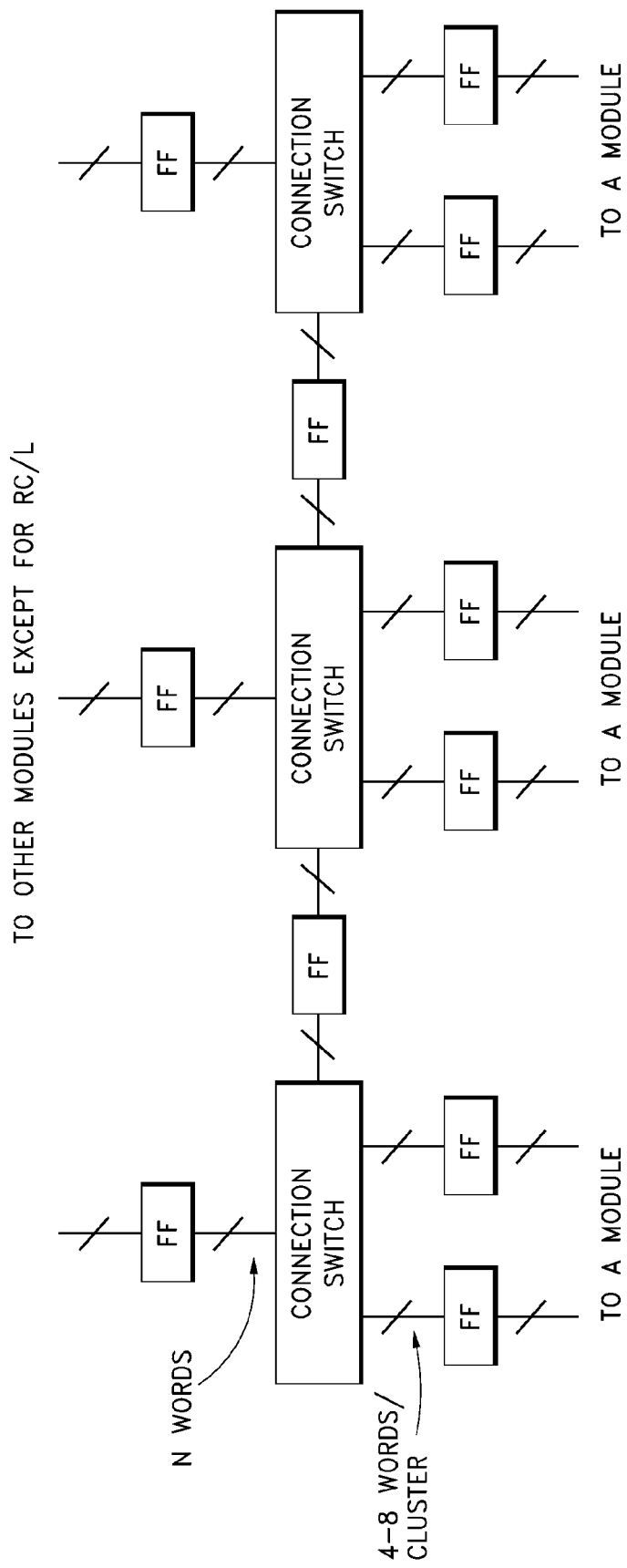
FIG. 28 depicts a schematic of networking elements.

The interconnections between clusters and between cluster groups can be abstracted to the level of delays, expressed as a number of cycles, and capacities. As an example, FIG. 28 shows an embodiment of a schematic view of one way cluster groups, or modules, can be connected to other cluster groups. The FFs can have an associated delay of 1 cycle, and a variable capacity of 4-8 or N words, as shown.
XML The eXtensible Markup Language, (XML) is a markup language, similar to HTML. It is a human-readable, machine-understandable general syntax for describing hierarchical data, applicable to a wide range of applications, such as databases, e-commerce, Java, web development, searching etc. Its mechanics enable the definition, transmission, validation and interpretation of data between applications.

XML uses elements and attributes as its basic building blocks. An XML document consists of a single element, which can have multiple sub- (or child-) elements. Elements are indicated by tags in the text. Tags are usually inside angled brackets. An element's content can be found between its opening and closing tags.

Element content can be text data, other elements, or a mixture of the two, or other types of data. Elements can also be empty; in that case, the element is represented by a single tag terminated by a slash (/). Opening and empty tags can contain attributes, which specify values associated with the element.

A legal XML document must, at minimum, be well-formed, such that each opening tag has a closing tag, and they should be nested properly, ensuring that closing tags for elements are encountered in the reverse order that the opening tags have been seen. Put another way, the tag that was opened last should be closed first. XML parsers can check the "well-formedness" of its input.

Figure 29:
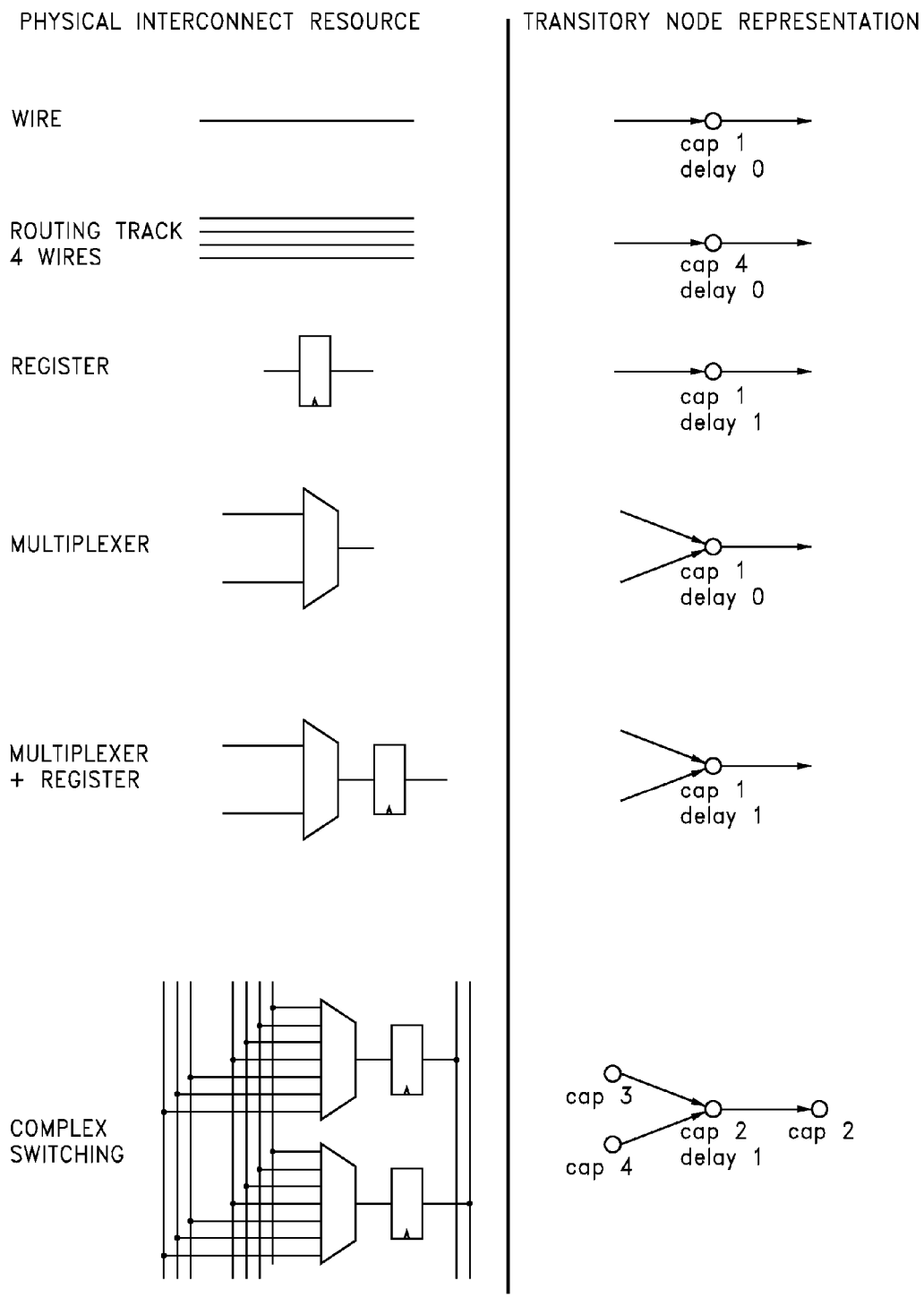
FIG. 29 depicts a schematic showing representations of networking elements.

For more extensive checking, XML can also use schema languages to define the allowed elements, element ordering, element nestings, and data types for a certain type of documents, among other defined elements. A validating parser can take an XML document and a schema description as its inputs and can check whether the document conforms to the definitions in the schema. This can be advantageous because once a document passes through validation, it can be read to and written by various XML tools that do not require detailed knowledge of the application domain that the XML document is used for, among other manipulations. As can be seen in FIG. 29, some non-limiting example routing resources and associated node representations with values are depicted.

Architecture Modeling

A schema for the architecture modelling language is attached below as Appendix A. Although the schema is disclosed in a XML context, at least some of the inventive aspects of the schema disclosed can be adapted to other computer-readable language and/or formats.

Parameterizable Architecture Generator (PAGE)

Manually describing an architecture in XML can become quite cumbersome if an operator wishes to experiment with various interconnect strategies and cluster group sizes because a new XML description has to be written for every version that the operator wants to evaluate. A simple 4-cluster architecture can comprise over 500 lines of XML code.

Figure 30C:
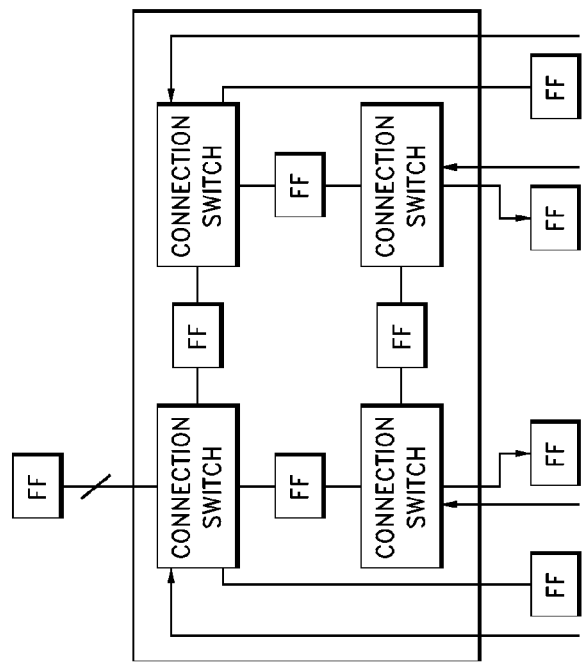
FIG. 30c illustrates a third embodiment of an interconnection layout for a cluster group.
Figure 30B:
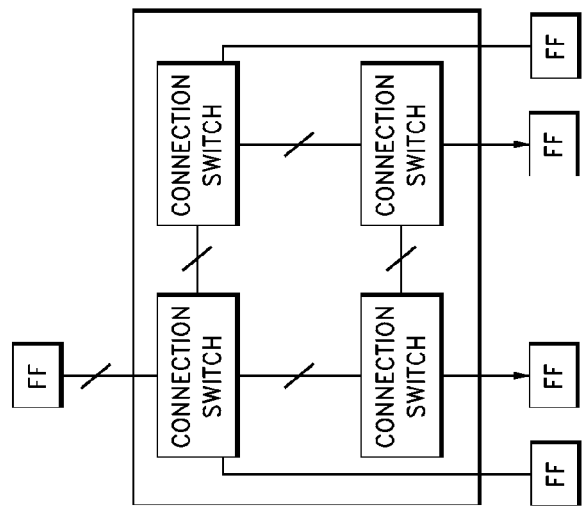
FIG. 30b illustrates a second embodiment of an interconnection layout for a cluster group.
Figure 30A:
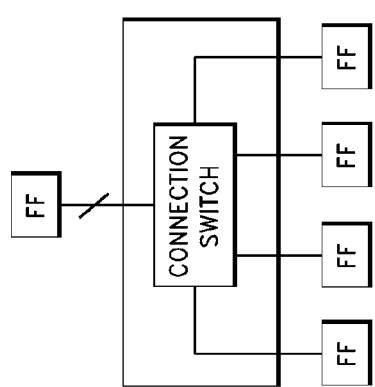
FIG. 30a illustrates a first embodiment of an interconnection layout for a cluster group.

A parameterizable architecture generator (PAGE) can help the user generate different architecture XML files quickly. Some useful parameters include the number of cluster groups, the number of clusters per cluster group, the number of clusters in one row of a cluster group, the interconnect style between cluster groups, and the interconnect style between clusters, including, but not limited to, full interconnect, mesh, or registered-mesh types. FIGS. 30a, 30b, and 30c illustrate a full interconnected embodiment, a mesh embodiment, and a registered mesh embodiment, respectively.

The mapper program can have a companion PAGE written in Python, or any other suitable language, that supports at least the first 3 parameters. It can be hardcoded to use a full interconnect layout between clusters inside the same group.

Another embodiment of an interconnect cluster group is illustrated in FIG. 28.

Architecture And Routing Resource Graphs

The XML parser can translate the textual architecture description to an internal architecture graph in a straightforward manner because the architecture graph contains exactly the same information as the XML description.

From this architecture graph, an internal RRG can be constructed automatically[5]. A RRG of the architecture can be a directed graph G={V, E}. The set of vertices V can contain architecture resources relevant to routing, including, without limitation, cluster and cluster block cluster ports, routing tracks, and the set of edges E containing the switches connecting the resources. Additionally, as described above, vertices can have an associated capacity $c_i$ and occupancy $o_i$. Preferably, for route completion, $\forall i: o_i \leq c_i$. The RRG used by the mapper can define at least 5 types of nodes: IPIN, OPIN, SOURCE, SINK and OTHER.

The RRG can be constructed by applying a number of simple transformations. For a cluster in the architecture, all the inputs can be converted to INPUT nodes and connected to a newly created SINK node. Then, a SOURCE node can be created and all outputs can be transformed into OPIN nodes and connected to it, as illustrated in FIG. 31. If the cluster implements routing instructions, these can be modelled by adding edges from input nodes to output nodes. As illustrated in FIG. 32, the RRG representation of a cluster can be configured to act as a multiplexer to help with routability, in case it is not used for anything else. In one embodiment, transitory nodes can be translated into a new RRG node of type OTHER, with the delay and capacity specified in the architecture.

A second pass in the translation process can find all edges between different entities in the architecture graph and translate them to edges between the corresponding RRG nodes. SOURCE and SINK nodes can be used in the RRG to increase the flexibility of the routing process. In some embodiments, routing would try to connect clusters by finding paths leading from their output ports to the input ports of other clusters. In cases of commutative inputs, or when two output ports carry the same signal, however, it can be more advantageous to adapt the router to choose which input or output port to use, which can lead to improved routability. If the configuration mapped onto the cluster satisfies these constraints, in one embodiment, the router can perform routing to a SINK node instead of an IPIN, and from a SOURCE node instead of an OPIN.

Figure 33B:
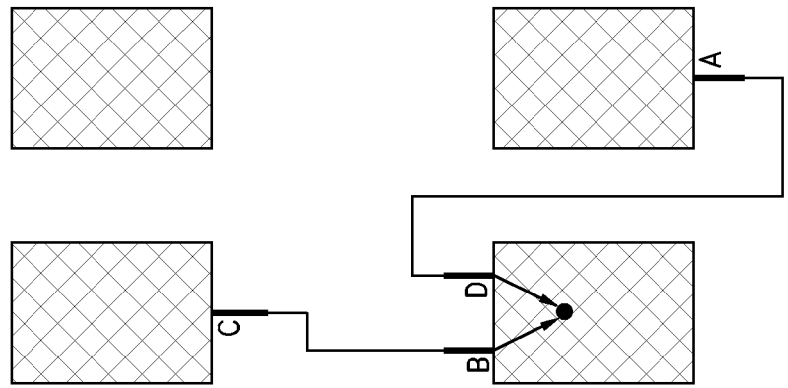
FIG. 33b illustrates a schematic representation of a second embodiment of a cluster.
Figure 33A:
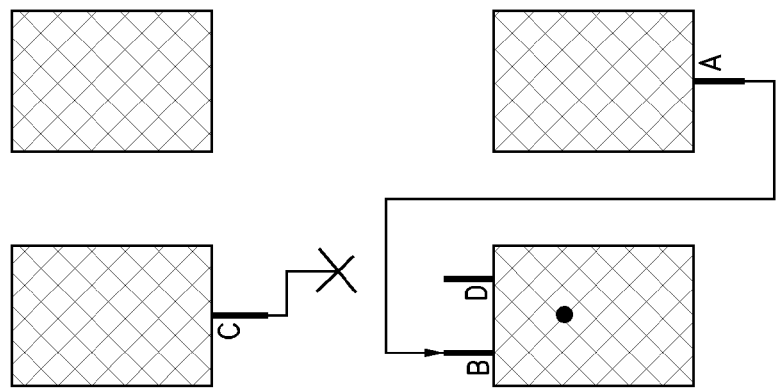
FIG. 33a illustrates a schematic representation of a first embodiment of a cluster.

In one non-limiting embodiment illustrated in FIG. 33a, an unroutable placement is shown that will be rejected. As illustrated in another embodiment in FIG. 33b, however, the commutativity of the two input ports of the bottom left cluster can be taken into account. The router can create a path from port A to the target cluster's SINK node through port D instead of through port B in order not to block the other signal net, and in this case, a valid mapping results

Application

The second set of data used as an input for the mapper can be a description of the application on which the placement and routing will be performed. As a non-limiting example, the application description can be considered as the equivalent of a gate-level netlist used by traditional P&R tools. Once again, XML can be chosen as the format for this file, although other formats can be used.

Figure 34B:
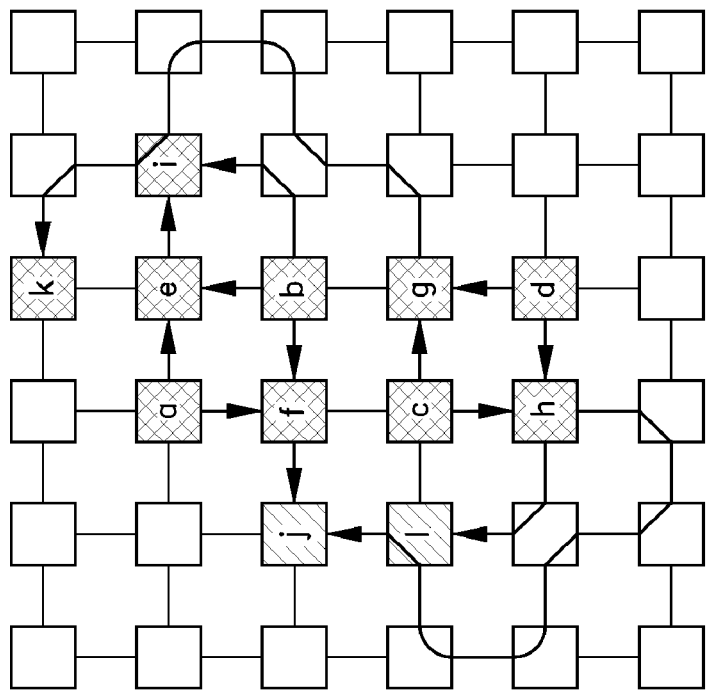
Figure 34A:
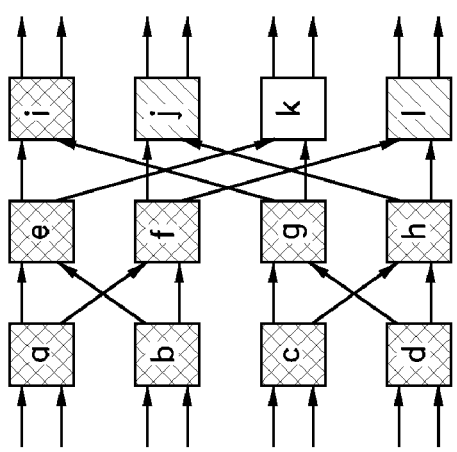
FIG. 34a illustrates an embodiment of a networked cluster.

FIG. 34a illustrates the information captured by the application description as a collection of "virtual" or unmapped clusters and their communication flow. The mapping process can place virtual cluster configurations on physical clusters, as shown in the output in FIG. 34b. The mapping process can route between the cluster ports according to the connection requirements of the application.

Application Modeling in XML

An XML schema for the application description in the mapper prototype can be found attached as Appendix B.

Incorporating Timing Constraints

The run-time mapper can support timing constraints that the router can evaluate to produce valid mappings. Currently, two types of constraints are foreseen. First, a delay of a certain connect attribute that can fall between two user-specified values. Second, a delay of a certain connect attribute that can match the delay of another connect attribute. The incorporation of these timing constraints into the application description is performed into the XML schema.

Routing And Shortest Paths In the RRG

The router can determine a physical path for a single signal net by performing a shortest path algorithm between an OPIN/SOURCE node and one or more OPIN/SINK nodes in the RRG. In general, by minimizing the path cost, the resource usage can also be minimized. For this purpose, nodes representing resources in the RRG can have an associated cost. Accordingly, the RRG can be node- (or vertex-) weighted, as shown in a non-limiting example of an RRG in FIG. 35a. At least some shortest path algorithms can be designed to work on edge-weighted graphs, as shown in a non-limiting example of an RRG in FIG. 35b. As one way to transform the graph into an edge-weighted version dynamically, weights can be assigned to the edges. Thus, a RRG edge leading to a node n with cost $c_n$ is assigned a weight equal to $c_n$, resulting in the reassignment of weights as depicted in the transformation from FIG. 35a to FIG. 35b.

The capacity property in the architecture can be accounted for by the router. Thus, if a certain RRG node has a capacity of N, the router can route N different signals through it without any penalty. The node usage can be tracked by an occupancy property for every node n. Every time a signal is routed through the node, its occupancy can be increased by 1. As long as the occupancy of a node does not exceed its capacity, the routing can be implemented.

PathFinder Algorithm

As discussed above, the negotiated congestion router can be separated into a global router and a signal router[5, 36]. The signal router can route one net at a time using a shortest path algorithm; while the global router can call the signal router repeatedly to achieve a solution where all nets are routed properly.

The global router can handle the problem of solving routing congestion and dependence on routing order by ripping up and rerouting every signal net of the application on every iteration. The global router can include those that do not pass through congested nodes, and adjust node costs at the end of the iteration.

Node costs for routing can be assigned as follows:

$$c_n = (b_n + h_n) p_n$$

where $c_n$ can represent the cost of using the node in a route in this iteration, $b_n$ can be the base cost of using n, $h_n$ can be related to the history of congestion on n during previous iterations of the global router, and $p_n$ can be related to the number of other signal signals presently using n.

This scheme can allow the occupancy of nodes to be greater than their capacity, albeit at a higher cost. $p_n$ can be initially equal to 1, meaning that in the first iteration, resources can be allowed to be overused without penalty: if a node with capacity 1 is used twice. The cost that is incurred can be twice the base cost. The penalty for overused nodes increases gradually after every iteration of the global router. $h_n$ initially can be 0 and can increase slightly every iteration that the node n is shared. This way, signals are effectively negotiating for shared resources, and signals passing through uncongested areas can be moved to make room for other nets that are in congested regions.

Cost Function

The mapping process can be regarded as a multivariate optimization problem, where the cost function can be a function of several variables. The cost can be optimized using, as non-limiting examples, simulated annealing or genetic algorithms. Algorithms that do not explicitly optimize cost, such as cluster growth, can still use the mapping cost function to evaluate the quality of their results. Accordingly, it is possible to compare the quality of different algorithms with an objective metric.

The variables of the cost function can be the locations or placement of individual clusters and the resources used by the routing process. As described above, most traditional P&R approaches do not perform a full routing step to measure the interconnect cost, but use estimators to evaluate placement quality. This approach may not be appropriate for architectures with complicated and scarce routing resources such as coarse grain arrays and FPGAs.

We can define a mapping cost function adapted from the PathFinder algorithm to be:

$$C = \sum_i (b_i + h_i) P_i$$

The sum can be computed over all nodes in the RRG, after P&R have been performed. Similar to the node costs of the PathFinder algorithm, $b_i$ can be the base cost of the node; $h_i$ can be related to the history of congestion; and $P_i$ can take account for the node usage and node overuse. The computation of $P_i$ can be accomplished as follows:

$$P_i occ_i + k(occ_i - cap_i)$$

when $occ_i > cap_i$, and $$P_i = occ_i$$

otherwise. Thus, node costs can be penalty-free until their occupancy exceeds their capacity. The amount of penalty incurred can depend on k.

The variable k can be gradually increased from 0 to infinity. In practice, trial mappings containing overuse can be discarded when k exceeds a certain threshold value, $k_{max}$, because the cost of an overused resource can become so high that the solution will almost certainly be rejected. This can prune the search space of the mapping process and correspondingly reduce its computational time.

Placement

The RRG can also hold information about placement. The SOURCE and SINK nodes inside clusters can be used for this purpose. A placement of a virtual cluster on a physical cluster can be represented in the RRG by increasing the occupancy property of the SOURCE and SINK nodes of the physical cluster by 1. This can allow the cost function to take into account usage cost for the virtual cluster. In some embodiments, the nodes do not have a congestion history $h_n$ associated with them because they are not a part of the routing process and therefore do not cause congestion.

Routing

The global router can be based on the PathFinder algorithm. In the algorithm, the interpretation of the node cost $c_n$ can be the cost of using the resource of node n one additional time. Thus, it is the difference in cost when increasing the occupancy $occ_n$ of one node by 1. This difference can be derived from the previous cost function definition by comparing it with the PathFinder node cost:

$$c_n(b_n + h_n) p_n$$

Thus, $p_n$ should be:

$$p_n = 1 + k$$

when the new occupancy $occ_n > cap_n$, and $$p_n = 1$$

otherwise. The variable k can be gradually increased from 0 to infinity.

Interaction Between Mapper And Manager

Figure 36:
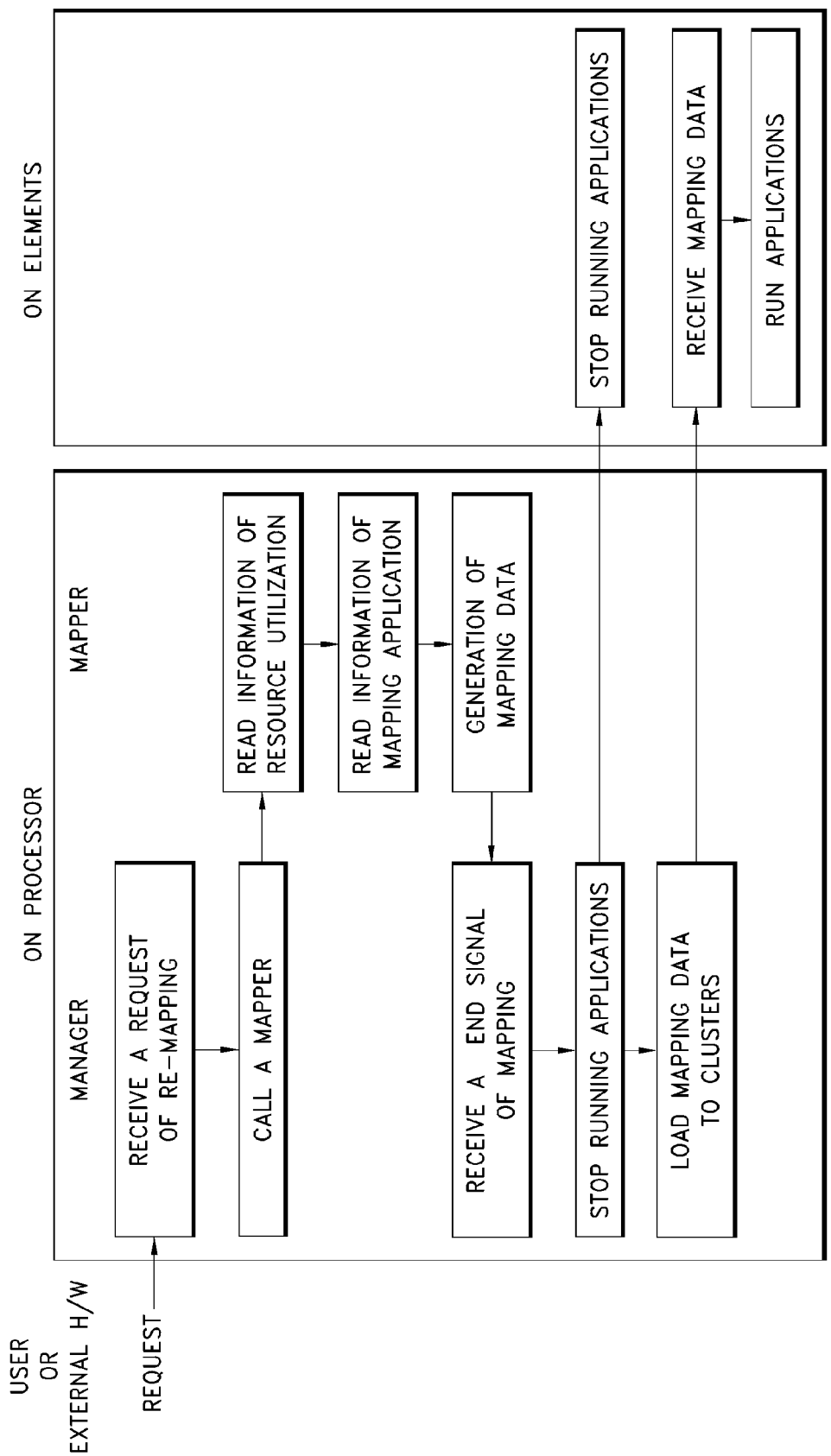
FIG. 36 illustrates a schematic representation of a processing using a managed mapper.

The mapper can be only a part of the run-time software environment for the target architecture. It can be under the direct control of a higher control layer, a "manager." FIG. 36 illustrates the interaction between the mapper and the manager in one embodiment. As can be seen in FIG. 36, when a request for remapping is received, the mapper can obtain the information of the current resource utilization in case incremental mapping should be performed. This can reserve the resources used by the previous mapping by adding the information of the current application to it. After the mapping process has completed, control can be returned to the manager, which can reconfigure the device.

Output of the Mapper

The mapper can generate an annotated version of the input XML architecture file as output. This annotated file can serve at least two purposes. First, it can enable configuration of the device based on the results of mapping. Second, it will allow incremental mapping by storing RRG state information.

To accomplish the first purpose, the results of both placement and routing can be implemented. Placement information can be used to map configurations onto physical clusters. Each physical cluster can obtain an additional attribute, "conf," after running the mapper. Thus, the manager can load the correct configuration data onto the cluster.

Figure 37:
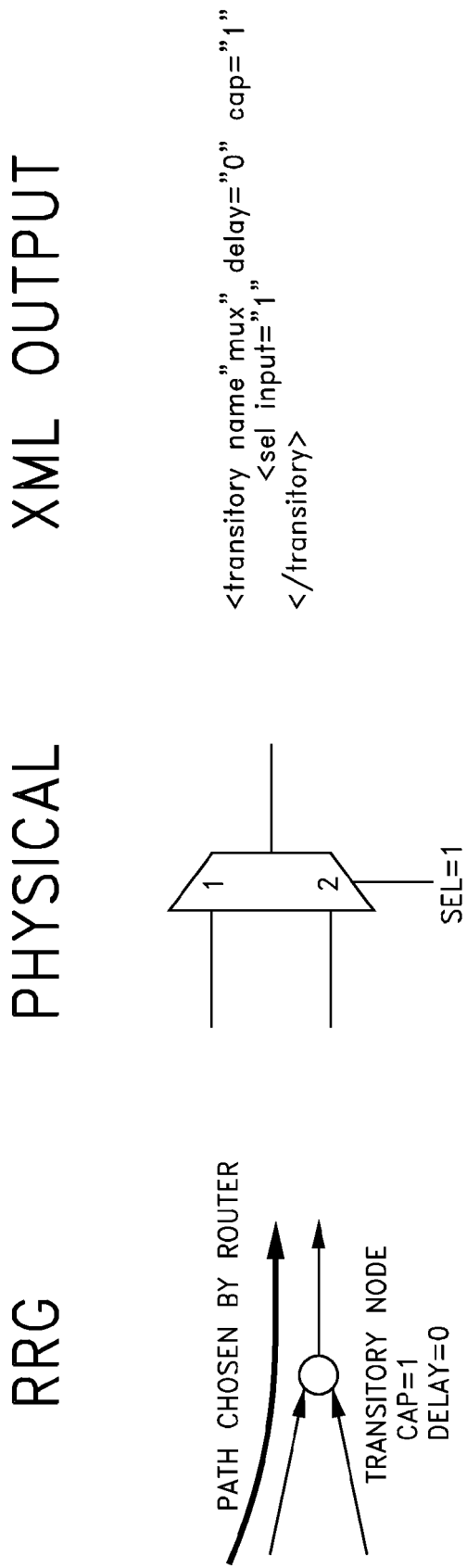
FIG. 37 illustrates several schematic representations of routing output information.

Routing information can also be used to generate configuration data to communicate the choices made by the router to the device. As can be seen in FIG. 37, the RRG model can implicitly assume the presence of multiplexers for certain transitory or IPIN node configurations. Transitory and IPIN nodes with multiple incoming edges can be annotated with an additional "sel" element to configure their input muxes.

As one non-limiting example, a transitory node n can have capacity c, with incoming edges from nodes $s_1, s_2, \ldots s_N$ having capacities $c_1, c_2, \ldots, c_N$ respectively.

Signals of c can route back through node n and can have one of the $c_1$ signals of node $c_1$, or one of the $c_2$ signals of node $s_2$, or one of the $c_N$ signals of node $s_N$ as its routing source. Thus, there can be c input muxes, each selecting one of $c_1 + c_2 + \ldots + c_N$ inputs. For every mux, a sel child element can be generated.

As an example, FIG. 37 illustrates a non-limiting example of a transitory node with capacity 1 and incoming edges from two other nodes with capacity 1. As shown, the routing information can be used to configure the input multiplexer of the transitory node.

The annotated file can also allow incremental mapping by storing RRG state information. Incremental mapping can use the information saved between successive runs of the mapper, where the information is saved in such a way that the RRG can be recreated in the same state as it was when the mapper completed the last time. Because the rest of the original RRG can be reconstructed from the architecture XML description, the occupancy information of the RRG nodes should be retained. Occupancy information for cluster-related nodes such as IPIN, OPIN, SOURCE and SINK can be derived from its configuration attributes. If the cluster is configured, and therefore, used, at least some of its nodes can be reserved by setting their occupancy=capacity. For transitory or OTHER nodes, occupancy information can be added explicitly as an attribute.

Thus, there can be two additional attributes in the architecture XML for the output format. First, "conf," an attribute of "cluster," can indicate the configuration that is to be loaded onto the cluster by the manager. Second, "occ," an attribute of "transitory," can indicate how many paths have already been routed through the node by previous mapper runs.

The additional elements in the architecture XML for the output format can be found in Appendix C, below. The mapper can also generate a visual representation of its results, to show them in an easily understandable way.

Thus, the implementation choices that can be made to provide an infrastructure upon which various routing and placement algorithms can be based are defined. As such, it can create a simple mapper.

The internal data structure upon which the algorithms can build is the RRG. It holds information about both placement and routing, and can provide cost metrics as feedback information for the algorithms themselves.

Run-time Mapper

The implementations of the simulated annealing placer and Dijkstra router can be accomplished in a run-time mapper. A router based on the A* algorithm, a router using Fibonacci heaps instead of binary heaps, a cluster growth placer, and a genetic algorithm placer can also be implemented.

The simple mapper can manipulate a set of XML files as described above and produces a complete mapping containing, among other things, placement and routing information for a specific application.

Figure 38:
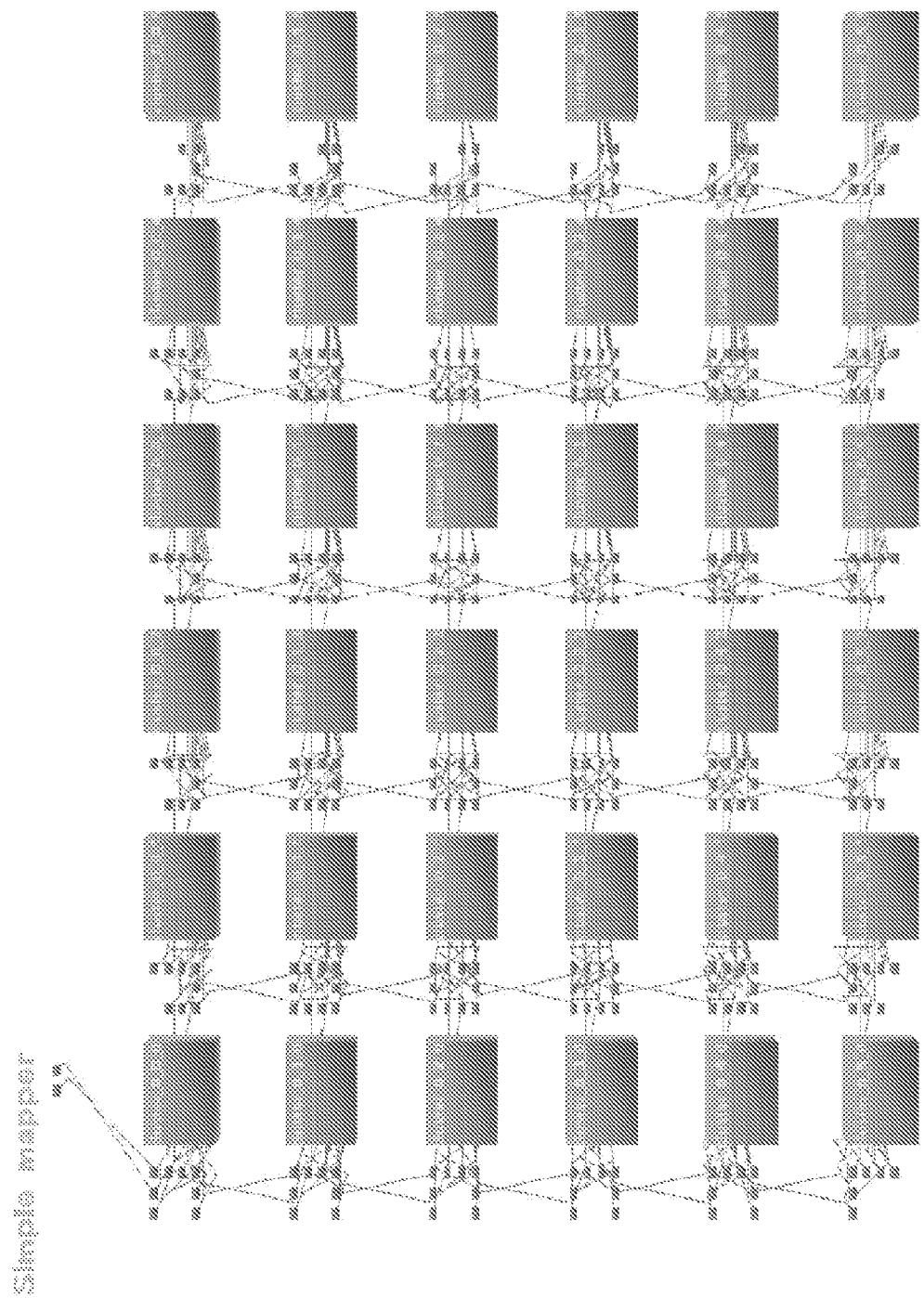
FIG. 38 depicts a visual representation of an embodiment of a reconfigurable array.

The mapper program can have elements for loading an architecture XML file. After opening the file, the mapper can display a view of the architecture and all of its interconnect resources. FIG. 38 illustrates an embodiment of an architecture containing a single cluster group containing 6×6 clusters. Subsequently, an application file can be opened and mapped on the architecture. After both architecture and application files are open, mapping can be performed.

Figure 39:
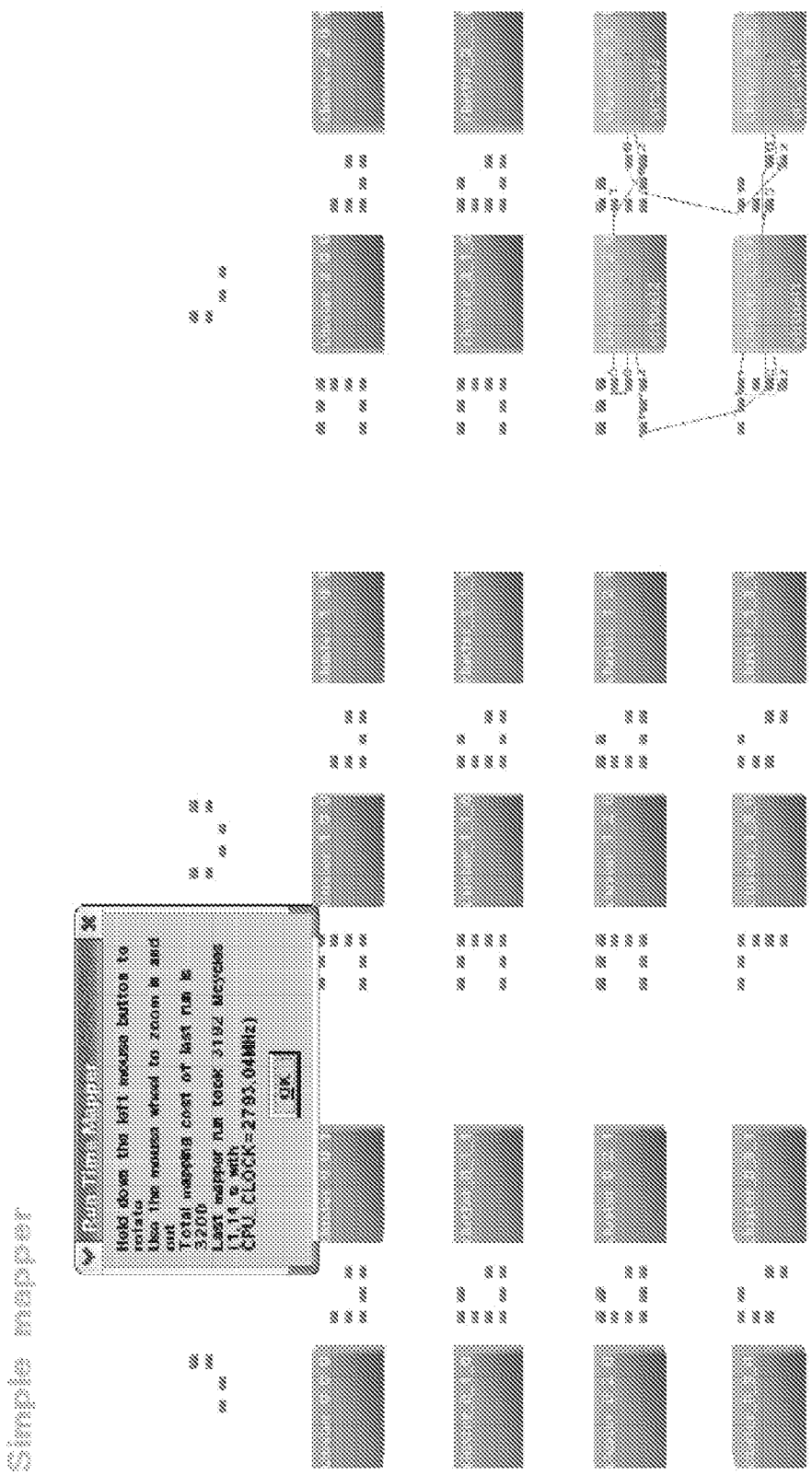
FIG. 39 depicts a visual representation of an embodiment of a reconfigurable array including routing output information.

The mapper can be a combination of a placer and a router. After mapping, the routing resources are used by the application can be displayed. As can be seen in the embodiment in FIG. 39, the result of a mapping process encompassing an architecture with 3 cluster groups containing 8 clusters each is shown. The mapper is shown having successfully minimized the total cost by placing the virtual clusters close together in a circular arrangement inside the same cluster group.

Mapper XML Features

A run-time mapper, which can be used to perform P&R is described above. The program contains at least two XML formats, a first one for the description of an architecture and a second one to represent the application to be mapped, as can be seen in FIG. 27.

It can be desirable to allow the router significant freedom in port placement to improve the quality of the result. For this reason, SOURCE and SINK nodes can be used. The nodes can also be used as starting and end points of nets by the router. Some extensions have been implemented to constrain the amount of interchangeability that the router will allow because, in the actual reconfigurable clusters, some inputs or outputs might not be generally swappable. Thus, a group attribute for input and output ports can be used, in which ports in the same group which can be freely interchanged with each other, but not with pins in a different group.

Additionally, the XML modelling of blocks such as fixed-hardware COS, SIN, SQRT and multi-port RAM can have substantially functionally equivalent ports. However, it can be difficult to change only the inputs or only the outputs. In one non-limiting example, the router can be allowed to use a different input port for a multi-port RAM than the one that was specified in the netlist. In that case, when an address is received through a first input port instead of a second input port, the data must be read back from the first output port as well instead of the second output port.

This of constraint can be overcome by using the newly-introduced pair attribute for input and output ports. Thus, when one member of a pair is swapped, the other member undergoes the same swap operation.

Figure 40B:
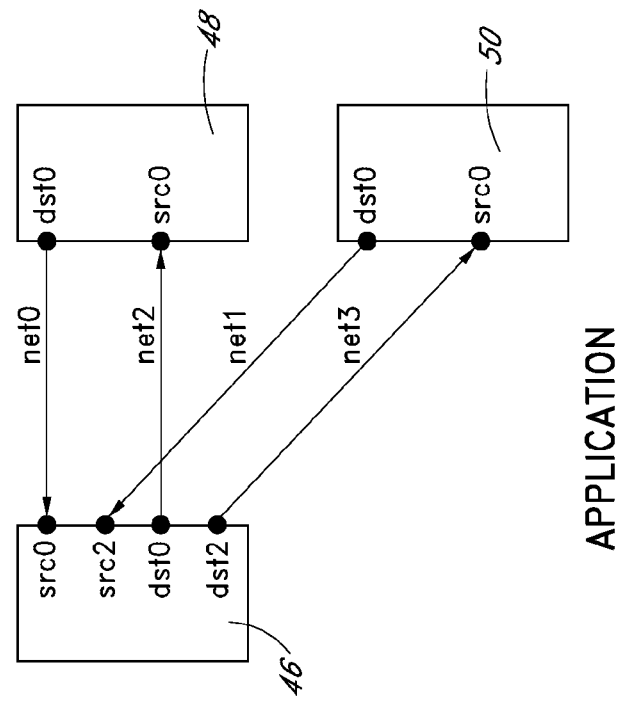
Figure 40A:
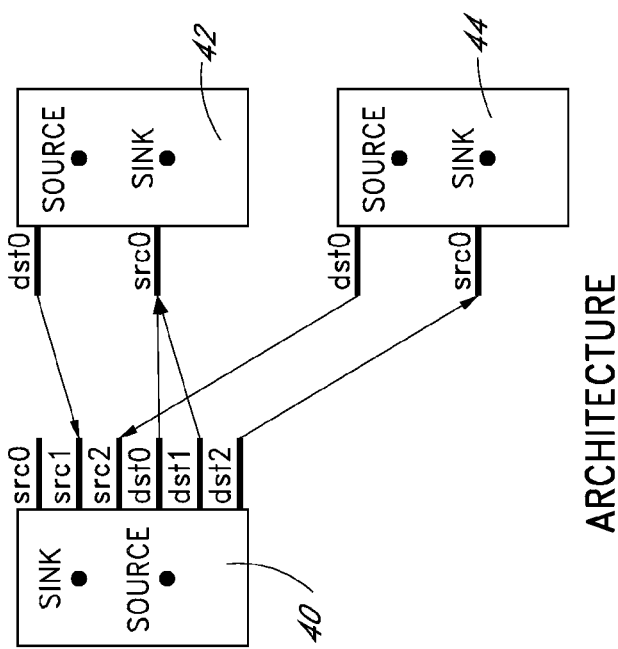
FIG. 40a illustrates a layout of an embodiment of three processing units.

FIG. 40a illustrates an example of the usage of these two new port attributes. Shown in the figure is a partially-connected architecture, where block 40 is a RAM block with 3 ports. Additional blocks 42, 44 can be connected to its address and data ports. It should be noted that the dst0 output of block 42 is only connected to port src1 of block 40 in the architecture. The input src0 of block 42 is muxed between dst0 and dst1 of block 0.

FIG. 40b illustrates the application netlist desired for mapping on the architecture. While an intuitive mapping candidate would be block 46→block 40; block 48→block 42; and block 50,→44, the exemplified application specifies that dst0 of block 42 should be connected to src0 of block 40 (net 0). There is no such connection in the architecture, however, there is a connection from dst0 to src1 available.

Thus, as seen in FIG. 40b, by placing src0 and src1 in the same port group, router can receive an indication that it can swap them if necessary. The XML description of block 46 can be seen below in Appendix D. Because src2 and dst2 are the only members of their respective groups, the router can receive an indication that port swapping is not allowed for them.

The mapper can configure architecture block 40 with the configuration data for application block 46 by using src1 instead of src0. The configuration data can be found below in Appendix E.

A schema for our architecture modelling language supporting several elements and attributes is attached below in Appendix F. Similarly, a schema for the application modelling language is attached below in Appendix G. Additional elements and attributes can be used without deviating from the schemas.

Additional References

[1] M. Saito, H. Fujisawa, N. Ujiie, H. Yoshizawa, "Cluster Architecture for Reconfigurable Signal Processing Engine for Wireless Communication", FPL 2005

[2] C. Y. Lee, "An Algorithm for Path Connection and its Applications". IRE Transaction on Electronic Computing, Vol. EC=10, pp. 346-365, 1961

[3] K. Mikami, K. Tabuchi, "A Computer Program for Optimal Routing of Printed Circuit Conductors", Proceedings of the IFIP Congress, 1968 Vol. 2 pp. 1475-1478

[4] E. Dijkstra, "A Note on Two Problems in Connexion with Graphs", Numerical Mathematics, 1:269-271, December 1959

[5] C. Ebeling, L. McMurchie, S. A. Hauck and S. Burns, "Placement and Routing Tools for the Triptych FPGA", IEEE Trans on VLSI Systems, 3(4):473-482, December 1995

[6] B. Mei, S. Vernalde, D. Verkest, H. D. Man and R. Lauwereins, "Exploiting Loop-level Parallelism on Coarse-Grained Reconfigurable Architectures Using Modulo Scheduling", IEE Proc. Computer and Digital Techniques, Vol. 150, No. 5, September 2003

[7] N. J. Nilsson, "Problem-Solving Methods in Artificial Intelligence", McGraw-Hill, Ch3, pp43-78, 1971

[8] A. H. Land and A. G. Doig, "An Automatic Method for Solving Discrete Programming Problems", Econometrica, Vol 28, 9160, pp 497-520

[9] A. E. Caldwell, A. B. Kahng, I. L. Markov, "Can Recursive Bisection Produce Routable Placements?", Proc. Design Automation Conf, 2000

[10] B. T. Preas, P. G. Karger, "Automatic placement: a review of current techniques" (tutorial session), Proc. Design Automation Conf, p. 622-629, 1986

[11] C. Sechen and A. Sangiovanni-Vincentelli, "The Timberwolf Placement and Routing package", IEEE Journal of Solid-State Circuits, vol. SC-20, pp. 510-522, April 1985

[12] Y. Sankar and J. Rose, "Trading Quality for Compile Time: Ultra-Fast Placement for FPGAs", ACM international conference on FPGA, pp 157-166, 1999

[13] F. Mo, A. Tabbara, R. K. Brayton, "A Force-Directed Macro-Cell Placer", Proc. ICCAD, 2000, pp. 404-407

[14] J. P. Cohoon, W. D. Paris, "Genetic Placement", Proc. IEEE Int. Conf. on CAD, pp 422-425, 1986

[15] P. Kannan, D. Bhatia, "Tightly Integrated Placement and Routing for FPGAs", Proc. of the Int. Workshop on Field-Programmable Logic and Applications, pp 233-242, 2001

[16] J. Rose, W. Klebsch, J. Wolf, "Temperature Measurement and Equilibrium Dynamics of Simulated Annealing Placements", IEEE Trans on CAD, March 1990

[17] D. Goldberg, R. Lingle, "Alleles, loci, and the Traveling Salesman Problem.", Proc. Int. Conf. on Genetic Algorithms and their Applications, 1985

[18] K. D. Boese, A. B. Kahng, C.-W. A. Tsao, "Best-so-far vs. where-you-are: New perspectives on Simulated Annealing for CAD", Proceedings EURO-DAC 1993

[19] V. Betz, J. Rose, *VPR: A New Packing, Placement and Routing Tool for FPGA Research*, Int. Workshop on Field-Programmable Logic and Applications, pp 213-222, 1997

[20] M. A. Breuer, "A class of min-cut placement algorithms", Proceedings of the 14th conference on Design automation, p.284-290, January 1977

[21] G. Clow, *A Global Routing Algorithm for General Cells*, Proceedings of the ACM IEEE $21^{st}$ Design Automation Conference, 1984

[22] C. M. Fiduccia, R. M. Mattheyses, *A Linear Time Heuristic for Improving Network Partitions*, DAC '82, pp. 175-181

[23] S. Goto, *An Efficient Algorithm for the Two-Dimensional Placement Problem in Electrical Circuit Layout*, IEEE Trans. on Circuits and Systems, January 1981

[24] F. O. Hadlock, A shortest path algorithm for grid graphs, Networks 7 (1977), 323-334

[25] M. Hanan and J. M. Kurtzberg, *Placement Techniques*, M. A. Breuer, Ed. Prentice-Hall Inc, Englewood Cliffs, N.J., pp 213-282, 1972

[26] D. W. Hightower. "A Solution to Line-Routing Problems in the Continuous Plane", Proceedings of the 6th Design Automation Workshop. June 1969. pg. 1-24

[27] Hidetoshi Onodera, Yo Taniguchi, Keikichi Tamaru, *Branch-and-Bound Placement for Building Block Layout*, $28^{th}$ ACM/IEEE Design Automation Conference, pp 433-439, 1991

[28] J. Karro and J. Cohoon, *Gambit: A Tool for the Simultaneous Placement and Detailed Routing of Gate-arrays*, $11^{th}$ International Conference on Field Programmable Logic and Applications, pp 243-253, 2001

[29] Kirkpatrick, S., C. D. Gelatt, and M. P. Vecchi, *Optimization by Simulated Annealing*, Science, vol. 220, no. 4598, pp 671-680, May 13, 1983

[30] S. K. Nag and R. A. Rutenbar, *Performance-based Simultaneous Placement and Routing for FPGAs*, IEEE Trans on CAD, 17(5):499-518, June 1998

[31] K. Shahookar, P. Mazumder, *VLSI Cell Placement Techniques*, ACM Computing Surveys, Vol. 23, No. 2, June 1991

[32] C. E. Shannon, "Presentation of the maze-solving machine", Trans of the $8^{th}$ Cybernetics Conf, 1952, Josiah Macy Jr Foundation, New York, N.Y., pp 173-180

[33] J. Soukup, *Fast Maze Router*, DAC-78

[34] W. Sun and C. Sechen, *Efficient and Effective Placement for Very Large Circuits*, IEEE Trans. on CAD, March 1995, pp.349-359

[35] W. Swartz and C. Sechen, *New Algorithms for the Placement and Routing of Macro Cells*, Proc. Int. Conf. on Computed-Aided Design, 1990, pp. 336-339

[36] L. McMurchie, C. Ebeling, "PathFinder: A Negotiation-Based Performance-Driven Router for FPGAs", Proc. Of ACM Symp. Field-Programmable Gate Arrays, February 1995

[37] Roman Lysecky, Frank Vahid, Shedon X.-D. Tan, "Dynamic FPGA Routing For Just-in-Time FPGA Compilation", DAC 2004

Appendix A

The schema for our architecture modeling language supports at least some of the following elements and attributes:

<architecture>: The architecture model is contained entirely within this element. It is the top-level element in the hierarchy and all other elements are its children.
Attributes:
none <clustergroup>: This element encapsulates a number of <cluster>elements, defined below. Clusters within the same cluster group are assumed to be tightly coupled for routing purposes.
Attributes:
none <cluster>: Instantiates a cluster. Its attributes and child elements are illustrated by this example:

```
<cluster name="cluster_0_0_0" type="8PE">
    <in name="src0" width="32"/>
    <out name="dst0" width="32"/>
</cluster>
```

Attributes:
    name: This attribute defines a name that is used to reference the cluster later on. Note that the architecture parser does not resolve undefined names in a second pass: referencing a name before it is defined is an error.
    type: A symbolic string that describes the types of configuration that can be mapped on the cluster. For example, "8PE" can indicate that the cluster supports configurations generated by the compiler for clusters that contain 8 processing elements. The types of clusters are cross-checked with the type of virtual clusters when determining if a virtual cluster can be mapped on a (physical) architecture cluster (see below).
<in>: A child element of a <cluster>; it represents an input port of a cluster.
    Attributes:
        name: The name of the input port. It must be one of the predefined architecture-specific port names "src0, "src1", ... "srcN". The maximum number of input ports that a cluster can have is therefore N+1.
        width: Bit width of the port
<out>: A child element of a <cluster>; it represents an output port of a cluster.
    Attributes:
        name: The name of the input port. It must be one of the predefined architecture-specific port names "dst0, "dst1", ... "dstM". The maximum number of output ports that a cluster can have is therefore M+1.
        width: Bit width of the port
<transitory>: Instantiates an interconnect node with a certain capacity and delay. This element can be used to model wires, registers and muxes. For example, <transitory name="ff_in_0" delay="0"/>forms a delayless interconnect node with a default capacity of 1 signal, physically representing a simple wire. If more than one other node connects to this transitory element, an input multiplexer is inferred. <transitory name="ff_out_0" delay="1" cap="4"/>forms a register (delay 1) with a capacity of 4 signals, so physically there will be 4 registers present in the architecture.
    Attributes:
        name: This attribute defines a name that is used to reference the node later on.
        delay: Delay of the interconnect node in clock cycles.
        cap: Capacity of the node. A default capacity of 1 is assumed when this attribute is absent.
<connect>: Connects a cluster input or output to another cluster input/output or to a transitory node. Connections describe legal paths that the router can take to map an application. For example:

```
<connect>
    <src entity="cluster_0_0_0" port="dst0"/>
    <dst entity="ff_in_0"/>
</connect>
```

Attributes:
    none
<src>: A child element of a <connect>; it represents the source entity for a connection.
    Attributes:
        entity: The name of the source entity. It can be a cluster output port or a transitory node.
        port: Port of the entity that is to be used, when applicable (transitory nodes have no ports)
<dst>: A child element of a <connect>; it represents the destination entity for a connection.
    Attributes:
        entity: The name of the destination entity. It can be a cluster input port or a transitory node.
        port: Port of the entity that is to be used, when applicable (transitory nodes have no ports)Appendix B An XML schema for the application description in the mapper prototype can consist of at least some of the following elements:
<application>: The application description is contained entirely within this element. It is the top-level element in the hierarchy and all other elements are its children.
    Attributes:
        none
<virtual>: Instantiates a virtual cluster. A virtual cluster is the same as a physical cluster, except that it is unplaced. Its attributes and child elements are illustrated by this example:

```
<virtual name="virtual1">
    <conf type="8PE"/>
    <conf type="12PE"/>
    <in name="src0" width="32"/>
    <out name="dst0" width="32"/>
</virtual>
```

Attributes:
    name: Defines a name for this virtual cluster that can used to reference it later on.
<conf>: A child element of a <virtual>; representing the fact that this virtual cluster has configuration data available for a certain type of physical cluster.
    Attributes:
        type: The "type" attribute is a symbolic string that describes one type of configuration that is available for the virtual cluster. In the example above, the type attributes indicate that this virtual cluster has associated configuration data for a physical cluster with 8 processing elements and for one with 12. During placement, only a placement of this virtual cluster on a physical <cluster> element with 8 or with 12 processing elements in the architecture is valid.
<in>: A child element of a <virtual>; it represents an input port of a virtual cluster.
    Attributes:
        name: The name of the input port. It must be one of the predefined architecture-specific port names "src0, "src1", ... "srcN"
        width: Bit width of the port
<out>: A child element of a <virtual>; it represents an output port of a virtual cluster.
    Attributes:
        name: The name of the input port. It must be one of the predefined architecture-specific port names "dst0, "dst1", ... "dstM"
        width: Bit width of the port
<connect>: Connects a virtual cluster input or output to another cluster input/output. Connections describe the flow of data inside the unmapped application. For example:

```
<connect>
    <src entity="virtual1" port="dst0"/>
    <dst entity="virtual2" port="src1"/>
</connect>
```

There are two possibilities to define a net with multiple sinks: the first way is to create multiple <connect> elements with the same source but different destinations, the second way is to include multiple <dst> elements within the same <connect> element.
Attributes:
  none
<src>: A child element of a <connect>; it represents the source virtual cluster for a connection.
Attributes:
  entity: The name of the source virtual cluster.
  port: Port of the virtual cluster that is to be used
<dst>: A child element of a <connect>; it represents the destination virtual cluster for a connection.
Attributes:
  entity: The name of the destination virtual cluster.
  port: Port of the virtual cluster that is to be used Appendix C The additional elements in the architecture XML for the output format are:
<sel>: A child element of a <transitory> or <in> element containing a select signal for the node's input multiplexer. The number of select children is equal to the transitory node's capacity. If the node has only 1 incoming edge, the select element is not necessary.
Attributes:
  input: Number of the input to be selected Appendix D The XML description of block 40 described above in FIG. 40*b* appears as:

```
<cluster name="cluster_0" type="8PE" xpos="-50" ypos="50">
    <in name="src0" width="32" group="group1"/>
    <in name="src1" width="32" group="group1"/>
    <in name="src2" width="32" group="group2"/>
    <out name="dst0" width="32" group="group3"/>
    <out name="dst1" width="32" group="group3"/>
    <out name="dst2" width="32" group="group4"/>
</cluster>
```

Appendix E

The mapper can configure architecture block 40 with the configuration data for application block 46 by using src1 instead of src0. The configuration data can be found below in Appendix E.

```
<cluster name="cluster_0" type="8PE" xpos="-50" ypos="50"
  conf="virtualA">
    <in name="src0" width="32" group="group1"/>
    <in name="src1" width="32" group="group1">
    <sel input="0"/></in>
    <in name="src2" width="32" group="group2">
    <sel input="0"/></in>
    <out name="dst0" width="32" group="group3" pair="pair1"/>
    <out name="dst1" width="32" group="group3" pair="pair2"/>
    <out name="dst2" width="32" group="group4"/>
</cluster>
```

However, upon closer examination of the output, we see that for block 1, the signal returning from block 0 originates from dst0, since the input mux of src0 of block 0 is set to its first input, 0:

```
<cluster name="cluster_1" type="8PE" xpos="50" ypos="50"
  conf="virtualB">
    <in name="src0" width="32">
    <sel input="0"/></in>
    <out name="dst0" width="32"/>
</cluster>
```

In the case of a RAM read by block 1, this is not what we want: if block 1 sends its address to port src1, the data must return from block 0's dst1 port, since a RAM cannot internally swap these signals (a reconfigurable cluster might be able to do this, however). The solution is to indicate in the XML that src1 and dst1 are paired and must not be swapped independently. Likewise, src0 and dst0 are paired:

```
<cluster name="cluster_0" type="8PE" xpos="-50" ypos="50">
    <in name="src0" width="32" group="group1" pair="pair1"/>
    <in name="src1" width="32" group="group1" pair="pair2"/>
    <in name="src2" width="32" group="group2"/>
    <out name="dst0" width="32" group="group3" pair="pair1"/>
    <out name="dst1" width="32" group="group3" pair="pair2"/>
    <out name="dst2" width="32" group="group4"/>
</cluster>
```

We can now re-run the mapper example. This time, the mapper can obey the pairing constraints, and choose the correct input for the input mux of port src0 of block 1:

```
<cluster name="cluster_1" type="8PE" xpos="50"
  ypos="50" conf="virtualB">
    <in name="src0" width="32">
    <sel input="1"/></in>
    <out name="dst0" width="32"/>
</cluster>
```

Appendix F
Specification of Architecture XML

The schema for our architecture modeling language supports the following elements and attributes:
<architecture>: The architecture model is contained entirely within this element. It is the top-level element in the hierarchy and all other elements are its children.
Attributes:
  none
<clustergroup>: This element encapsulates a number of <cluster> elements, defined below. Clusters within the same cluster group are assumed to be tightly coupled for routing purposes.
Attributes:
  clusters: The number of clusters in the group.
  clustersperrow: The number of clusters in 1 row of the cluster group. The cluster group geometry is completely defined by the clusters and clustersperrow attributes; the number of rows can be computed as clusters/clustersperrow.
<cluster>: Instantiates a cluster. Note that a memory or a non-reconfigurable cluster is currently also modeled by this element, since as far as the mapper is concerned, they are all simply black-box blocks with a number of output ports and a number of input ports. Attributes and child elements are illustrated by this example:

```
<cluster name="cluster_0_0_0" type="8PE">
    <in name="src0" width="32"/>
    <out name="dst0" width="32"/>
</cluster>
```

Attributes:

name: This attribute defines a name that is used to reference the cluster later on. Note that the architecture parser does not resolve undefined names in a second pass: referencing a name before it is defined is an error.

type: A symbolic string that describes the types of configuration that can be mapped on the cluster. For example, "8PE" can indicate that the cluster supports configurations generated by the compiler for clusters that contain 8 processing elements. The types of clusters are cross-checked with the type of virtual clusters when determining if a virtual cluster can be mapped on a (physical) architecture cluster (see below).

xpos: When using the visualization tool, this attribute is taken into account as a position hint to display the cluster on the screen. The center of the screen corresponds to location 0. The positive X-axis extends towards the right hand side of the screen.

ypos: When using the visualization tool, this attribute is taken into account as a position hint to display the cluster on the screen. The center of the screen corresponds to location 0. The positive Y-axis extends towards the top of the screen.

conf: The name of the configuration that is to be loaded onto the cluster by the manager. This attribute is added by the mapper in the output XML file; it represents the placement information.

<in>: A child element of a <cluster>; it represents an input port of a cluster.

Attributes:

name: The name of the input port. It must be one of the predefined architecture-specific port names "src0, "src1", ... "srcN". The maximum number of input ports that a cluster can have is therefore N+1. In the current implementation, N=3. The maximum number of input ports is easily extended by modifying the FU_OPERAND_RANGE enumeration type in the file arch.h.

width: Bit width of the port group: A symbolic name for the port group that the port belongs to. Ports in the same port group are considered to be interchangeable by the router. By default, all input pins belong to the same group, i.e. they are freely swappable.

pair: A symbolic name for the port pair that a port belongs to. A pair always contains one input port and one output port. When the router decides to swap one port of the pair with another to improve routability, the other port of the pair must be swapped in the same way.

<out>: A child element of a <cluster>; it represents an output port of a cluster.

Attributes:

name: The name of the output port. It must be one of the predefined architecture-specific port names "dst0, "dst1", ... "dstM". The maximum number of output ports that a cluster can have is therefore M+1. Again, the number of output ports is easily extended by modifying the file arch.h.

width: Bit width of the port group: A symbolic name for the port group that the port belongs to. Ports in the same port group are considered to be interchangeable by the router. By default, all output pins belong to the same group, i.e. they are freely swappable.

pair: A symbolic name for the port pair that a port belongs to. A pair always contains one input port and one output port. When the router decides to swap one port of the pair with another to improve routability, the other port of the pair must be swapped in the same way.

<transitory>: Instantiates an interconnect node with a certain capacity and delay. This element can be used to model wires, registers and muxes. For example, <transitory name="ff_in_0" delay="0"/> forms a delayless interconnect node with a default capacity of 1 signal, physically representing a simple wire. If more than one other node connects to this transitory element, an input multiplexer is inferred. <transitory name="ff_out_0" delay="1" cap="4"/>forms a register (delay 1) with a capacity of 4 signals, so physically there will be 4 registers present in the architecture.

FIG. 41 depicts some non-limiting examples of graph representations of interconnect resources with transitory nodes. It should be noted that an interconnect node can also be used to represent an external port of the architecture.

Attributes:

name: This attribute defines a name that is used to reference the node later on.

delay: Delay of the interconnect node in clock cycles.

cap: Capacity of the node. A default capacity of 1 is assumed when this attribute is absent.

xpos: When using the visualization tool, this attribute is taken into account as a position hint to display the transitory node on the screen. The center of the screen corresponds to location 0. The positive X-axis extends towards the right hand side of the screen.

ypos: When using the visualization tool, this attribute is taken into account as a position hint to display the transitory node on the screen. The center of the screen corresponds to location 0. The positive Y-axis extends towards the top of the screen.

occ: Indicates how many paths have been routed through the node (node occupancy). This attribute is added by the mapper in the output XML file; it represents part of the routing information.

<connect>: Connects a cluster input or output to another cluster input/output or to a transitory node. Connections describe legal paths that the router can take to map an application. For example:

```
<connect>
    <src entity="cluster_0_0_0" port="dst0"/>
    <dst entity="ff_in_0"/>
</connect>
```

Attributes:

none

<src>: A child element of a <connect>; it represents the source entity for a connection.

Attributes:

entity: The name of the source entity. It can be a cluster output port or a transitory node.

port: Port of the entity that is to be used, when applicable (transitory nodes have no ports)

<dst>: A child element of a <connect>; it represents the destination entity for a connection.

Attributes:

entity: The name of the destination entity. It can be a cluster input port or a transitory node.

port: Port of the entity that is to be used, when applicable (transitory nodes have no ports)<sel>: A child element of a <transitory> or <in> element containing a select signal for the node's input multiplexer. It represents part of the routing information. The number of select children is equal to the transitory node's capacity. Section Error! Reference source not found. has a more detailed explanation for the multiplexer encodings of input nodes.

Attributes:

input: Number of the input to be selected

Appendix G

Specification of Application XML

<application>: The application description is contained entirely within this element. It is the top-level element in the hierarchy and all other elements are its children.

Attributes:

none

<virtual>: Instantiates a virtual cluster. A virtual cluster is the same as a physical cluster, except that it is unplaced. Its attributes and child elements are illustrated by this example:

```
<virtual name="virtual1" type="8PE,12PE"/>
    <in name="src0" width="32"/>
    <out name="dst0" width="32"/>
</virtual>
```

Attributes:

name: Defines a name for this virtual cluster that can used to reference it later on.

type: The "type" attribute is a symbolic string that describes the type of configuration that is available for the virtual cluster. In the example above, the type attributes indicate that this virtual cluster has associated configuration data for a physical cluster with 8 processing elements and for one with 12. During placement, only a placement of this virtual cluster on a physical <cluster> element with 8 or with 12 processing elements in the architecture is valid. This is accomplished by checking the type attribute of the <cluster> element in the architecture file.

<in>: A child element of a <virtual>; it represents an input port of a virtual cluster.

Attributes:

name: The name of the input port. It must be one of the predefined architecture-specific port names "src0, "src1", . . . "srcN"

width: Bit width of the port

<out>: A child element of a <virtual>; it represents an output port of a virtual cluster.

Attributes:

name: The name of the input port. It must be one of the predefined architecture-specific port names "dst0, "dst1", . . . "dstM"

width: Bit width of the port

<connect>: Connects a virtual cluster input or output to another cluster input/output. Connections describe the flow of data inside the unmapped application. For example:

```
<connect>
    <src entity="virtual1" port="dst0"/>
    <dst entity="virtual2" port="src1"/>
</connect>
```

There are two possibilities to define a net with multiple sinks: the first way is to create multiple <connect> elements with the same source but different destinations, the second way is to include multiple <dst> elements within the same <connect> element. The prototype mapper only supports the first way at this time.

Attributes:

none

<src>: A child element of a <connect>; it represents the source virtual cluster for a connection.

Attributes:

entity: The name of the source virtual cluster.

port: Port of the virtual cluster that is to be used

<dst>: A child element of a <connect>; it represents the destination virtual cluster for a connection.

Attributes:

entity: The name of the destination virtual cluster port: Port of the virtual cluster that is to be used tmin: Minimum delay in cycles between src and this dst tmax: Maximum delay in cycles between src and this dst tmatch: Delay that must be matched by this src-dst connection. Its value is the symbolic name of the delay of another src-dst pair that must be matched by this one. The symbolic names are defined by the time attribute, described below.

time: Defines the delay between this src and dst as a symbolic name.

As an example, consider a situation where two connections must have the same src-dst delay:

```
<connect>
    <src entity="virtual1" port="dst0"/>
    <dst entity="virtual2" port="src0"  time="time1" tmatch="time2">
</connect>
<connect>
    <src entity="virtual1" port="dst1"/>
    <dst entity="virtual2" port="src1"  time="time2" tmatch="time1">
</connect>
```

The delay matching constraint must be set for both connections since their routing order is unknown, and if the second one is routed first, its delay must be matched by the first connection (and vice versa).

Although certain embodiments, features, and examples have been described herein, it will be understood by those skilled in the art that many aspects of the methods and devices shown and described in the present disclosure may be differently combined and/or modified to form still further embodiments. For example, any one component of the infusion sets shown and described above can be used alone or with other components without departing from the spirit of the present invention. Additionally, it will be recognized that the methods described herein may be practiced in different sequences, and/or with additional devices as desired. Such alternative embodiments and/or uses of the methods and devices described above and obvious modifications and equivalents thereof are intended to be included within the scope of the present invention. Thus, it is intended that the scope of the present invention should not be limited by the particular embodiments described above, but should be determined only by a fair reading of the claims that follow.

What is claimed is:

1. A system for mapping tasks of at least one application on processing units of a reconfigurable array, the system comprising:
   a plurality of programmable processing units, each programmable processing unit having at least one connection node, the programmable processing units disposed on a layer permitting interconnection between connection nodes; and
   a mapping unit configured to substantially simultaneously optimize placement of the tasks on the plurality of programmable processing units and routing of interconnections between the plurality of processing units by performing adaptive selection among a plurality of different predetermined routing and placement algorithms, the mapping unit being configured to correspondingly adaptively select one placement algorithm among the plurality of placement algorithms and to adaptively select one routing algorithm from the plurality of routing algorithms, the selection being configured to prefer use of non-random placement or routing algorithms based on a predetermined threshold values of the plurality of programmable processing units.

2. The system of claim 1, wherein the placement algorithm is a constructive cluster growth algorithm when the plurality of programmable processing units is fewer than a first predetermined threshold value.

3. The system of claim 2, wherein the cluster growth algorithm is combined with iterative pair-wise interchange.

4. The system of claim 2, wherein the mapping unit is configured to receive a suitable graph representation of the computation engine, the computational elements of the computation engine being represented as vertices, and the cluster growth algorithm uses a key value derived from the distance between a source vertex and a current vertex and an estimated distance between a current vertex and a destination vertex.

5. The system of claim 1, wherein the placement algorithm is a simulated annealing algorithm when the plurality of programmable processing units is greater than about a second predetermined threshold.

6. The system of claim 1, wherein the reconfigurable array is configured to be reconfigured during run-time.

7. The system of claim 1, wherein the placement algorithm is a simulated genetic algorithm when the plurality of processing units is greater than about a third predetermined threshold value.

8. The system of claim 7, wherein the Dijkstra algorithm is augmented with an A* estimator.

9. The system of claim 1, wherein the routing algorithm is a Dijkstra algorithm when the plurality of programmable processing units is a fourth predetermined threshold value.

10. The system of claim 1, wherein each programmable processing unit comprises a plurality of programmable processing modules.

11. The system of claim 1, wherein the reconfigurable array is coarse-grain.

12. The system of claim 1, wherein the reconfigurable array is fine-grain.

13. The system of claim 1, wherein the mapping unit is configured to substantially simultaneously optimize placement of the tasks and routing during run time.

14. The system of claim 1, wherein the adaptive selection by the mapping unit is based at least in part on the number of the programmable processing units.

15. A system for mapping tasks of at least one application on processing units of a reconfigurable array, the system comprising:
   a plurality of programmable processing units, each programmable processing unit having at least one connection node, the programmable processing units being disposed on a layer allowing interconnection between these connection nodes; and
   a run-time mapping unit configured to correspondingly a) adaptively select one placement algorithm from a plurality of different pre-determined placement algorithms and optimize placement of the tasks on the plurality of programmable processing units using the selected placement algorithm, and b) adaptively select one routing algorithm from a plurality of different pre-determined routing algorithms and route interconnections between the plurality of processing units using the selected routing algorithm, wherein the adaptive selection of the placement algorithm or the routing algorithm preferring non-random placement or routing algorithms based on a predetermined threshold values of the plurality of programmable processing units.

16. The system of claim 15, wherein the adaptive selection is based at least in part on the number of the programmable processing units.

* * * * *